United States Patent
Downs

(10) Patent No.: US 6,233,361 B1
(45) Date of Patent: *May 15, 2001

(54) TOPOGRAPHY PROCESSOR SYSTEM

(76) Inventor: Roger Colston Downs, Baithe Cottage, Belmont Rd., Camberley, Surrey GU15 2NZ (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/601,048

(22) PCT Filed: Aug. 23, 1994

(86) PCT No.: PCT/GB94/01845

§ 371 Date: Feb. 23, 1996

§ 102(e) Date: Feb. 23, 1996

(87) PCT Pub. No.: WO95/06283

PCT Pub. Date: Mar. 2, 1995

(30) Foreign Application Priority Data

| Aug. 24, 1993 | (GB) | 9317573 |
| Aug. 24, 1993 | (GB) | 9317600 |
| Aug. 24, 1993 | (GB) | 9317601 |
| Aug. 24, 1993 | (GB) | 9317602 |
| Sep. 13, 1993 | (GB) | 9318903 |
| Nov. 18, 1993 | (GB) | 9323779 |
| Nov. 18, 1993 | (GB) | 9323780 |
| Nov. 18, 1993 | (GB) | 9323781 |
| Nov. 18, 1993 | (GB) | 9323782 |
| Nov. 18, 1993 | (GB) | 9323783 |
| Mar. 10, 1994 | (GB) | 9404654 |

(51) Int. Cl.[7] ............................................. G06K 9/40
(52) U.S. Cl. .................. 382/260; 371/22.4; 371/25.1; 714/25; 714/46
(58) Field of Search .............................. 382/260, 309, 382/325; 395/183.01, 183.02, 183.22; 371/22.4, 22.5, 22.6, 26, 24, 25.1; 714/25, 32, 37, 38, 39, 46

(56) References Cited

U.S. PATENT DOCUMENTS

| 4,370,724 | 1/1983 | Herbst et al. | 364/561 |
| 4,577,344 | * 3/1986 | Warren et al. | 382/100 |

(List continued on next page.)

FOREIGN PATENT DOCUMENTS

| 0 115 780A2 | 8/1984 | (EP) | H04N/9/04 |
| 0 121 411A2 | 10/1984 | (EP) | G01C/11/00 |
| 0 159 859 | 10/1985 | (EP) | G06F/15/68 |
| 0 225 159A2 | 6/1987 | (EP) | G06F/15/64 |
| 0 380 090A2 | 8/1990 | (EP) | G06F/15/60 |

(List continued on next page.)

OTHER PUBLICATIONS

Rauch, H.E., "Intelligent fault diagnosis and control reconfiguration," *IEEE Control Systems Magazine,* (Jun. 1994), vol. 14, Nr. 3, pp. 6–12.

(List continued on next page.)

*Primary Examiner*—Matthew C. Bella
(74) *Attorney, Agent, or Firm*—Lahive & Cockfield, LLP

(57) ABSTRACT

A topography processor system comprising a phased image sensor array, at least one processor arranged to perform range decompression of imaged detail, and a means for allowing non interruptive graphic macro diagnosis based on a graphic display of the frame rate macroscopic behavior of internal transfer functions of the system figures 15, 17 permit visual, augmented visual or automatic visual determination of the system's integrity.

60 Claims, 38 Drawing Sheets

U.S. PATENT DOCUMENTS

| | | | | |
|---|---|---|---|---|
| 4,675,832 | * | 6/1987 | Robinson et al. | 364/521 |
| 4,698,785 | * | 10/1987 | Desmond et al. | 395/183.22 |
| 4,744,084 | * | 5/1988 | Beck et al. | 371/23 |
| 4,853,946 | * | 8/1989 | Elliott et al. | 378/4 |
| 4,878,746 | | 11/1989 | Nakano et al. | 350/507 |
| 4,916,302 | | 4/1990 | Sorimachi | 356/1 |
| 5,018,218 | | 5/1991 | Peregrim et al. | 382/22 |
| 5,020,011 | * | 5/1991 | Stark et al. | 364/580 |
| 5,036,479 | * | 7/1991 | Prednis et al. | 371/22.4 |
| 5,311,428 | * | 5/1994 | Hayes et al. | 382/260 |
| 5,313,468 | * | 5/1994 | Hoshi et al. | 371/16.4 |
| 5,375,125 | * | 12/1994 | Oshima et al. | 395/183.22 |
| 5,564,012 | * | 10/1996 | Shigyo et al. | 395/182.3 |
| 5,602,990 | * | 2/1997 | Leete | 395/183.22 |

FOREIGN PATENT DOCUMENTS

| | | | |
|---|---|---|---|
| 0 450 525 | 10/1991 | (EP) | H04N/5/217 |
| 2 001 503A | 4/1979 | (GB) | H04N/1/38 |
| 2 014 015A | 8/1979 | (GB) | H04N/5/22 |
| 2 193 412A | 2/1988 | (GB) | H04N/9/093 |
| 2 254 217A | 9/1992 | (GB) | H04N/5/14 |
| 1 125 094 | 5/1989 | (JP) | H04N/17/00 |
| 88/02518A2 | 4/1988 | (WO) | G06F/15/70 |

OTHER PUBLICATIONS

Zimmerman, D.C. et al., "Sensor failure detection and isolation in flexible structures using system realization redundancy," *Journal of Guidance, Control, and Dynamics,* (May–Jun. 1993), vol. 16, Nr. 3, pp. 490–497.

Pratt, William K., *Digital Image Processing,* John Wiley & Sons, pp. 478–498.

* cited by examiner

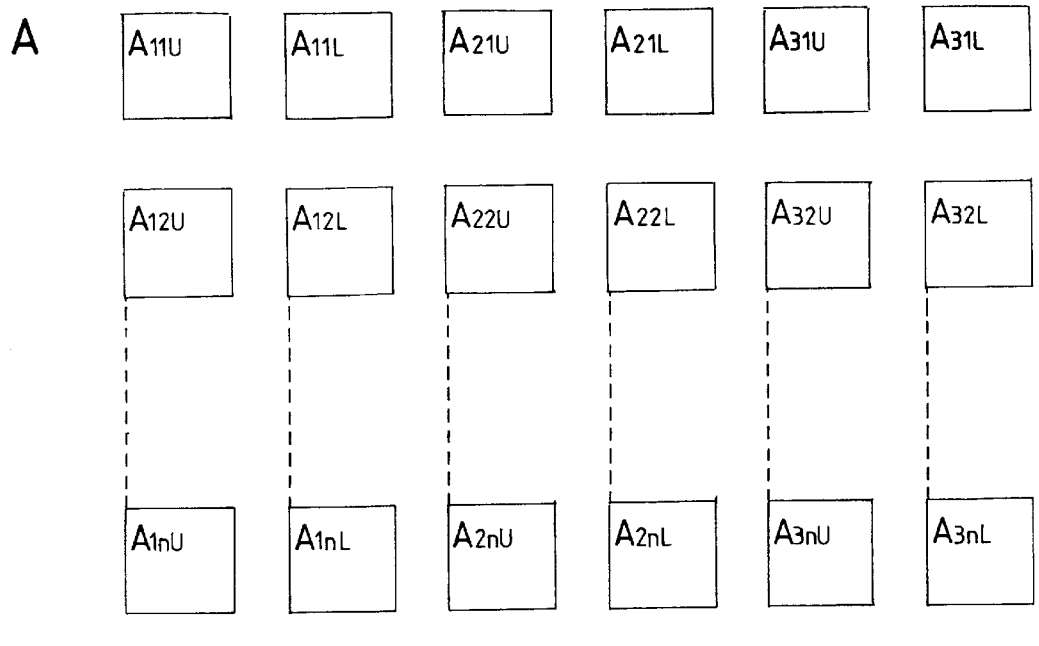
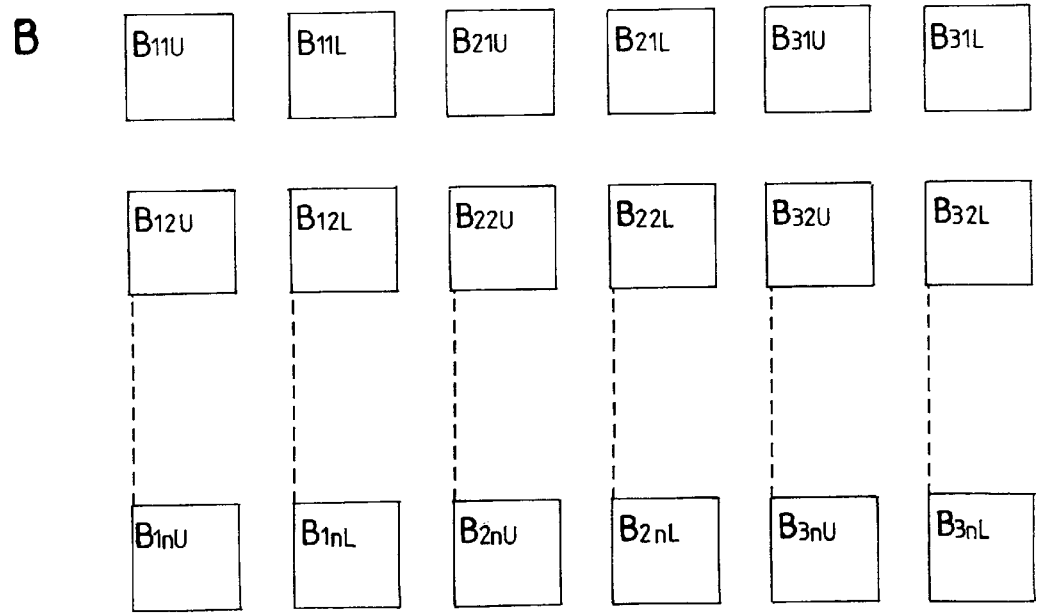
FIG. 6

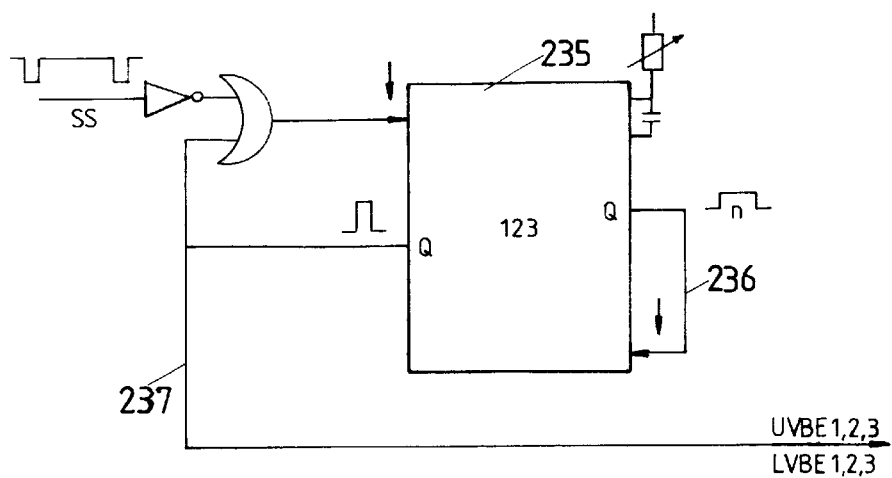
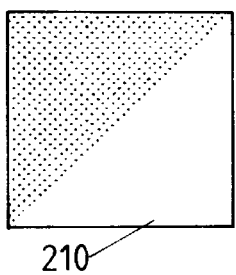
210
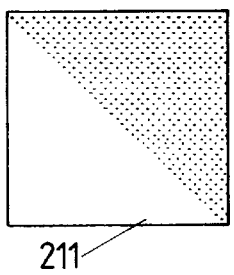
211
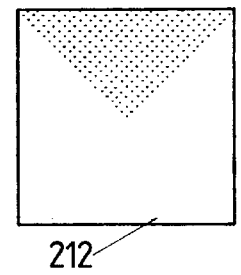
212
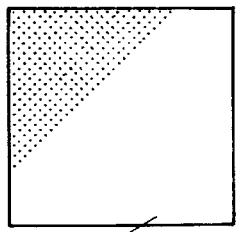
213
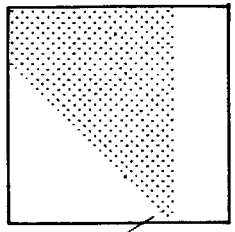
214
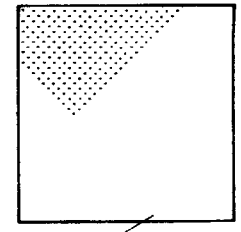
215
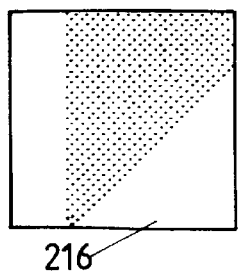
216
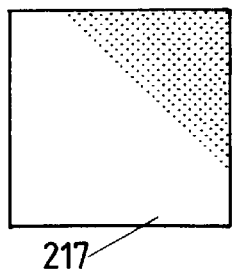
217
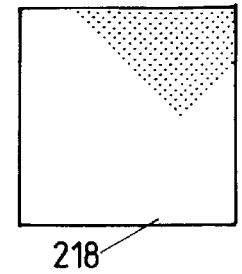
218
FIG. 15

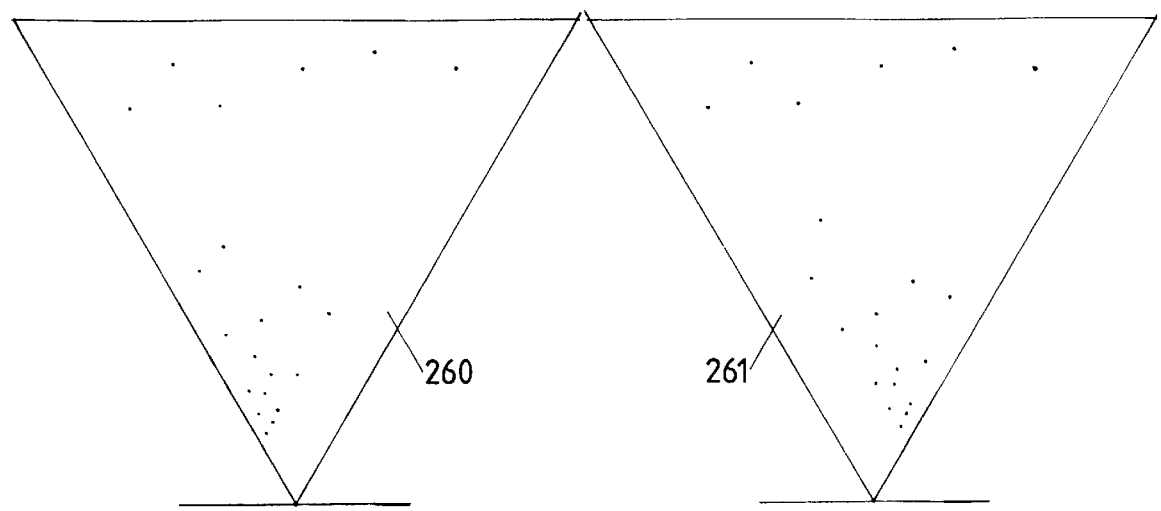
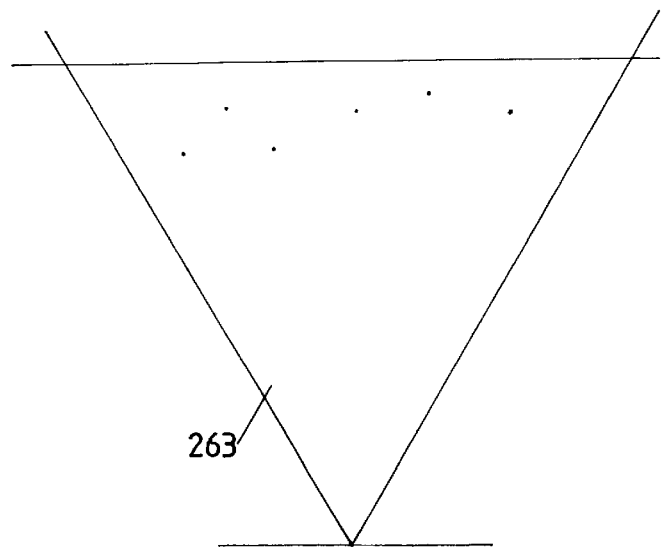
FIG. 17

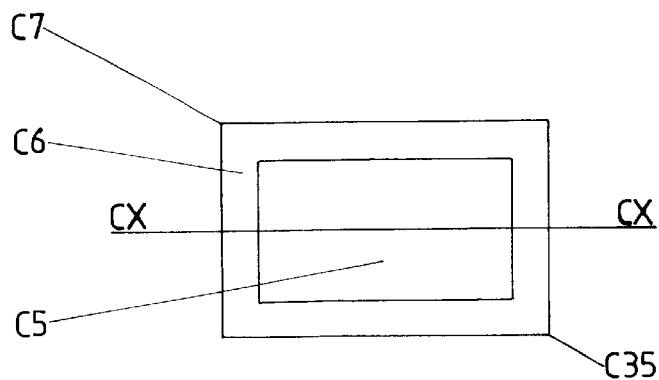
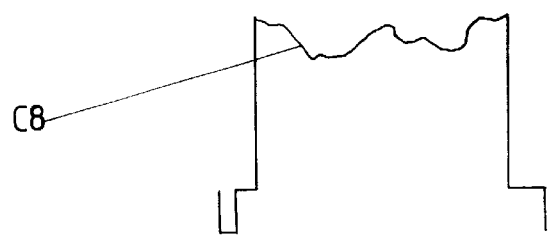
FIG. 27

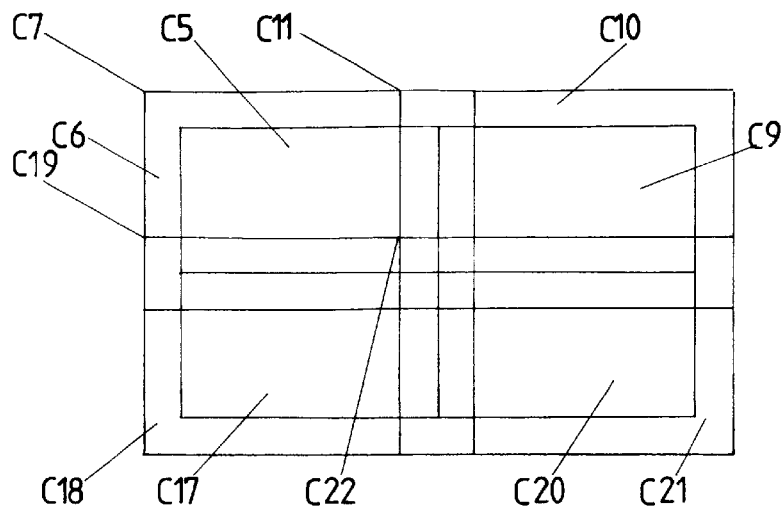
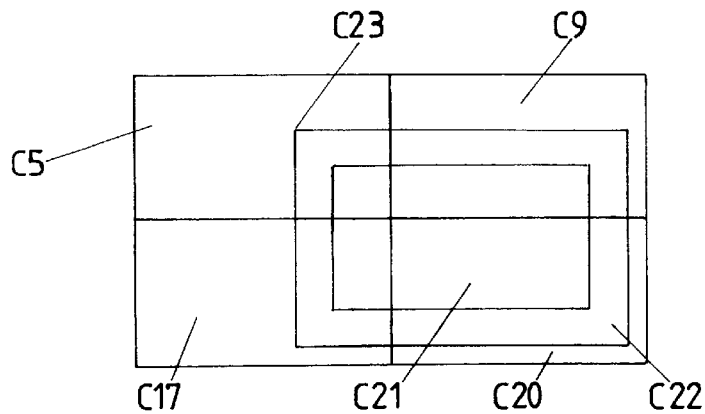
FIG. 29

TOPOGRAPHY PROCESSOR SYSTEM

TECHNICAL FIELD OF THE INVENTION

This invention relates to a topography processor system.

ANALYSIS OF BACKGROUND ART AND SUMMARY OF INVENTION

The advent of three dimensional optical mapping systems, based on correlated information from a phased array of image sensors (CCD or equivalent) sets new levels of complexity in system architecture design. This complexity poses considerable problems not only during experimental development and integration but also sets minimum diagnostic requirements for "first line" monitoring of a production equipment's status. The purpose of this invention is the combination of features namely, the architecture of a frame rate topography processor system, use only of such a system's sufficient control, data and address highways, and the introduction of end to end non interruptive graphic macro diagnostic techniques to allow "first line" system GO/NOGO decisions to be reached without the need for an extensive second layer microscopic BITE, or the use of additional external test equipments. These capabilities provide non interruptive visual, augmented visual or automatic visual diagnostic determination of correct end to end system internal parameter, or combined parameter performance characteristics.

The division between the embodiment of functionality in the hardware or software of an optical typography processing systems is dictated by the target applications required maximum real time response. Using frame stores and time dilation many systems take advantage of processors, operating within Von Neumann architectures, to identify vectors of particular attributes, and correlate such vectors between their different perspective images in the calculation of the system relative range to elements of topographical detail otherwise referred to as image detail range decompression.

Such systems benefit from the reliability of today's digital technology and the flexibility afforded by programming languages. The comfort afforded by high level software exacts a price for their inherent expansion factors in the serial execution speed of such processes, and the reduced visibility of the target machine process mapping, and therefore of its executed performance. Faster execution and visibility supported by low level software design alas remains a specialist domain in whose absence reliability and maintainability issues often arise.

For a modest system comprising three virtual imager systems with operating bandwidths of around 5 mHZ and utilising vectors of two different attributes, then it is arguable that for complete image detail range decompression at the image sensor frame rate, would necessitate vector intercepts to be calculated at an effective rate of around 300 mHZ. The latency of such processes embedded in software will currently generally considerably exceed that of a frame period. Diagnostic monitoring of software performance usually necessitates a combination of offline postmortem scrutiny, and or the use of monitoring by utility and trace systems. The information from such processes is generally microscopic and representative of implementation computational anomalies, or possible evidence of a failure in the passing of control or data. In any event the provision of diagnostic information, and or its recovery from a system introduces overheads to the target application, in respect of application non essential, or additional external equipments, and or in respect of the latency of their associated serial processing techniques which further takes the system out of its normal operational envelope, and almost certainly further away from frame rate execution.

The identification and rectification of hardware failures tends to fall into a hierarchy of approaches. Systems with integrated BITE start of day, or continuous BITE often allow at the "first line" timely identification of system malfunctions. The use of such techniques to identify GO/NOGO situations support high levels of overall system operability. At the "second line" intermediate level, equipments isolated from a system lend themselves to analysis by dedicated test equipments, and or board swapping to rectify failures. For localized functional anomalies, "third line" specialist monitoring at board level supports rectification of failed components.

Characteristic of all these techniques for both software and hardware is that they address microscopic detail in a system's performance, whose interpretation may provide evidence, in specific contexts, of the causal mechanisms for failure of macroscopic functionality. However many of the techniques tend to clinically isolate the functionality under scrutiny, and therefore isolate some faults from the operational envelope in which they occur. The purpose of non interruptive graphic macro diagnostics is to achieve through envelope testing, the rapid identification of system functional GO/NOGO indications enabling if necessary part, or whole system removal for "second" or "third line" testing.

For what may recently be considered as a complex system in which an interprocessor link supports 1000 parameters, optimistically, for process completion within a frame period, image detail range decompression processing systems need to process two to three orders of magnitude more data, realistically 300,000 parameters within the frame period. A topographical mapping system architecture described later capable of correlating all of the imaged generic pattern data within the frame period of a phased image sensor array, comprising a minimum of three virtual image sensors operating around 5 mHZ, has overall system data requirements in the order of 600 Million units (such systems tend to operate with mixed word lengths) of partitioned online RAM. An experimental implementation of an element of such a processing system comprising a single line scan processor necessitated some 60 Euro cards containing in all some 700 integrated circuits of which about 10% were VLSI and a guesstimated 20,000 pin to pin threads. To support continuous processing of data at the frame rate some 30 simultaneous parallel address processes, in support of the machines inherent multiple address capabilities, operate within each line scan processing element at the machine's clock rate.

Whilst physically such an experimental system lends itself technologically to miniaturization the complexity remains, and therefore also a clear requirement not only for the use of diagnostics in support of system development and integration, but also in support of the use of such production equipments. Whilst many systems benefit from a functionally integrated level of BITE allowing the stimulation and monitoring of system control and data threads, the introduction of a second layer of circuitry here poses immediate problems of scale. Further in practical terms the cost of such an integration for a "microscopic" diagnostic capability suggests a different approach to GO/NOGO system integrity is better sought, allowing the development of cheaper special to type "second" and "third line" test equipments.

Optical topography processor systems are by nature concerned with imaged data, which we (humans) can quickly asses. In the context of diagnostics, graphic macro diagnostics allow such human visual, or augmented visual macroscopic assessment of end to end internal system performance, or the automatic assessment of system performance based on such visual patterns.

For a topography processor system operating synchronously at the frame rate of an image sensor, advantage may be taken of a graphic macro diagnostic capability in the analysis of internal as well as overall system performance characteristics. Equally for such a system with internal asynchronous functionality, executing and completing within a frame period, then for a defined apriori system drive such asynchronous functionality may also be considered to be operating in a synchronous fashion, and therefore also lends itself to the same graphic macro diagnostics techniques. An example of an analogous capability is the television test card where macroscopic assessment of the overall end to end performance of an equipment can be easily made using only the functionality of the equipment under test, and of course the assumed integrity of the broadcast test picture. Topographical mapping systems, particularly those employing general purpose processors to effect range decompression of image detail, generally allow display monitoring of the imaged scenario, but thereafter time dilated processing of imaged data tends towards asynchronous manipulation of binary representations of the imaged scenario. The reconstitution and display of meaningful images in such a system, particularly of intermediate process results, necessitates interruptive system processing if only to allow sufficient serial processing time for the generation of what may often only be a snapshot.

For a frame rate topography processor system as outlined above, a variety of possibilities exist to monitor non interruptively system internal and overall performance characteristics utilising the hardware dedicated to the system's prime functionality. This may be achieved by mixing process parameters with appropriate frame and line sync in the generation of graphic macro diagnostic information for display on the system's prime display. This can include all stages of the system's processes, end to end, from imaged scenario and field of regard scanning assessment and calibration, through to performance of image thread processing, input of compressed data to partitioned input stacks where the asynchronous write enable commands and digit output of stack pointers generate graphic macro diagnostic indications of processor input performance and address integrity for each channel of the system. Further the correlation of imaged information in the calculation of vector intercepts for pairs of channels and specific vector attributes are equally inherently available at the frame rate, for visual monitoring, for each of the various continuous parallel processors. The further characteristics of line processor iteration rates, and the rates of line process completion also lend themselves to graphic macro diagnostic analysis. Intermediate computation results of multiple address transform processes defining vector pair intercepts are similarly monitorable. The combination of vector pair intercepts in the generation of each line processor's parallel frame rate output of the system scenario data base is similarly possible.

Various possibilities exist to contrive particular visual patterns, sets (discontinuous in time) of sets of data continuous in time, in the stimulation of such a system, whereby aspects of the systems performance represented by their associated graphic macro diagnostic response, sets (discontinuous in time) of sets of data continuous in time, may be monitored. It is clearly a function of the various system transfer functions and the definition of the stimulation data sets, as to the form of the graphic diagnostic response. Consideration of particular system transfer functions and a suitably appropriate definition of stimulation data sets, support the ergonomic definition of graphic diagnostic visual response patterns. Where the response pattern data of particular system parameters makes ergonomic design difficult, augmented visual diagnostic responses may be employed. Here for an apriori stimulation, display of the difference or error graphical macro diagnostic response indicating departure from the system anticipated response may be generated. Referring back to the analogy of the television test card, such a display could in the case of a television indicate those parts of the television's transfer characteristics which fall outside the anticipated performance specification. The techniques further do not restrict themselves to the monitoring of single parameters but allow, for an apriori system drive, the simultaneous monitoring of for example complete address generation through the use of transform processors permitting the display of again an error or difference signal.

A number of different approaches support the generation of time distributed image pattern data, sets (discontinuous in time) of sets of data continuous in time, in support of the graphic macro diagnostic monitoring of system internal process performance characteristics. One technique would be to physically introduce into the system's image sensor optical systems graphical images (perhaps photographs of the real world) of the different perspectives of the individual imagers comprising the phased array, or to introduce separate video recordings of such images into the output channels of the image sensors. In the former case some host environments would not necessarily lend themselves to the mechanical interference associated with the introduction of physical images into the imagers optical systems. In the latter case the accurate external dynamic control of a video recorder's frame and line sync generation non interruptively in sympathy with the system's video syncing demands, unlike that of an image sensor, pose considerable problems.

It is suggested that for a frame rate topographical mapping system including the type described later that the introduction of minimal non interruptive hardware to effect system stimulation and system diagnostic response monitoring fed to the system video mixer can support a comprehensive range of system GO/NOGO integrity checks. In particular a differential binary event generator permits stimulation of the topography processor system under manual or automatic control where the time relative generation of such binary events (vectors) between the processor's binary event input channels allows the simulation of three dimensional spacial reference points enabling manual system end to end confidence checks to be made. Further visual, augmented visual or automatic visual system integrity checks may be made for apriori three dimensional reference points, implied by specific differential vectors, injected into the system where each stage of their processing generates determinable results for comparison allowing in addition to static system integrity checks, the further assessment of the system's dynamic response characteristics. Extended analysis of other design aspects for example the integrity of internal address generation may be made by switching on line a variety of identity transform processors whose differing transform characteristics allow the visual, augmented visual or automatic isolation of system functional or component anomalies, whilst non interruptively preserving the overall integrity of the system's end to end architecture.

The example of a frame rate generic pattern derived topography processor used in the main line description is based on the premise that for a group of three or more image sensors whose fields of view share a common scenario, then within this common scenario the spacial position of an element of topographical detail is represented by a unique multiple vector intersection comprising one vector from each image sensor. In particular and simplifying the problem then for a group of three or more logically and physically aligned image sensors gaining separate perspective views of the same scenario, such that common scenario image detail is contrived to register in corresponding line scans of each of the image sensors in the group, then if sets of data elements having similar attributes, excepting their position within a particular line scan and which data may further be considered as representative of vectors from their host image sensor to elemental scenario detail, can be identified from each image sensor's composite video signal then the association between such vectors, contained within sets of vectors from a particular image sensor with vectors contained in similar sets from the other image sensors, can be made by considering all possible combinations of vectors between such sets of sets, including one from each image sensor, where the existence of combinations of such vectors having a common multiple and real intersection resolves the generic pattern recognition problems of vector association and the spacial positioning of the topographical detail in the observed scenario.

A system architecture and processes capable of supporting such frame rate generic pattern recognition, that is vector identification and association whereby the spacial resolution between members of sets of sets of such vectors, fundamental to automatic topographical mapping of this kind, may be described by considering three distinct areas of functionality which may in practice constitute sub systems.

Firstly a sub system comprising a minimum number of three image sensors organised as a phased image sensor array, in which the image sensors can be slaved to give different perspective views of a common scenario and where the position and orientation of each image sensor is such that the boresights of their individual fields of view are parallel, and common image detail is registered in corresponding line scans of each of the image sensors, that is at common angles of elevation within each image sensors respective field of view, and where frame and line sync signals of all the image sensors respective composite video signals have correspondence in time.

Depending on the nature of the application such a system should include the possibility of a scanner allowing electronic as well as mechanical scanning of the scenario by the image sensors for three main reasons, firstly to achieve angular resolutions of less than 50 micro radians and the ranging possibilities afforded by such resolution, the angular positioning of such a system does not lend itself entirely to mechanical slaving. One aspect therefore of electronic slaving is to allow controlled slaving to these accuracies, secondly the field of view at such resolution for a single sensor is small therefore scanning allows a practical field of regard to be employed, thirdly the nature of this type of ranging from aligned image sensors is such that sets of vector pair intersections are parabolic and logarithmic in nature, and therefore a rotation of the field of view allows better range discrimination particularly at extreme ranges.

Secondly a sub system comprising an image pattern thread processor or equivalent capable for each image sensor, comprising the phased image sensor array, of simultaneously and in real time processing the composite video signal generated by each such image sensor to extract sets of vectors with specific attributes between these image sensors, and further time log the occurrence of all such vectors partitioned by image sensor, attribute, and line scan (elevation angle within the image sensor field of view) so identifying their position within the line scan (azimuth angle within the image sensor field of view). No limit is set on the number of different vector attributes to be identified, nor on the partitioning of such sets necessary to support real time computation in the processing sub system.

Thirdly a processing sub system is necessary capable of calculating within the frame period the existence of all possible real and virtual vector intersections necessary to identify multiple common and real intercepts, including one vector from each image sensor, in resolving the vector association and spacial positioning of the scenarios topographical detail. To achieve the effective processing rates necessary to resolve all possible multiple intersections of unassociated vectors which have been automatically selected according to a particular attribute from a number of image sensors composite video signals in real time, and thereby resolve the association of members of such sets of sets of vectors between image sensors requires a processor architecture supporting partitioned and parallel processing. Further a requirement exists to automatically synthesise, and again in parallel, the identities of all possible combinations of pairs of vectors between image sensors, each such pair comprising a vector taken from a set of vectors considered as from a reference image sensor and a vector taken from each of the sets of sets of vectors of similar attributes for each of the other image sensors. For the pairs of vector identities so synthesised and in parallel the architecture also requires an effective multiple address capability which allows the vector pair identities to synthesise the identity of the solutions to complex mathematical processes, where the finite apriori knowledge concerning the existence of possible vector intersections or other processes, permits the definition of identity transforms representing the result of such processes on particular pairs of identities, that is a capability to synthesise a third identity from a particular pair of identities. A multiple address capability in the conventional sense allows information being processed to be moved from the contents of one address to the contents of another address, here the data of the input operands submitted for processing is implicit in their combined address identity and the process transforms this identity to produce a result implicit as a third identity. The identity transforms should be capable of multiple parallel operation to process other simultaneously synthesised vector identity pairs from other sets of sets of vectors, or to address a necessary precision or aspect of a particular transform. Such transforms should also be capable of being cascaded to allow the interaction of other variables or results of previous transforms.

The final identities from a single, parallel or cascaded transform process or processes forms the address identity for an ordered vector pair intersection buffer into which the binary existence of a process result may be written, one such buffer being dedicated to each pair of sets of vectors. In this way simultaneous vector pair intersections can be synthesised within the effective multiple addressing time. By synchronous parallel reading of sets of ordered vector pair intersection buffers the simultaneous event of the existence of a real vector intersection being read from each of the dedicated buffers comprising a set, satisfies the multiple vector intersection premise for determining the spacial position of an element of topographical detail.

It is possible to identify specific aspects of such system's infrastructure, which generally support the previously outlined frame rate range decompression of imaged detail.

Outside of the main line description of an example of a topography processor system, a number of sub system descriptions are included which amplify these and other aspects of technologies employed. These examples generally include elements of generic functionality already introduced but configured so as to isolate the aspect of technology under discussion. A further example of an image detail range decompression system, is described, with largely asynchronous characteristics but which may in some modes of operation, also be considered as a synchronous system and therefore capable of supporting the macro diagnostic analysis.

Further detailed descriptions are also included of certain other aspects of sub system functionality, these include an example of a phased image sensor array, such an array is necessary in supporting simultaneous correlation of differing perspective images. Similarly virtual image sensors which support the rapid and accurate electronic positioning of the sensed image field of view boresight are also described in some detail. For some operating environments three axis stabilisation of image sensor boresights is essential, and a further detailed description in included for compatible electronic functionality to provide this. Finally an image pattern thread processor is also separately described in some detail, such functionality is capable of identifying vectors of particular and different attributes at an image sensor's data rate.

An example of an iterative subset pattern derived topography processor with largely asynchronous process characteristics is included in the text, not least for comparative analysis, but also for its own variation of a data rate range processor. This subsystem is based on the premise that the visual information registered in a line scan of an image sensor may be considered as a set of subset patterns. Each subset pattern comprises a set of pattern elements, where such a set of pattern elements represents a sectioned element of topographical detail in the observed scenario. The set, comprising every line scan in a frame, of sets of subset patterns, contained in each line scan, is the set of all the imaged topographical detail.

For two similar image sensors of known separation and orientation whose fields of view share a common scenario and where common image detail is contrived to register in corresponding line scans of both image sensors, then from their different perspectives the spacial position of elements of topographical detail within the common scenario is determined by the image sensors fields of view boresight relative azimuth and elevation angles of unique pairs of pattern elements, one from each image sensor contained within associated subset patterns.

For the image sensor pair and scenario described above the position and definition of the subset patterns contained within line scans of each image sensor will vary according to the geometry of the scenario and relative position and orientation of each image sensor.

The automatic identification from one image sensor of pattern elements comprising subset patterns, without recourse to models of potential patterns, and the further correlation of members of sets of such subset patterns once identified with members of sets of subset patterns determined by the perspective of the other image sensor poses a number of problems.

This sub system addresses the strategies for the identification of subset patterns from one image sensor, and the correlation of members of these subset patterns with members of associated subset patterns from the other image sensor.

Image detail contained within the luminance signal from an image sensor may be considered to be partitioned or punctuated by the binary events comprising the output of an image pattern thread processor capable of providing pattern outline and relief contour detail of an observed scenario in real time. The binary events correspond to luminance signal frequency excursions through preset upper or lower frequency limits.

If pairs of sets comprising luminance signal elements with the differing attributes amplitude and time differential, characterising in each set unassociated pattern elements, are generated in real time for each line scan for each of the two image sensors then such sets may further be partitioned into subsets, characterising subset patterns, where for a particular image sensor, and line scan a new pair of subset patterns, one for each luminance attribute, is initiated by the occurrence of a luminance frequency excursion through a preset upper or lower frequency limit. Such pairs of subset patterns each comprising sets of elements of a particular and different luminance attribute from one image sensor may be compared with corresponding sets of pairs of such subset patterns (same line scan, same start criterion upper or lower frequency excursion event, and same luminance attribute amplitude or time differential) from the other image sensor. The number of elements considered for comparison between subset patterns is limited by the minimum number of members of either subset pattern considered for comparison.

For the two image sensors, as described previously and where the boresights of their respective fields of view are parallel and where their frame and line sync generation is controlled such that time coincidence exists between the characteristics of these signals between image sensors then a subset pattern from the common scenario registered by both image sensors will exist for the right hand image sensor with time coincidence or earlier in a frame's line scan than the corresponding associated subset pattern for the left hand image sensor.

For a dual image sensor scenario as outlined above the premise on which this method is based is that given a criterion by which subset patterns may be identified then for combinations of potentially similar (same start criterion frequency excursion event through upper set frequency limit or (exclusive) lower set frequency limit) subset patterns synthesised for corresponding line scans from both image sensors then for the multiple condition of pairs of pairs of subset patterns having equality (to a given precision) between corresponding luminance amplitude members from one pair of subset patterns and equality (to a given precision) between luminance time differential members from the other pair of subset patterns then a reasoned degree of probability exists that such members between such pairs of subset patterns between both image sensors represent unique vectors having an intersection at an element of topographical detail in the real world.

The system relative spacial position of such an element of associated topographical detail may be determined since the slant range is resolvable as a function of such members normally defined azimuth angles within each image sensors field of view. For slant ranges so calculated the system boresight relative height of the element of topographical detail is determined as a function of such members line in frame that is the common elevation angle of the members within the image sensors fields of view.

A variety of possibilities exist to iteratively generate combinations of pairs of pairs of subset patterns between image sensors to allow comparison between pairs of subset pattern members of the same attribute in real time.

Having identified the subset patterns in real time for both image sensors and passed such information of their partitioned data sets to an external computer system during one frame period, synthesis of subset pattern combinations and iterative comparison of their members may be made by software during the subsequent frame period.

For image sensors with time coincidence of their frame and line sync generation, hardware comparison of pairs of pairs of subset patterns may be made in real time between combinations of pairs of pairs of subset patterns synthesised by the iterative (on an inter frame basis) relative mechanical slaving in azimuth of the image sensors fields of view such that an effective relative sweep of the observed scenario by one image sensor's field of view in relation to the other image sensor's field of view brings time correspondence between particular and different pairs of pairs of subset patterns contained within corresponding line scans of the two image sensors.

For image sensors whose fields of view boresights are fixed and where their frame and line sync characteristics have default time coincidence then the iterative, on an inter frame basis, time relative shifting of frame and line sync separation between image sensors (effective time advance of the lefthand image sensor's sync in relation to the righthand image sensor sync) over a maximum of one line scans luminance period will also synthesise combinations of pairs of pairs of subset patterns with time coincidence between the image sensors so allowing real time hardware comparison of such pairs of pairs of subset patterns between image sensors.

Co-operatively slaveable phased virtual image sensor arrays feature in both topography processing systems described here. They support applications requiring that image sensors CCD or equivalent be logically and physically positioned and oriented, such that they generate different perspective views of a common scenario, and that common image detail is registered in corresponding line scans of all such image sensors in the array, and further that the frame and line sync generation by all such image sensors has time coincidence.

It may, for such sub systems, further be required by some applications for the image sensors in such an array to accurately slave their respective fields of view to a different but still common scenario, or for the image sensors of such an array to perform an accurate and co-operatively synchronised scan of a common field of regard. Whilst mechanical slaving of image sensors may satisfy some requirements virtual image sensors support the fast and accurate positioning of their fields of view, and allows controlled accurate electronic coordinated and synchronised scanning between sensors. For all such requirements the image information from such a multiple image sensor system may need to be passed to an external processing system.

The use of virtual image sensors is also discussed in more detail later in the text, these allow the electronic positioning of an image sensor's field of view, which need arises primarily because of the necessary field of view boresight pointing angle accuracies and slew rates required in image correlation systems, this is unachievable solely from mechanical systems.

Image sensors CCD or equivalent are limited for a particular magnification to a specific field of view. For image sensors which are capable of mechanical slaving in azimuth or elevation, the envelope of the image sensor's field of view is referred to as the image sensor's field of regard.

A virtual image sensor extracts subsets of luminance signals from an array of appropriately positioned, orientated and synchronised image sensors, where by combining these luminance subsets with appropriate frame and line sync information the composite video signal so formed allows the real time generation of an image from components of images afforded by the array of image sensors, whose adjoining fields of view support the virtual sensor's field of regard equivalent to that of their combined fields of view, and where the field of view of the virtual image sensor is equivalent to that of the field of view of one of the image sensors comprising the array.

Some applications exist where the appropriate positioning of static image sensors in such an array covering for example 360 degrees allows simultaneous multiple fields of view possibilities not achievable from a single movable image sensor, nor from an array of static image sensors not comprising such a virtual image sensor. Further the electronic positioning of the virtual image sensor's field of view within its field of regard can be made faster and more accurately than is possible with a mechanical system.

Historically, stable platforms have been achieved through mechanical or electromechanical functionality. In the context of image sensors such methods of stabilization cannot offer the rate and positional accuracies achievable through electronic stabilization. This aspect of functionality is also addressed later in some detail. The roll pitch and yaw rates for such a system may be derived from traditional sensors or from software tracking of pattern thread motion possible with image sensors.

Such a sub system is capable of real time operation within the context of the frame rate of such an image sensor where the data latency of the stabilized data is one frame period. This sub system depends on the ability to store image data, contained in the composite video signal from an image sensor, in a memory where the address for each pixel of information is generated at the maximum bandwidth frequency of the image sensor and is corrected in real time to account for roll, pitch and yaw displacements of the image sensor.

Such a sub system is capable of image derotation traditionally performed by mirrors, but is also intended for example to allow for distributed image sensor systems in which some components may be cantilevered out and where such components may be subject to local vibrational and bending moment effects of the structure as well as the motion of the entire system. In particular the sub system provides compatible functionality with the topography processors, though it necessitates a coordinated integration of the inverse functionality (as described in this particular sub system description) across the multiple associated component level CCD or equivalent sensors comprising a virtual image sensor, if the frame period data latency is to be avoided.

Image sensors CCD or equivalent, typically with operating bandwidths of 5 mhz or greater, generate on a continuous basis considerable volumes of data. Analogue to digital converters are becoming increasingly faster making real time input of data from such devices, used as front end sensors, to computer processing systems a reality. However the software task of real time data reduction to extract important image pattern thread information, particularly when the images relate to a dynamic scenario, presents a considerable processing load to any computer. Many applications could benefit from hardware data reduction techniques which improves the image pattern thread information to data ratio of the input from such image sensors to computer systems. A more detailed consideration of such functionality employed in the topography processor system, is also addressed later in the text.

The image pattern thread information contained in the composite video signal of an image sensor is generally contained in the upper region of the image sensor bandwidth, and spectral analysis or equivalent processing of this signal yields the binary event information of elements of image pattern threads.

The position within a CCD raster scan, that is within the field of view of the image sensor, of the occurrence of such binary events is also determinable. Both the binary event information and event identities may be input to a computer system, the binary event data as an image mapped array, whilst the binary event identification lends itself to data compression techniques allowing partitioned (on the basis of line scan and attribute) lists of data to be formed further expediting the subsequent analysis of such data by other processing systems. Double buffering of memories used to pass such data to an external processing system allows, on a frame basis, a continuous throughput of data.

Visibility of the output of the image pattern thread processor is possible by the display of a composite video signal synthesised by the real time combination of the binary event signal with current stripped frame and line sync information from the image sensor.

The present invention is primarily as defined in the claims, but also relates to the problems and solutions discussed above.

According to the current invention, in its first aspect there is provided a topography processor system comprising a phased image sensor array, at least one processor arranged to perform range decompression of imaged detail, and a means for allowing non interruptive graphic macro diagnosis based on a graphic display of the frame rate macroscopic behaviour of internal transfer functions of the system to permit visual, augmented visual or automatic visual determination of the system's integrity.

The present invention provides in a further aspect a real time generic pattern derived topography processor comprising, three or more image sensors, CCD or equivalent, of defined separation, orientation and synchronisation organised as a phased image sensor array where their fields of view share a common scenario, and one or more processors capable of processing the image sensors composite video signals to identify and associate binary elements of generic patterns between all image sensors in the phased image sensor array thereby resolving the system relative spacial position of topographical detail implicit in such correlated generic patterns.

The present invention provides in a yet further aspect an iterative subset pattern derived topography processor comprising, two similar image sensors, CCD or equivalent, of defined position orientation and relative frame and line synchronisation whose fields of view share a common scenario, and a processor or processors capable of the iterative synthesis of combinations of, and real time comparison of, subset patterns between sets of such subset patterns derived from the two image sensors composite video signals, where the multiple correlation of such subset patterns members between image sensors allows the system relative spacial position of their associated elements of topographical detail to be fixed in real time from apriori knowledge.

The present invention provides in a still further aspect a cooperatively slavable phased virtual image sensor array comprising a number of equivalent virtual image sensors, logically and physically positioned and orientated, and where the boresights of their respective fields of view are parallel and such that they generate images of a common scenario from their different perspectives, and where common image detail is registered in corresponding line scans for each such virtual image sensor, and where the frame and line sync generation for each such virtual image sensor is controlled such that a time coincidence exists between the characteristics of these signals, and where each such virtual image sensor's field of view may be slaved or scan in a controlled coordinated and synchronised fashion such as to preserve the differing perspective views of a common scenario within their shared field of regard, and where such image information may be passed to an external processor system The present invention provides in a still yet further aspect a virtual image sensor comprising a number of similar image sensors organised in an array, where the logical and physical position and orientation of each such image sensor in the array is such that their individual fields of view may be considered collectively to cover a continuous scenario comprising the individual images from each image sensor, and where it is possible to generate in real time a virtual image sensor image from components of images from one or more adjoining image sensors in the array such that the field of view of the virtual image sensor is equivalent to the field of view of any image sensor in the array and where the field of regard of the virtual image sensor comprises the individual fields of view of the image sensors in the array.

The present invention provides in a still yet further aspect an electronically stabilized image sensor comprising a memory buffering system which permits three axis positional correction of image sensor image data in real time where such data is stored address corrected as a function of the image sensor's motion, achieved through cascaded address transformation techniques, in memories during one frame period such that during the subsequent frame period the image data may be read sequentially to provide a stable platform equivalent image sensor output where double buffering of the memories used allows for continuous throughput of image data.

The present invention provides in a still yet further aspect an image pattern thread processor capable of the real time extraction of important image pattern thread information from the composite video signal of an image sensor, CCD or equivalent, comprising a luminance signal spectral analyser or equivalent capable of identifying image pattern outline and relief contour detail derived from luminance signal frequency excursions transiting through a preset upper frequency limit or falling below a preset lower frequency limit where such events generate in real time a binary event signal and an associated identity for each such event and where such information may be passed to a further processing or display system.

BRIEF DESCRIPTION OF THE DRAWINGS

A specific embodiment of the invention will now be described by way of example with reference to the accompanying drawings in which:—

FIG. 6 shows representation of image sensor, line scan, and vector attribute partitioned stacks.

FIG. 15 shows a schematic organisation of a variable frequency binary event simulator and examples of logarithmic displays of vector intercepts.

FIG. 17 shows simplified line scan display of vector pair intercepts and scenario three dimensional data base output.

FIG. 27 shows a representation of the time distribution of information within a frame of composite video from an image sensor.

FIG. 29 shows a representation of the necessary time distribution of information within four frames of composite video from four aligned and synchronised image sensors capable of supporting virtual image sensor subsets in azimuth and elevation.

DETAILED DESCRIPTION OF THE INVENTION

The example of a frame rate generic pattern derived topography processor described here is supported by an architecture which permits the real time three dimensional topographical analysis of a scenario imaged by three virtual image sensors, CCD or equivalent, organised as a phased virtual image sensor array, in which the virtual image sensors fields of view co-operatively and synchronously scan a field of regard. The composite video generated by the virtual image sensors, of real world differing perspective views of the same scenario is fed into a composite video processor comprising image pattern thread processors capable of the real time identification and extraction of data elements with particular and different attributes and which data is also representative of discrete vectors from each virtual image sensor to elemental detail in the observed scenario. For vectors so identified identities are assigned and these are passed to assigned input stacks of the topography processor whose partitioned, parallel and dynamically configurable architecture and identity combination synthesisers and identity transform processors are capable of supporting the computation of the existence of common multiple vector intercepts one from each virtual image sensor from all combinations of vectors contained within sets of sets of such vectors having common attributes. The existence of real common multiple vector intercepts comprising one vector from each virtual image sensor resolves the association between vectors from different virtual image sensors comprising the phased virtual image sensor array and the spacial position of topographical detail in the observed scenario.

Figure 1:
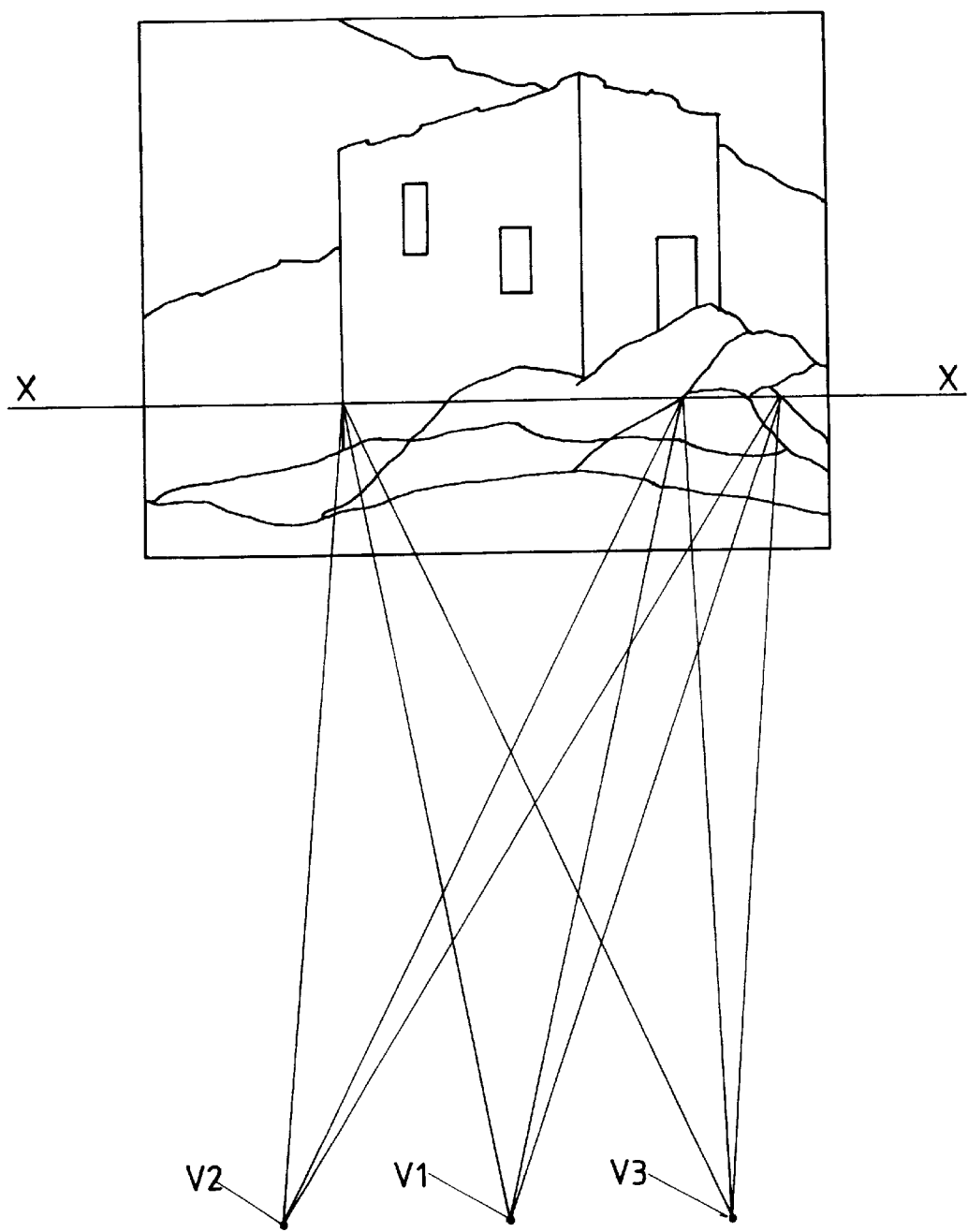
FIG. 1 shows a simplified combined luminance upper and lower frequency excursion event image with time slice XX phased image sensor array vector output for lower limit frequency excursions events.

The mainline Topography processor system description relates exclusively to FIGS. 1–17 of the drawing, subsequent text and figures amplify aspects of the technologies employed using much of the generic functionality and signals described here. With reference to FIG. 1 a simplified (two dimensional) picture of a real world scenario as seen by the phased image sensor array comprising three virtual image sensors V1, V2, V3. The image represents a combined upper and lower frequency excursion event image of the scenario as seen from each virtual image sensor's perspective. The vectors indicated from each virtual image sensor position shows, for the time slice XX, the triple vector intersections for vectors identified from luminance frequency excursions through a lower limit.

Figure 2:
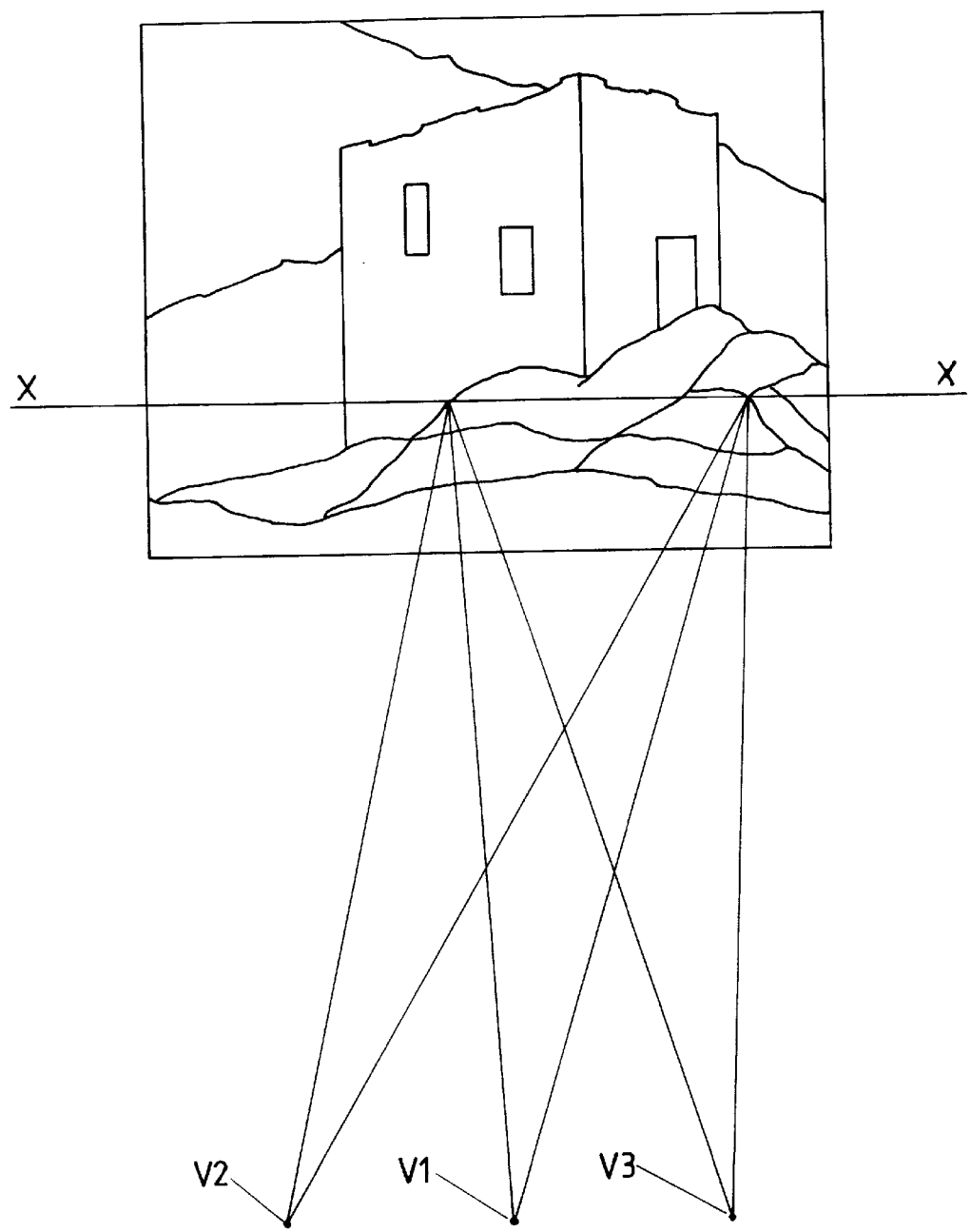
FIG. 2 shows a simplified combined luminance upper and lower frequency excursion event image showing for time slice XX phased image sensor array vector output for upper limit frequency excursions events.

With reference to FIG. 2 the same scenario is shown as in FIG. 1 where for the same time slice XX the triple vector intercepts are for vectors identified from luminance frequency excursions through an upper limit.

Figure 3:
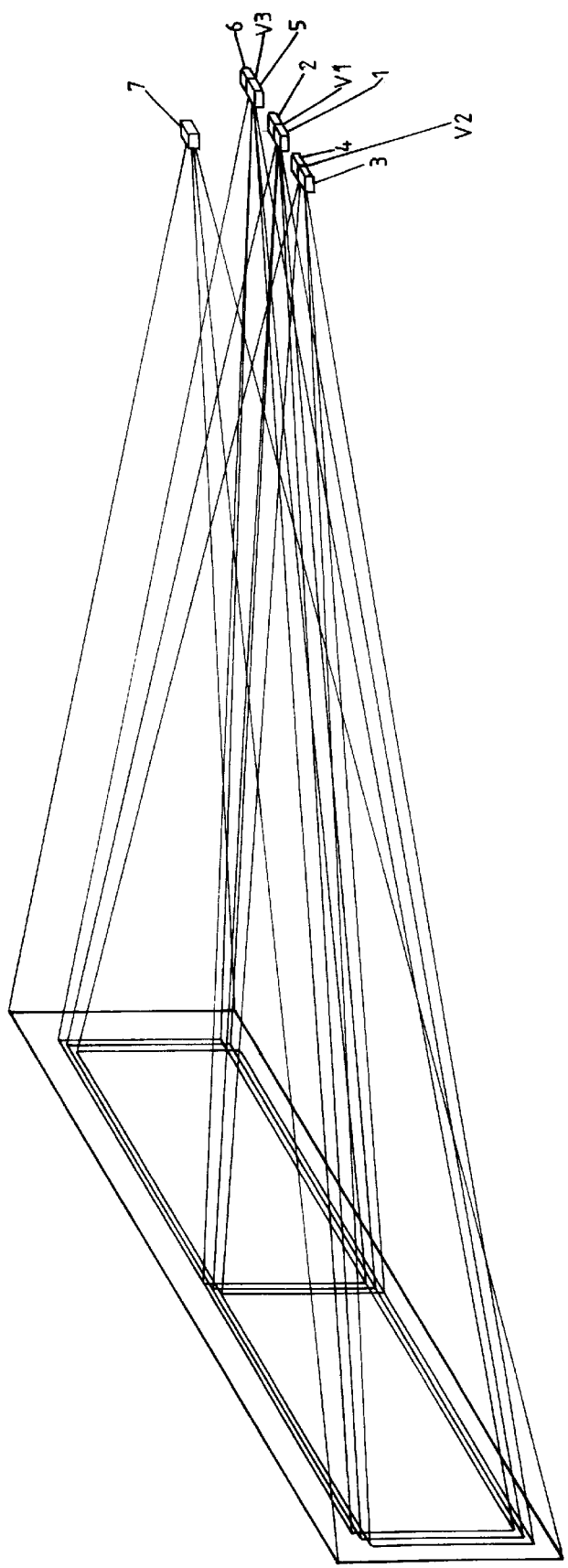
FIG. 3 shows phased image sensor array comprising three virtual image sensors and wide angle operators image sensor.

With reference to FIG. 3 the phased virtual image sensor array is shown comprising three virtual image sensors V1, V2, V3 each comprising two image sensors 1 and 2, 3 and 4, and 5 and 6 respectively. Each pair of image sensors comprising a virtual image sensor is positioned, aligned and synchronised such that the boresights of each of their fields of regard is parallel and that a common scenario is observed between the virtual image sensors and common image detail of the scenario is registered in corresponding line scans of each virtual image sensor and where further time coincidence exists between the characteristics of the frame and line sync signals of each of the virtual image sensors. A wide angle image sensor 7 with overall view of the scenario allows the field of regard of the phased virtual image sensor array to be positioned.

Figure 4:
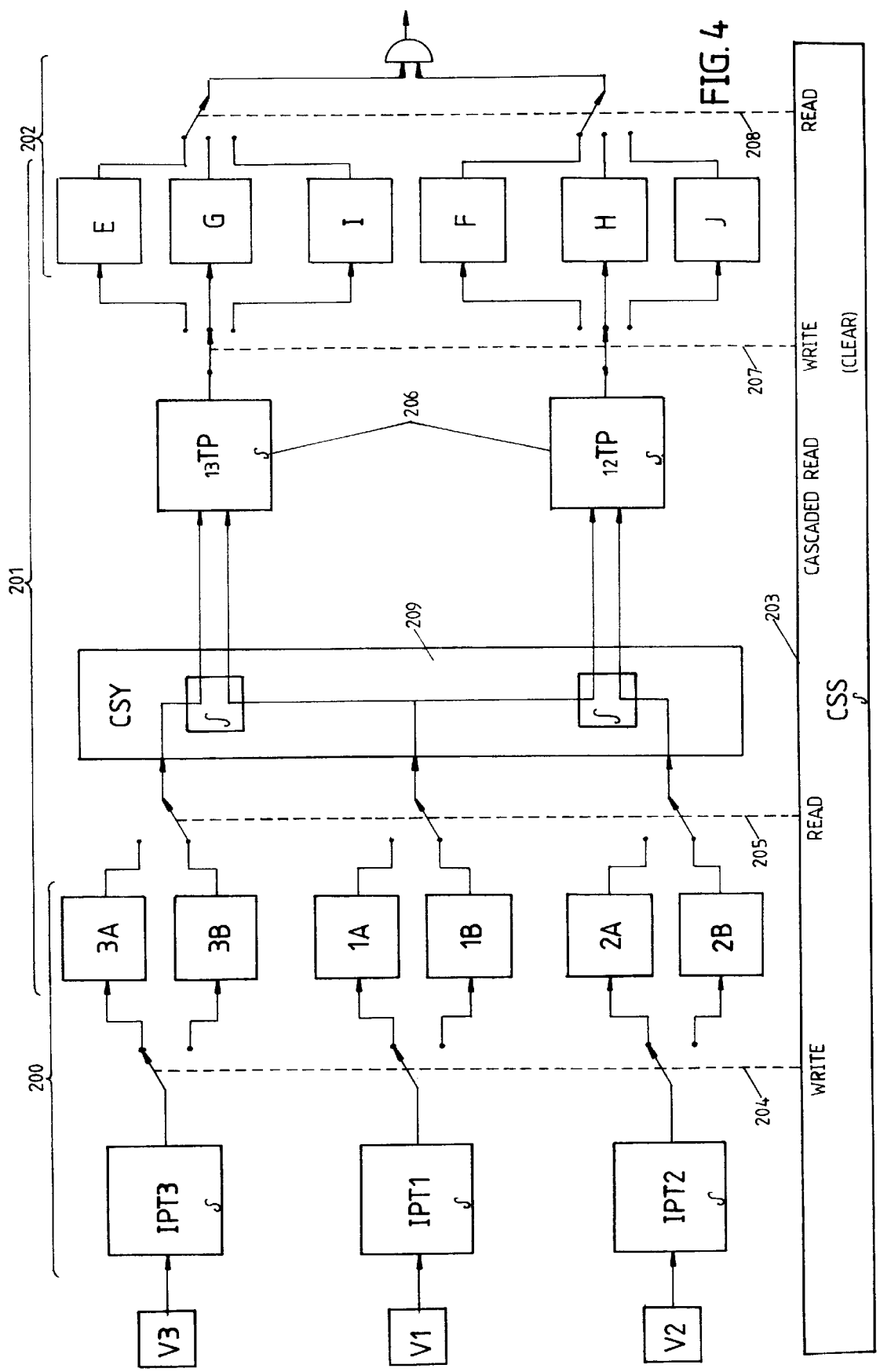
FIG. 4 shows simplified schematic of information flow in processing of single line scan of vectors of one attribute between three image sensors.

Referring to FIG. 4 which shows a simplified system schematic of a single vector attribute single line scan processing element comprising a number of identifiable sub systems including:

A data input sub system 200 comprising three virtual image sensors V1, V2, and V3 organised as a co-operatively slaveable phased virtual image sensor array which can electronically slave the fields of view of the virtual image sensors across a common scenario maintaining their different perspective views. Composite video from the virtual image sensors is fed to image pattern thread processors IPT1, IPT2, IPT3 which generate sets, per virtual image sensor, of sets, per line scan, of sets of vectors having similar attributes which are stored in physically and logically partitioned high speed double buffered hardware stacks, where for a particular line scan and vector attribute one set 1A, 1B, 2A, 2B, 3A, 3B respectively is shown here.

A processing sub system 201 comprising a number of line scan processors (only one shown) organised in parallel and each performing multiple parallel hardware interstack vector identity combination synthesis in the Combination SYnthesiser CSY 209, and parallel multiple address identity transforms in the identity Transform Processors 13TP and 12TP 206 which compute the existence of specific vector pair intersections which are stored in dedicated parallel triple buffered ordered vector pair intercept buffers E,F, G,H, I,J.

An output sub system 202 performing synchronised parallel automatic intercept comparisons between members of sets of vector pair intersections held in the ordered intercept buffers E,F, G,H, I,J.

A control sub system CSS 203 is provided which configures the machine's partitioned and parallel architecture via sets of three state gates indicated by the dotted lines and controls the sequencing of the parallel processes which at any time define the state of the machine.

The overall function of such a machine may be described briefly as WRRnWRW process that is as a write 204, read 205, cascaded read 206, write 207, read 208 and write process (performing a "clear" function two frames out of phase with the write 207 but not shown here).

Elaborating, a series of parallel asynchronous write cycles "W" 204 WRRnWRW constituting the data input cycle. A series of synchronous parallel cascaded read cycles terminating in a write "RRnW" 205, 206, 207 WRRnWRW form the processing cycle. A series of parallel synchronous read cycles "R" 208 WRRnWRW which generate the system output. A house keeping cycle comprising a series of clear write cycles "W" WRRnWRW 18 not shown but two frames out of phase, for a particular set of sets of dedicated output buffers, with 207 allows the processes to repeat. The input, processing, output and clear cycles operate in parallel, processing data continuously on a frame basis to effect real time operation necessitating double buffering of input stacks, parallel operation of the line scan processors and triple buffering of output buffers. The processes may be amplified as follows:

An input cycle 200 where for every frame period vector identity data characterising image pattern thread information for the entire frame from each virtual image sensor in the phased image sensor array V1, V2, and V3 is written asynchronously and in parallel fashion to partitioned high speed input stacks. For a single line in frame and specific vector attribute, the memories 1A, and 1B, 2A, and 2B, 3A, and 3B correspond to the input stacks for virtual image sensors V1, V2, and V3 respectively.

A processing cycle 201 where during every frame period, data written during the previous frame is read by line scan processors performing sequential cycles of synchronous parallel reads from the partitioned input stacks generating, in relation to a reference virtual image sensor V1 stack FIG. 4 1A, or 1B for any particular set of sets of vector identities, simultaneous pairs of combinations of vector identities comprising one from the reference virtual image sensor set and one from each of the other sets of vectors, comprising the same set of sets of vectors from the other virtual image sensors V2, V3 FIG. 4 2A or 2B, 3A or 3B respectively. The combinations of vector identities form compound address identities driving a series of parallel cascaded read operations in the identity Transform processors 13TP and 12TP, whose final output in each case is an address definition within an ordered output buffer, E,F, or G,H, or I,J one such buffer E,G,I or F,H,J for each set of pairs of sets of vector identities, into which the existence in each case of a real or virtual vector intersection is written. This cycle is repeated until all combinations of vector identities between sets of sets of such vectors has been made. It is also possible as part of the cascaded read sequence for other processor external parameters to interact and themselves modify address generation, in this particular example such an interaction is the use (not shown in FIG. 4) of the scanner bearing (FIG. 5 m4) of the boresight of the virtual sensors fields of view within their field of regard. No limit is set on the number of such cascaded read operations of the identity Transform processors nor on the size of the address generation at any particular stage of the process, nor on the number of combined operations performed in parallel by the line scan processors. The data sets defining the transforms performed on identity combinations at the various stages of the cascaded identity Transform processors are generated off line by high level modelling techniques.

An output cycle 202 where all data processed in the previous frame is now read sequentially within each ordered output buffer and in synchronous parallel fashion between sets of ordered output buffers (only one set shown in FIG. 4 E&F, G&H, I&J) where the simultaneous existence, from all members of the same set of buffers (in this example E&F or G&H or I&J), of vector pair intersections yields the existence of a multiple vector intersection, one vector from each virtual image sensor, whose address identity is the real or virtual spacial position of an element of topographical detail. This parallel reading of the dedicated output buffers resolves the multiple vector intersection premise and can simultaneously perform range gating to discriminate virtual solutions associated with some topographically symmetrical scenarios. This reading of the dedicated output buffers represents the output of the system three dimensional data base and is intended to support downstream application processing.

The dedicated output buffers are cleared in the frame period following their particular output cycle which necessitates triple buffering of these physically and logically partitioned parallel memories.

Figure 5:
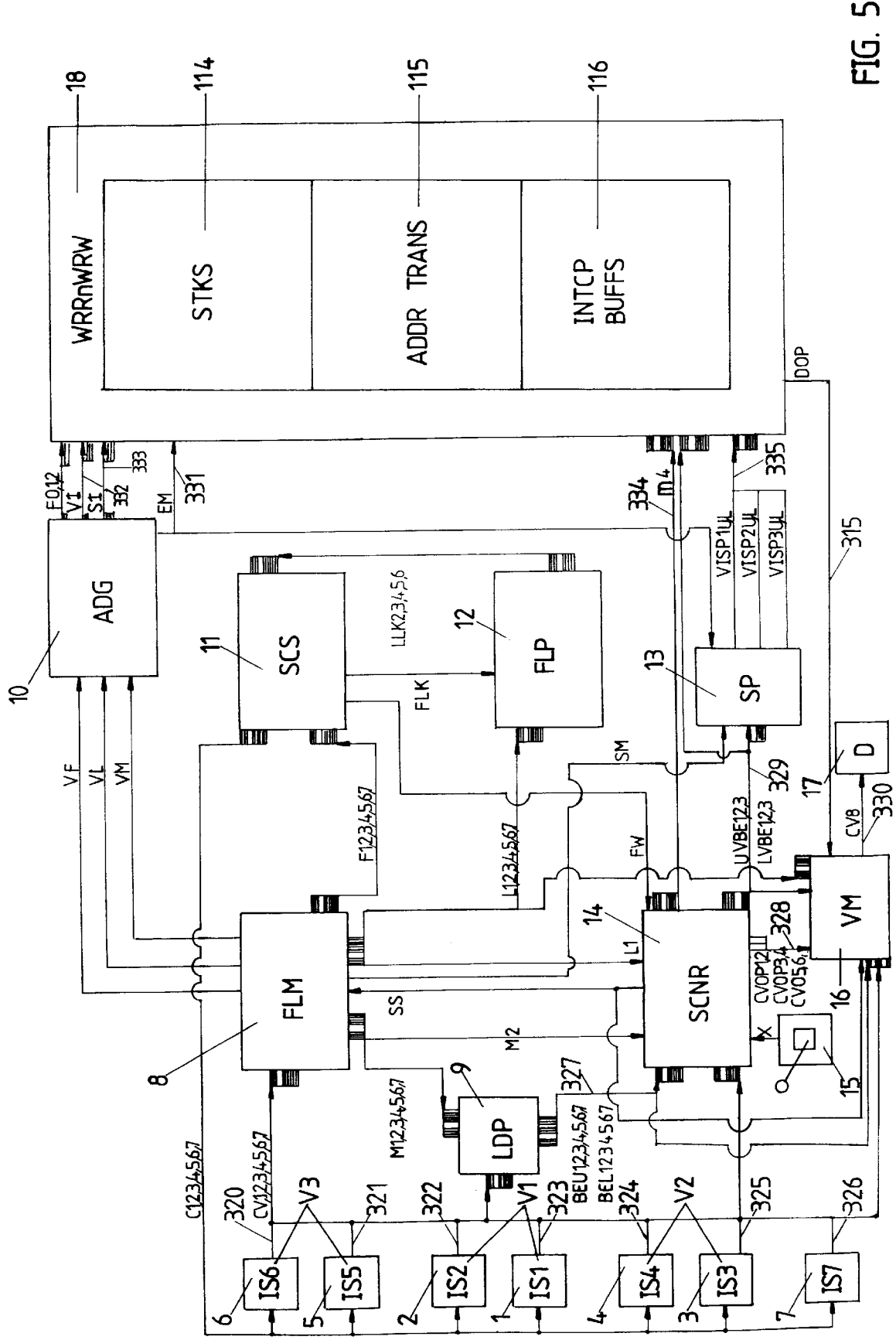
FIG. 5 shows system block diagram of phased image sensor array input to generic pattern derived topography processor.

With reference to FIG. 5 the WRRnWRW 18 processor (representing according to system sizing parallel elements of the Control Sub System CSS 203 and Combination SYnthesiser CSY 209) input system block diagram shows the individual image sensors 1,2,3,4,5,6 comprising the phased virtual image sensor array V1, V2, V3. Image sensor synchronisation is provided through the functionality of the Frame line mask FLM 8 circuitry, Sensor clock synchronisation SCS 11 circuitry, and Fine line position FLP 12 circuitry. This is achieved using a lost clock principle to bring the various image sensors to synchronisation. The operator wide angle image sensor IS7 7 also derives its clock drive from the same functionality.

The Scanner SCNR 14 allows controlled electronic scanning of their field of regard by all virtual image sensors either autonomously or by accepting an external processor or manual control.

Composite video CV1,2,3,4,5,6 from the individual image sensors 1,2,3,4,5,6 respectively in the phased virtual image sensor array is processed by the Luminance differential processor LDP 9 circuitry and binary event data representing upper BEU1,2,3,4,5,6 and lower BEL1,2,3,4, 5,6 frequency excursions through set limits are sent to the Scanner SCNR 14 circuitry where virtual imager subsets UVBE1,2,3 and LVBE1,2,3 for upper and lower frequency excursion events appropriate to the current field of view of the virtual image sensors V1,V2,V3 are extracted and sent to the Stack pointer SP 13 circuitry and WRRnWRW 18 processor.

The Stack pointer SP 13 circuitry is driven by binary event data from each virtual image sensor, for each attribute, in this example upper and lower frequency excursions UVBE1,2,3 and LVBE1,2,3. It generates sequential stack pointer addresses VISP1U, VISP1L, VISP2U, VISP2L, VISP3U, VISP3L for every physically and logically partitioned virtual image sensor, line scan, and vector attribute determined stack 114 which it passes to the write W WRRnWRW 18 processor.

The Video mixer VM 16 and Display D 17 allows operator display of all the individual image sensor or virtual image sensor, normal video or binary event data, Scanner SCNR 14 outputs, or generic pattern derived topography processor read R WRRnWRW 18 outputs DOP.

Data input to the generic pattern derived topography processor WRRnWRW 18 from the Address generation circuitry ADG 10 comprises a frame counter F0, 1, 2 allowing the WRRnWRW 18 processor to schedule double buffering of input stacks 114 and triple buffering of the dedicated output vector intercept buffers 116, the time log VI and SI of frequency excursion events representative of the azimuth and elevation identities of such events respectively within a virtual image sensors field of view, valid for each virtual image sensor, and the End marker signal EM, representative of the end of each luminance signal, valid for each virtual image sensor.

The Scanner's SCNR 14 output to the WRRnWRW 18 processor is m4 which identifies the scan position of the virtual image sensors fields of view boresight within their field of regard, also output are the binary event signals UVBE1,2,3 LVBE1,2,3 appropriate to the current scan position from each of the virtual image sensors.

FIG. 6 represents the physically and logically partitioned double buffered A&B stacks dedicated to each virtual image sensor, line scan and vector attribute. During any particular frame either the A or B set of stacks will be written to by the "W" write processor logic of the WRRnWRW 18 as a function of the F0 signal from the address generation ADG 10 circuitry, allowing the "R" read processor logic of the "W RRnWRW" 18 to read the other set. The first subscript denotes virtual image sensor, the second the line scan SI identity, and the third the vector attribute, In this example there are only two such attributes those of frequency excursions through an upper "U" and lower "L" set limits.

Figure 7:
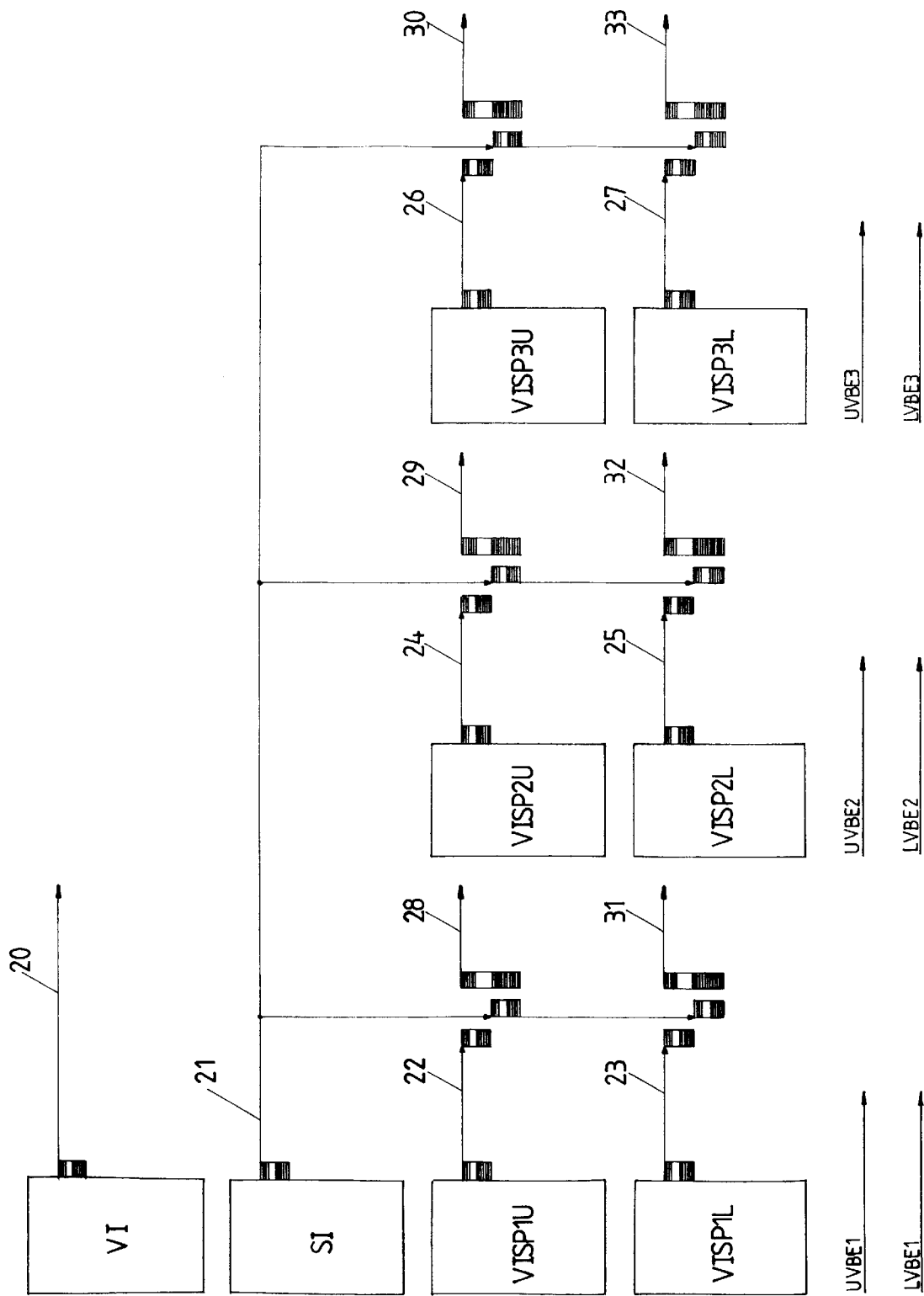
FIG. 7 shows input data and write control stack address pointers for image sensor, line scan, and vector attribute.

With reference to FIG. 7 which identifies the elements of the partitioned stack address pointers and data generation. The vector identity VI 20 representative of the azimuth angle in any virtual image sensor's field of view for any frequency excursion provides common data for all stacks. The stack identity SI 21 reflects the current line scan, that is line in frame, for all virtual image sensors and is used in conjunction with the vector identity stack pointers VISP1U 22, VISP2U 24, VISP3U 26, VISP1L 23, VISP2L 25, VISP3L 27 to generate individual partitioned stack addresses 28,29, 30,31,32,33 for data to be written to them. The virtual binary event data UVBE1,2,3 and LVBE1,2,3 are used to generate WE commands for their appropriate stacks.

Figure 8:
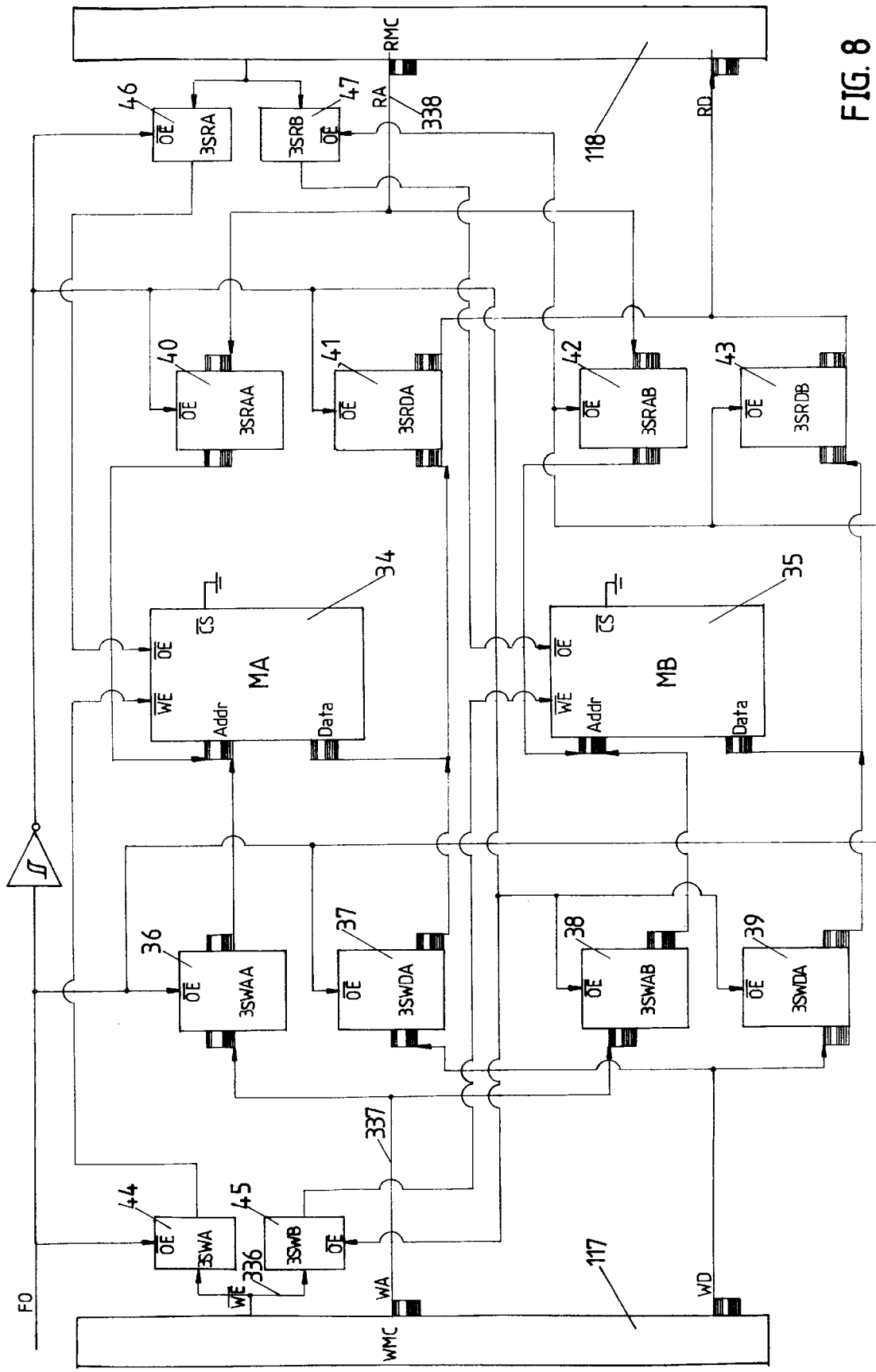
FIG. 8 shows system block diagram of organisation for write and read of one partitioned stack.

With reference to FIG. 8 representing the organisation between the writing and reading of one stack element comprising MA 34 and MB 35. During writing, a stack element is selected according to the virtual image sensor, line scan SI 21 identity, and particular vector attribute UVBE1,2,3 and LVBE1,2,3. The data written WD is VI 20 position in line scan of a particular event and is common between all virtual image sensors and stacks for vector identities of different attribute. The stack element address WA is given by VISP1U 22, VISP2U 24, VISP3U 25, VISP1L 23, VISP2L 25 or VISP3L 27. Write memory control W WRRnWRW generates a WE signal for appropriate stacks which is derived from the binary event data UVBE1,2,3, LVBE1,2,3.

Figure 9:
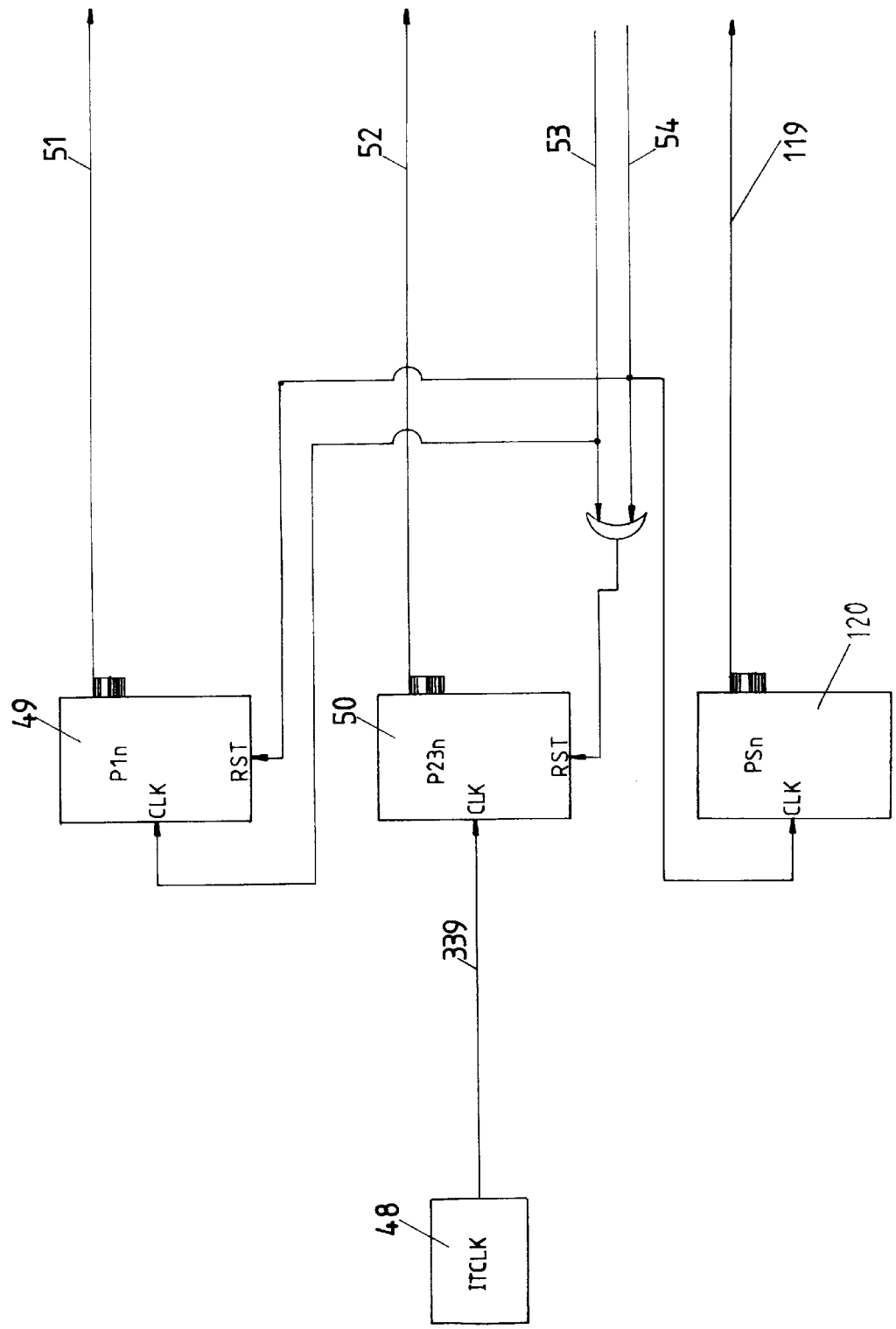
FIG. 9 shows system block diagram of stack read control address pointers for set of line scan stacks holding same vector attribute.

During reading of stack information, cycles of parallel synchronous reads are performed on sets of stacks containing identities, of vectors of similar attributes, of events which occurred during corresponding line scans of each of the virtual image sensors. Depending on system sizing a number of such line scan read processes will be performed in parallel by similar line scan processing elements each operating on a set of stacks containing vectors of similar attributes. With reference to FIG. 9 the reading of stacks is again controlled by pointers, a set of such pointers exist for each parallel line scan processing element of the system, which allow selection of a particular set of sensor's stacks according to line scan identity and vector attribute. Coordination between such parallel read processes is maintained by pointers, one for each such process, PSn 120. Within such a line scan read processor two pointers control the actual stack addressing one P1n 49 is the reference virtual image sensor V1 (n denotes the vector attribute) stack pointer. For every identity read from the reference virtual image sensor V1 stack all identities in the other virtual image sensors V2 and V3 associated stacks are read, this is controlled in this example by a common pointer P23n 50. Clocking of the reference image sensor stack pointer Pin occurs when the logical end 53 of either of the other virtual image sensor V2, V3 associated stacks is reached. The reference virtual image sensor stack pointer is reset when the end marker 54 for its own stack data is detected this also allows each parallel processing element to move on to process further sets of stacks, in this example by using the pointer PSn 120. For the reading of the other virtual image sensor associated stacks their pointer P23 are reset by the occurrence of an end marker from any virtual image sensor V1, V2, V3 associated stack 53 including the reference stack 54. In this way all combinations of vectors identities between sets of associated vectors and all sets of such sets are read. The iteration rate of processing solutions depends on the rate at which the P23 pointer can be clocked by ITCLK 48 (function of multiple address time in identity transform processors). It should be noted that all such stack reads are performed in parallel and sets of stacks of different attributes may also be read simultaneously by the use of their own dedicated stack pointers so the actual (vector pair intersection) solution rate for this example of three virtual image sensors and two vector attributes is four times (pair of pair of vector identity combinations) the iteration rate multiplied by the number of parallel line scan processors.

Figure 10:
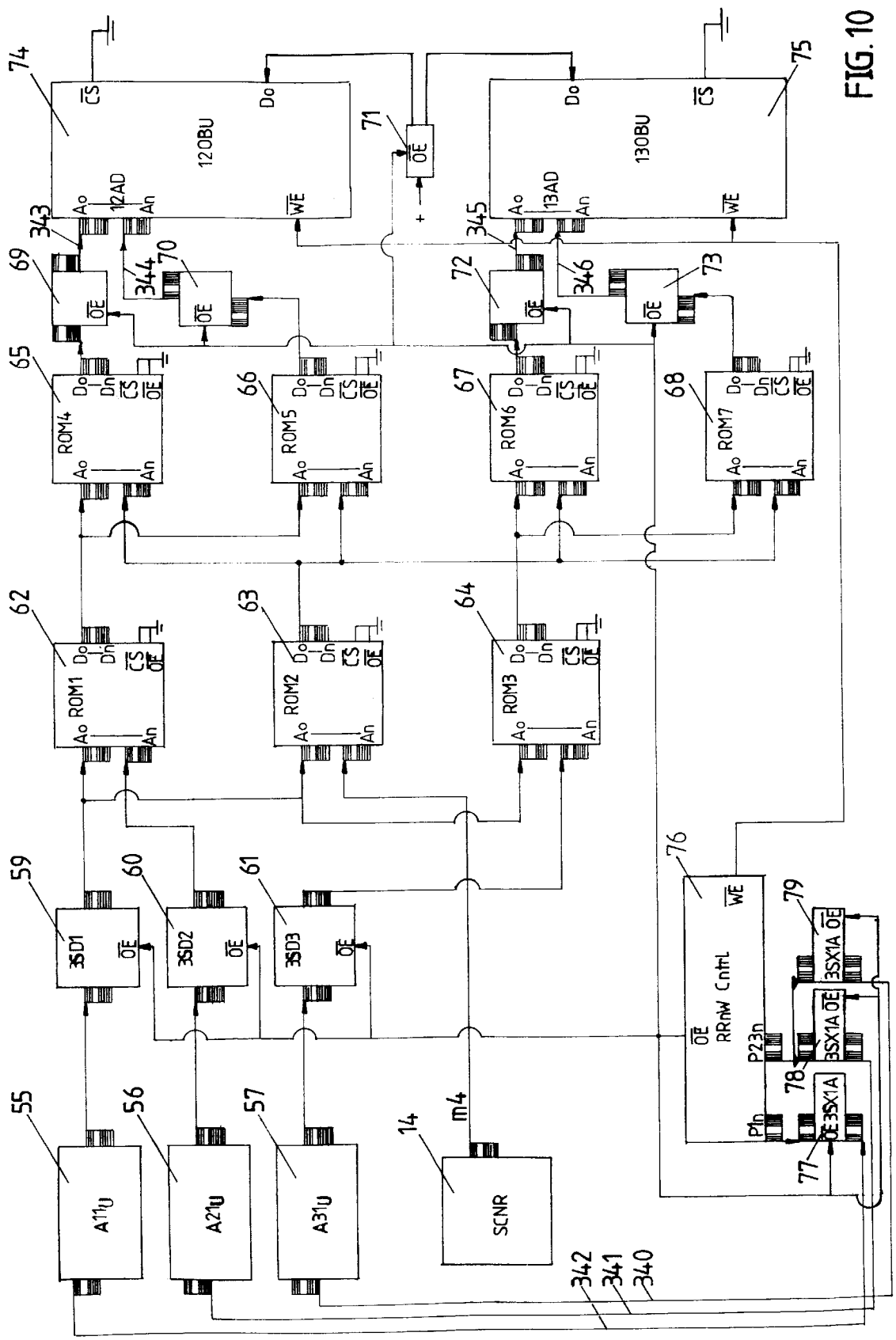
FIG. 10 shows system block diagram for read read write "RRnW" organisation for processing of one set of partitioned stacks holding same vector attributes.

With reference to FIG. 10 which indicates how data read, as a result of parallel read "R" WRRnWRW operations, from a particular set of sensor stacks A11U 55, A21U 56. and A31U 57 appears simultaneously on the output lines of these particular stacks and passes through the double buffering of the three state gates 59 60 61 under control of the "RRnW" 76 WRRnWRW sequencing. This first read operation now precipitates a series of cascaded reads R̲n̲ through read only memory ROM using the address combinations formed from identities read from the reference virtual image sensor V1 stack 55 and each of the other virtual image sensors V2 and V3 stacks 56 and 57 respectively (in response to address generation P1n and P23n).

The combinations of identities taken from the reference virtual image sensor V1 stack 55 and each of the other image sensor V1 V2 stacks 56 and 57 and the identities of the real or virtual vector pair intersections defined by the vectors they represent are known apriori and implicit in the identity transforms held in ROM. In this example the identities simultaneously generated at ROM1 62 and ROM3 64 outputs represent polar range information of such intersections for the combination of identities from stacks 55 and 56 for V1 and V2, likewise 55 and 57 for V1 and V3 respectively. It will be noted that in parallel ROM2 63 address definition has been driven by the reference virtual image sensor V1 vector identity and the Scanner output m4. The ROM2 63 identity transform output represents the vector rotation necessary to support the identification of real vector intersections. This rotation identity output from ROM2 63 now forms address combinations with range data identities output from ROM1 62 which are cascaded into ROM4 65 and ROM5 66. These ROMs 65 66 generate as outputs from their identity transforms the identities of the real or virtual vector intersection for the particular combination of vector identities output from stacks 55 and 56. Similarly the identity combination output from ROM2 63 and ROM3 64 form address combinations into ROM6 67 and ROM7 68 whose identity transform outputs similarly identifies the real or virtual vector intersection identities from the combination of vector identities from stacks 55 and 57. The identity combinations generated by ROM4 65, ROM5 66 and ROM6 67, ROM7 68 now form the address definitions respectively for the RAM dedicated ordered output buffers 12OBU 74, and 13OBU 75 into which the existence of these real or virtual vector intersections are now simultaneously written by a write pulse generated by the "RRnW" W̲R̲R̲n̲WRW 76 control. The timing of these write pulses is controlled such that the cascaded address generation has become stable following the various stages of the cascaded read operations (and this ultimately controls the P23n iteration clock rate ITCLK 48 FIG. 9) however, the duration of the complex mathematical computations that have in effect just taken place are many orders of magnitude less than required for serial computation by software and further the two results produced simultaneously here represent the output of a single line scan processor element processing members of one set of sets of members of the same vector attribute, similar line scan processor elements operating in parallel are simultaneously generating their solutions to vector pair intersections from other sets of vector identity stacks. Note that the precision of the result is a function of the sensitivity of the virtual image sensors and reflected by the vector identities, which determine the maximum-size of the address definition passed to ROM1 62, ROM2 63, ROM3 64 however no limit is placed on address definition for any of the ROM memories used and by using parallel ROMs, at each stage of the process, increasing precision can be achieved in the same effective process time (multiple address time) as defined by the cascaded ROM identity transform processor described. The memories used as dedicated output buffers 74 75 are triple buffered allowing continuous processing of data whereby one frame period is used for writing processor output to the dedicated output buffers, one frame for reading the buffers (scenario data base output), and one frame to subsequently clear the data base buffers. The triple buffering is achieved in similar fashion to the double buffering of data input, except here three sets (write, read, clear processes) of three state gates are used for address and data definition for each of the three sets of memories comprising the triple buffered output memories of which only one set is shown in FIG. 9 comprising 69,70,71,72,73.

Figure 11:
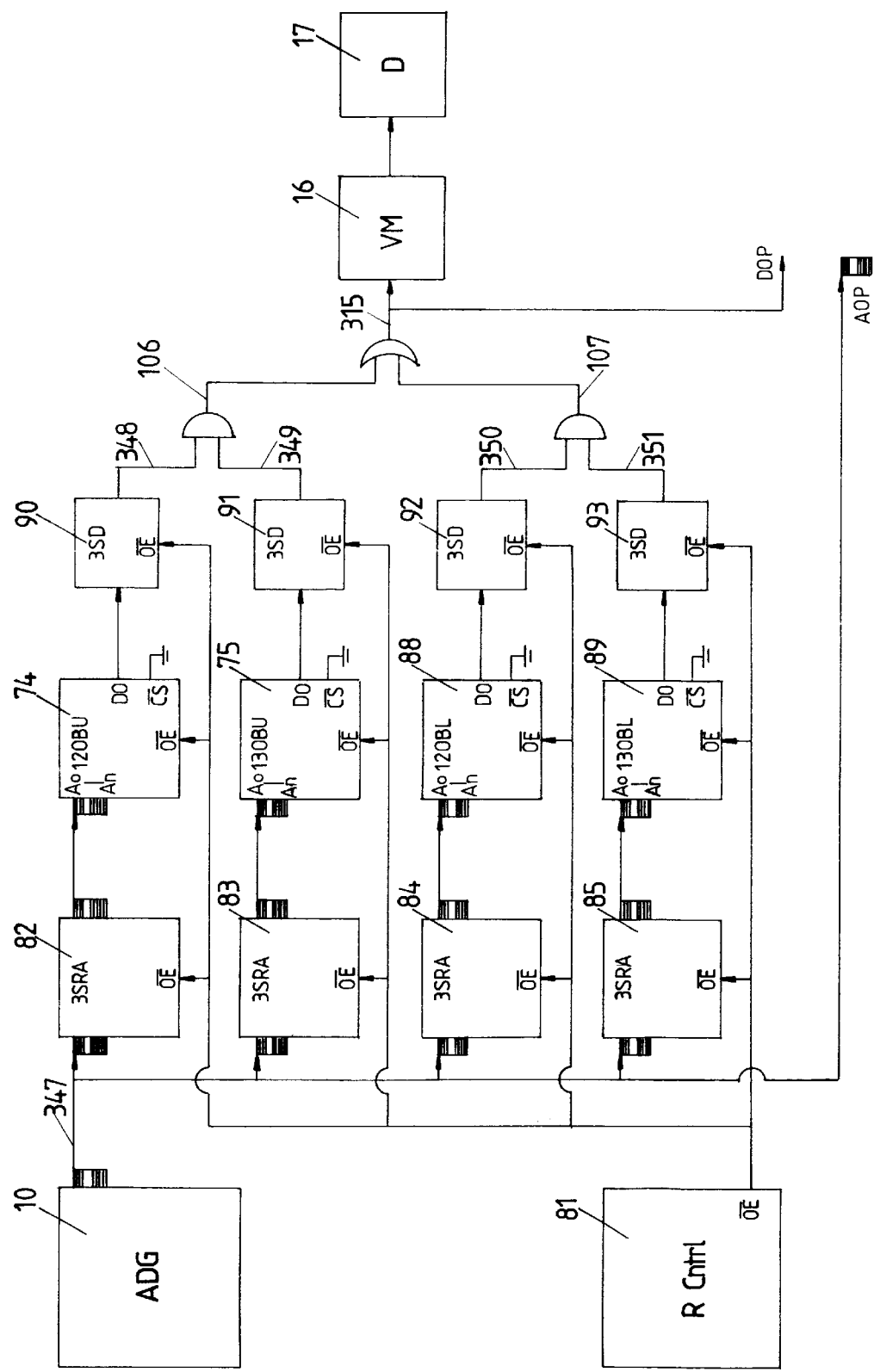
FIG. 11 shows system block diagram for combined output from two sets of line scan vector pair intercept buffers.

With reference to FIG. 11 which shows two subsets 74, 75 and 88, 89 of one set from the sets of triple (not shown) buffered vector pair intercept buffers holding the output from two line scan processors each having processed a set of sets of different vector identities (in this example with the attributes upper and lower frequency excursions) for the same line in frame. During data base output the dedicated vector pair intercept buffers containing all the identified vector pair intersections written during the previous frame cycle are read sequentially in synchronous parallel fashion. The address definition for this process is that controlled by the Scanner SCNR 14 SS output through the action of the Address generation circuitry ADG 10. From the reading of vector pair intersections from sets of sets of such buffers for a line in frame output of the data base, in this example, 74, 75, and 88, 89, their (anded) simultaneous existence at 106 or 107 respectively implies the existence of a unique triple vector intersection where the current output buffer address identifies the three axis special position of an element of topographical detail.

For the set of sets of intersect buffers here 74, 75 and 88 89, being read synchronously and in parallel, their outputs are ored forming part (single line scan output) of the sequential output of the data base DOP 315. The parallel reading of the vector pair output intersection buffers for all other pairs of sets and all such sets of sets for all the other line scan processor output buffers constitutes the output representing the whole of the observed scenarios topographical three dimensional detail, which is intended to comprise the input to a more conventional processing system in support of dependent functions such as for example scenario navigation. Note again the three state gates 82 83 84 85 90 91 92 and 93 effecting address and data triple buffering controlled by the "R" WRRnWRW 81 logic. This example allows for diagnostic purposes simple operator sensible displays of a two dimensional subset of this data base from any particular set of processors processing sets of sets of vectors with a common azimuth or elevation attribute by generating a binary event signal associated with the existence of a multiple vector intercept found during the reading of a set of data base buffers. This output DOP (FIG. 5 and FIG. 11 315) is mixed with Scanner SCNR 14 produced synthetic frame and line sync SS in the Video mixer 16 to produce a two dimensional display similar to that of a radar display. With reference to FIG. 17 such a display 263 is shown of a simplified imaged scenario representing a horizontal slice through the systems three dimensional data base output. Displays 260 and 261 (FIG. 17) show for the same scenario vector pair intersections formed for the virtual image sensors V1 V2 and V1 V3 respectively, FIG. 11 signals 348, 349 350, 351, are representative of such frame distributed information.

Figure 12:
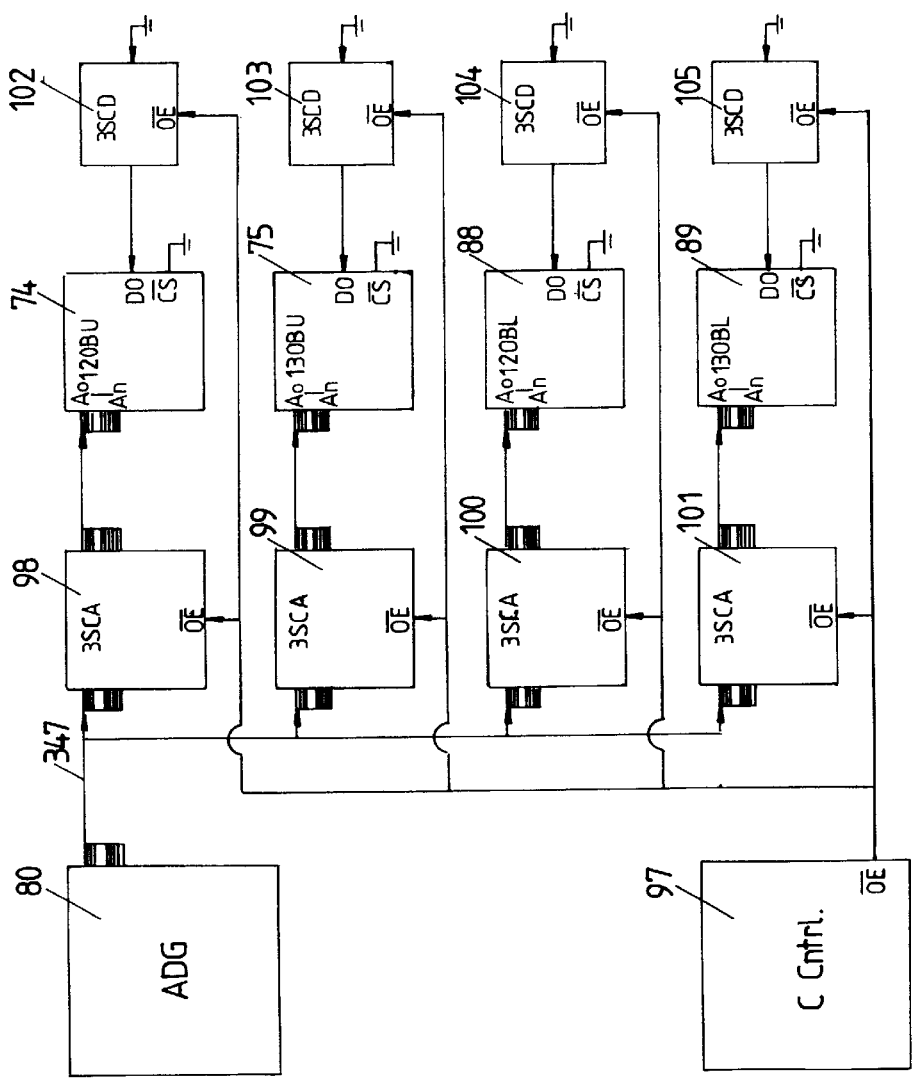
FIG. 12 shows system block diagram for clear of two sets of line scan vector pair intercept buffers.

With reference to FIG. 12 all dedicated vector pair intercept buffers necessitate in this example being cleared in the frame cycle following data base output before receiving new intersect data in the following cycle, this is again effected using addressing from the Address generation circuitry ADG 10. To allow continuous processing requires triple buffering of the address and data though the action of the three state buffers 98 99 100 101 102 103 104 and 105 controlled here by the clear control logic which comprises the last write "W" of the WRRnWRW MC 18 sequencing logic.

The high level modelling techniques allow for the identification of imaginary solutions in the definition of the apriori identity transforms for vector intercepts and other functions employed in the system. Since these processors must produce a solution based on their current mix of input parameters the identification of anomalous solutions for example ranging outside the resolution of the system or ranging behind the systems origin are identifiable and for such cases solutions are produced which even in cascaded systems will be recognised as imaginary identities and given a unique and system recognisable identity to allow exclusion in downstream processes.

Whilst the mathematics of unique multiple vector intercepts generally works well in the random real world some situations of symmetry can result in anomalous multiple vector intercepts, these however can be recognised as short ranging solutions to the unique real world vector intercepts and can therefore be ignored through range gating (not shown) during the ordered reading of the dedicated vector intercept output buffers.

The monitoring of normal video output CV1,2,3,4,5,6,7, (FIG. 5 320, 321, 322, 323, 324, 325, 326) binary event data BEU1,2,3,4,5,6 BEL1,2,3,4,5,6, (FIG. 5 multiple signal lines 327) virtual image sensor video CVOP1,2 CVOP3,4 CVOP5,6 (FIG. 5 multiple signal lines 328) and associated binary event data UVBE1,2,3 LVBE1,2,3 (FIG. 5 multiple signal lines 329) have already been earlier addressed, as has the frame rate generation of the systems three dimensional scenario data base output DOP (FIG. 5 and FIG. 11 315) allowing horizontal or vertical slices through the data base for diagnostic purposes. All of these parameters allow checking of alignment, and calibration of aspects of system performance. If necessary such a capability supports the further harmonisation of the system either, on installation in its operational environment, or prior to operational use, if for example the distributed image sensors comprising the array have been disturbed through maintenance, or servicing to their host environment.

One aspect of such a topography processing architecture is it's apparent inherent redundancy or resilience if subsystems or parts of subsystems fail, when the performance of the system may not necessarily appear to substantially degrade. This apparent redundancy arises out of the system's capability to continuously process data at the image sensor's frame rate and the inherent noise immunity offered by the multiple vector intersection methodology. In respect of line processing this is due partially to the double buffering of the physically and logically partitioned system input stacks and treble buffering of the system's dedicated vector pair output buffers. Whilst operationally such features enhance particular aspects of the system's performance the need remains to be able to monitor end to end internal as well as overall system operability.

A programmed scrutiny of these lower levels of system processor performance, without the need to remove boards or use external equipment is possible because of the frame rate execution of the machine which allows the integrity of subsystem's and in many cases discrete components to be monitored, using the systems prime display, by switching the required monitor point, or points (described later) within the system to the video mixer for combination with appropriate frame and line sync. Generally almost all signal parameters are monitorable either in isolation or in combination as described later. This is not in some cases unlike using an oscilloscope to establish a signal's frequency characteristics at different points in a television receiver circuitry. The differences being that unlike an oscilloscope the time base is fixed (though generally appropriate) and the Y dimension a unit line separation when monitoring clock or counter iteration rates, however also unlike an oscilloscope, macroscopic as apposed to microscopic aspects of the system performance are monitorable over the frame period. Examples are the asynchronous write enable commands to input stacks (FIG. 8 336) or vector pair intercept buffers (FIG. 11 348,349, 350, 351), or sequential address generation associated with specific vector attribute processing, or the end to end integrity of multiple address processes (FIG. 10 340,341,342,343,344,345,346) in the generation of the vector pair intersections.

Whilst this functionality supports non interruptive graphic diagnostics monitoring allowing for example the calibration of write enable pulse duration, or the achievement of minimum multiple address sequence duration for differing identity processors, the techniques were extended to allow further diagnostic capabilities allowing aspects of system end to end dynamic performance to be monitored, by the definition and introduction of standard graphic test formats to establish correct operation of subsystems. It is difficult with an imager topography processing system located in the room of a building for example to check the integrity of the system ranging over say a ten to twenty mile band. To this end three minimal devices were designed to generate simulated image vectors representative of the input from each virtual image sensor in the phased virtual image sensor array.

Figure 13:
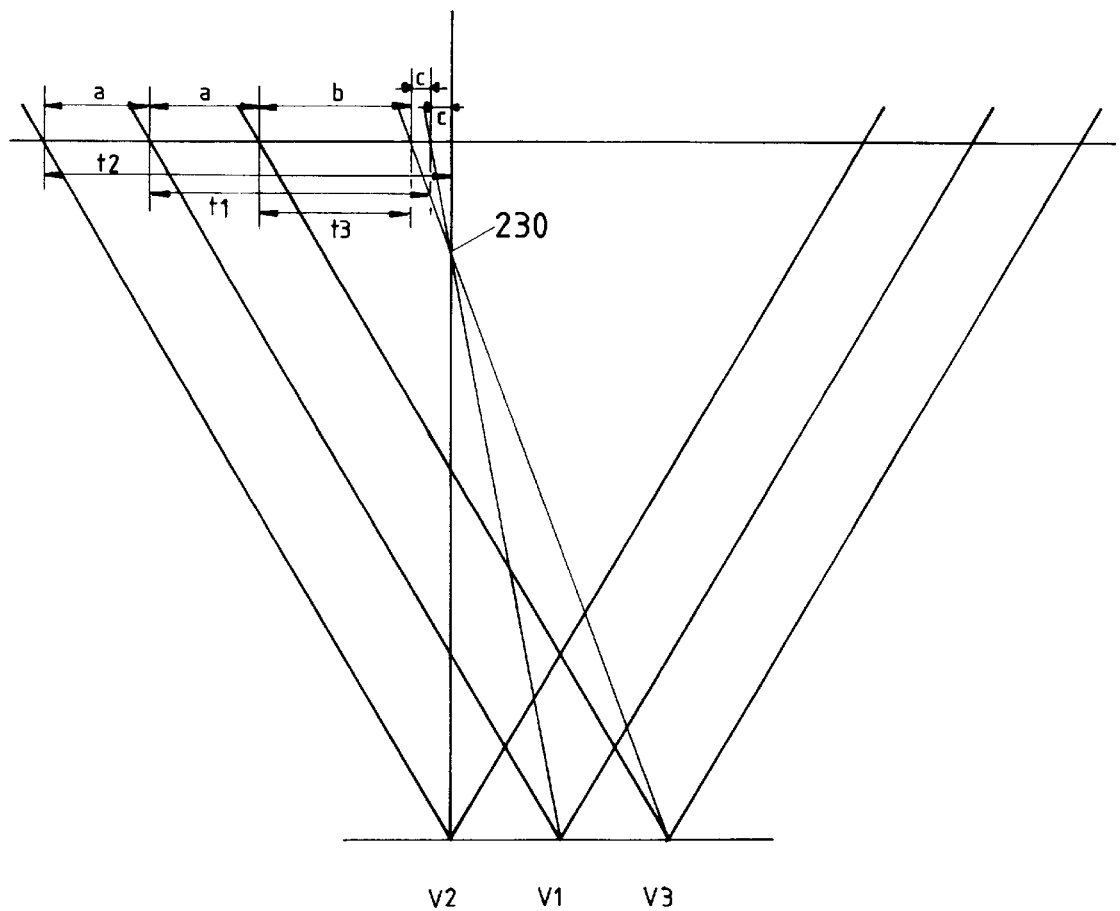
FIG. 13 shows timing considerations for an element of topographical detail within the common field of view of the virtual image sensors V1 V2 V3.
Figure 14:
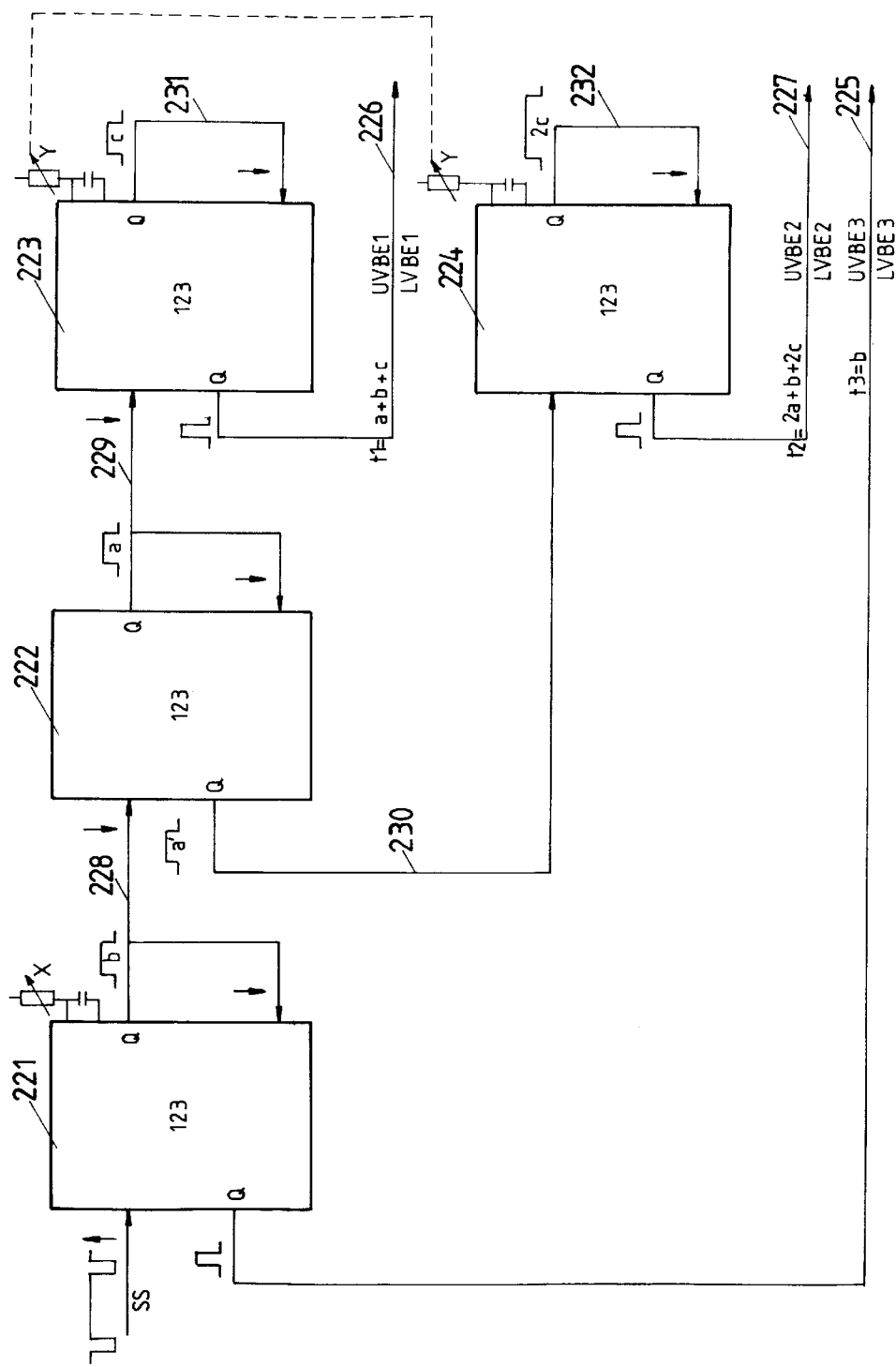
FIG. 14 shows a schematic organisation of a differential binary event generator.

The output from these devices can be introduced to override discrete imager binary event data at the inputs to the scanner, or downstream of the scanner at the binary event inputs to the topography processor. With reference to FIG. 13 showing the fields of view of three virtual image sensors V1 V2 V3 comprising the phased virtual image sensor array, it can be seen that for time coincidence of the frame and line sync characteristics between the virtual image sensors, then for a point of topographical detail 230 the time within the line scan of the associated occurrence of a binary event for virtual image sensor V1 is t1=a+b+c, for virtual image sensor V2 t2=2a+b+2c and for virtual image sensor V3 t3=b. With reference to FIG. 14 monostable 221 is triggered by the rising edge of the virtual image sensor, scanner produced line sync SS (FIG. 5). The potentiometer forming the X output from a joystick 15 (not shown in FIG. 14) controls the duration "b" 228 of its output, whose falling edge generates in the chip's other monostable the fixed length pulse 225 representative of a binary event for virtual image sensor V3.

Figure 16:
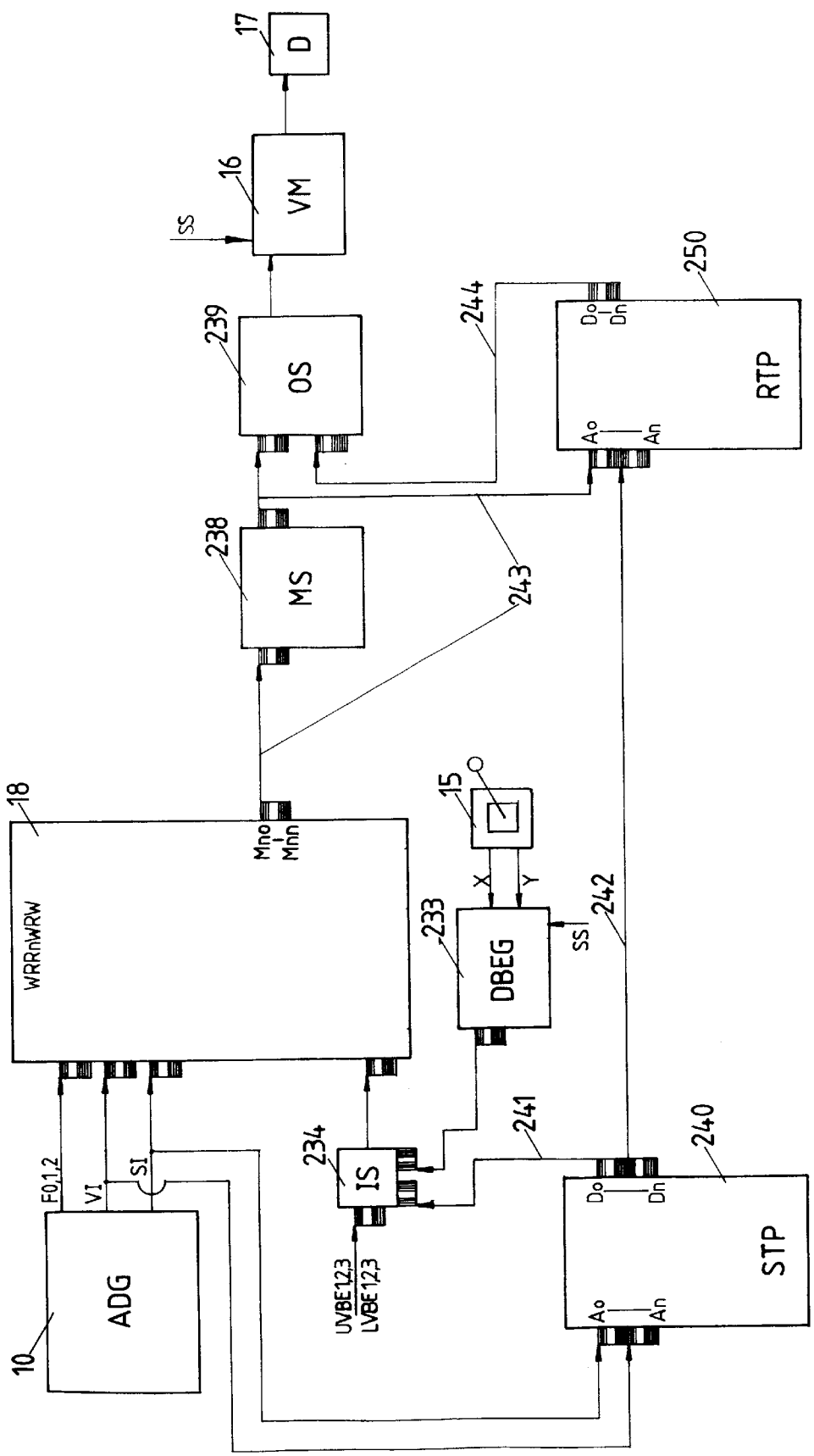
FIG. 16 shows closed loop schematic for diagnostic stimulation and monitoring of the topography processor.

The monostable 222 is triggered by the falling edge of waveform "b" 228 and generates a pulse of duration "a" 229. The falling edge of this pulse triggers the monostable in the other half of the chip to produce a pulse "a'" 230 of similar duration to "a" 229. The duration of the pulse "a" 229 and the chained pulses "a+a'=2a" correspond to the field of view time offset associated with the physical separation of the virtual image sensors V2, V1 and V2, V3 respectively in the phased virtual image sensor array. The monostable 223 is triggered by the falling edge of pulse "a" 229 and generates a potentiometer controlled pulse "c" 231 whose falling edge triggers the chip's other monostable to produce a fixed length binary event for virtual image sensor V1 226. The monostable 224 is triggered by the falling edge of pulse "a'" 230 and generates a potentiometer controlled pulse "2c" 232 twice the duration of monostable's 223 output pulse "c" 231. The falling edge of this pulse triggers the chip's other monostable to produce a fixed length binary event for virtual image sensor V2 227. The potentiometers identified for monostables 223 and 224 are ganged together and form the Y outputs of the joystick 15 (not shown in FIG. 14). With reference to FIG. 16 this minimal circuitry is included in the (FIG. 16) Differential binary event generater DBEG 233, whose switch selectable (through Input switch IS 234) outputs drive the binary event input channels of the topography processor WRRnWRW 18, it is possible to manually and non interruptively exercise the topography processor 18 by generating the differential binary events between virtual image sensors. The output is effective for each simulated line scan of the virtual image sensor's, and for the vector attributes binary event input channels into which the simulator outputs are connected. Again by the stimulation of only the system's sufficient control, data and address highways it is possible to monitor the processor's end to end performance across an envelope of manually simulated scenario's topographical detail.

Whilst the system described supports confidence checks of the system's end to end performance the simulation generates only one element of topographical detail whose position is a function of the essentially random manual positioning of the joystick 15.

For end to end dynamic processor performance monitoring allowing the further possibility of extended graphic macro diagnostic capabilities a further device whose circuitry is also included in the FIG. 16 Differential binary event generator DSEG 233 was designed. The device with reference to FIG. 15 comprises a monostable 235 triggered by the falling edge of the inverted scanner output of virtual image sensor line sync SS which generates a pulse whose duration is "n" 236. The falling edge of the pulse 236 triggers the chip's other monostable to generate a fixed duration binary event signal 237. The falling edge of this pulse 237 triggers through the inclusive or gate, the chip's first monostable thereby creating a train of binary events within each line period, whose frequency is defined by the duration "n" of the pulse 236. The output of this device is used to drive simultaneously all binary event inputs UVBE1, 2,3 LVBE1,2,3 of the (FIG. 16) topography processor 18 overriding imager inputs via the Input switch IS 234. The effect of this stimulation is to essentially generate firstly vectors which represent topographical detail outside the range of the system's resolution and therefore range discrimination but also secondly the device inherently symmetrical simulated thread distribution gives rise to all (for given binary event distribution frequency) combinations of vector pairs thereby exercising the topography processor 18 over its full operating envelope, not only providing visual checks for line scan process duration (for example FIG. 9 monitor 119) characteristics under changing frequency distribution conditions, but equally positive indications of the identity transform processing integrity over an envelope.

For a given frequency of binary event simulation visual, augmented visual or automatic visual comparison and checking at all defined monitoring points of vector intercept calculation is possible against apriori data as follows. With reference to FIG. 16 showing a part system schematic of a visual, augmented visual or fully automatic diagnostic stimulation and monitoring configuration. In addition to the differential binary event generator DBEG 233 the additional functionality comprises two transform processors 240 and 250 configured to provide closed loop analysis of the topography processor's 18 performance. The first transform processor 240 accepts address definition drive off the address generation ADG 10 functionality and generates for this particular system's three virtual image sensors, generic pattern output of an apriori correlatable pattern series. These strobed (not shown) outputs 241 are fed to the topography processor 18 binary event inputs (via input switch IS 234), whilst simultaneously pairs of anticipated vector pair intercepts and scenario three dimensional data base identities 242 are passed to the second transform processor 250. For this particular configuration the monitored outputs MnO-Mnn (eg FIG. 11 348 349 106 or 106 107 315) 243 switch selected (via monitor select MS 238) of the topography processor 18, are in fact one frame period out of phase with the input drive 241. The second transform processor 250 accepts the topography processor output 243 and the anticipated system response outputs 242 from the first transform processor 240 representing the identities of both vector pair intercept buffers and scenario data base, and generates for the combination of these six (in this particular example) the three outputs 244 representing anomalous (differing) outputs 243 from the topography processor 18 and anticipated stimulated output 242. Mixing a switch selected (Output selector OS 239) strobed (not shown) result with scanner frame and line sync SS permits graphic macro display of the set (empty or otherwise) of the actual or anomalous system performance characteristics. Clearly in addition to either the display of the visual or augmented visual graphic diagnostics these outputs could equally be buffered for subsequent analysis (not shown) or in the case of augmented visual an automatic failure indication made on the occurrence of a non empty data set.

This configuration and output monitoring is further capable of other internal system transfer function diagnostic monitoring and analysis. For processor internal parameters where the phase difference between stimulation and output is less than one frame period then this phase difference represents a high level modelling parameter in the definition of the first transform processor's 240 data set. It is further interesting that the second transform processor's 250 transform data set clearly allows processing of multiple or combinations of the topography processor internal parameters in respect for example of simultaneity or otherwise of parameters selected for monitoring. In this fashion macroscopic sequences of address identities generated by the combination synthesiser may be monitored for defined system apriori drive.

A variety of identity transform processors were employed in the original experimental equipment, these included cartesian and logarithmic output displays. The particular example cited of a range and bearing processor was described earlier since its operation in respect of the virtual image scanning of the field of regard is more efficiently executed in range and bearing calculations than in cartesian coordinates. Four such different types of identity transform processors were integrated in the experimental system's line scan processors where each of the different transform processors operating in parallel received simultaneous drive from the combination synthesisers (FIG. 4 FIG. 10 not shown). The outputs of a particular transform processor set are switch selected through a matrix of three state gates (not shown) to feed their dedicated vector pair intercept buffers. In practice such an arrangement of output selection supports the selection and use of different topographical range scales.

The dynamic envelope performance of all of these transform processes verified through their high level (production) modelling of their embedded data sets supports, in conjunction with the variable frequency pulse generator 235, system integration and configuration integrity checks. Referring again to FIG. 15 various graphic macro diagnostic displays of the system are indicated where logarithmic range transform processors are employed. Whilst the normal cartesian or range and bearing scenario three dimensional data base output represents images similar in many ways to those generated by a radar (FIG. 17), the attraction of a logarithmic display particularly in the context of non interruptible graphic macro diagnostics, is the linearly spaced matrix representing possible vector intercepts display FIG. 15 210. The X axis is representative of V1 field of view angle (left to right) whilst the Y axis represents possible range differentiated V2, V1 vector intercepts (range decreasing top to bottom). A point displayed represents a vector pair intersection between vectors of a particular attribute (for example FIG. 11 348, 349, 350. 351) and line scan between, in the case of 210, the two virtual image sensors V1, V2. Display 211 shows the situation for V1 and V3 where the X axis is V1 field of view angle (left to right) and the Y axis representing possible V1, V3 range differentiated vector intercepts (range decreasing top to bottom) again points represent the presence of vector pair intercepts between these two virtual image sensors V1, V3. Display 212 shows the multiple vector intercepts FIG. 11 315 for vector pair intercepts common between the three virtual image sensors V1 V2 V3, in other words the information representing a line scan slice output of the scenario three dimensional data base (in this format) albeit deliberately not showing the short range discrimination, since this format is being employed to dynamically and diagnostically exercise the system. Displays 210, 211, 212 therefore indicate for the simulator drive 237 operating at a given frequency of binary event generation some of what may be many thousands of vector intercepts calculated at the frame rate, for a particular line scan, between virtual image sensors in the phased virtual image sensor array.

Scanning the virtual image sensor's field of view offers the possibility of a practical wide field of regard, and electronic scanning of the virtual image sensors field of view across its field of regard allows fast and accurate positioning of its associated boresight offering possibilities by effecting a rotation of the field of view to improve range discrimination particularly at extreme ranges. The display examples FIG. 15 210–218 inclusive are representative of a system in which the field of regard of each virtual image sensor is twice that of the field of view of the discrete image sensors forming these particular virtual image sensors. In this example to maximize the azimuth display resolution of the system output, the identity transform processors process combinations of vectors from the three virtual image sensors in conjunction with the scanner field of view boresight position, and only recognise combinations of vectors capable of generating multiple intercepts in a field of view centred at the middle of the field of regard of the scanner. Displays 210, 211, 212 show the stimulated system output for the scanners field of view boresight position being at the centre of the scanner's field of regard. Display 213 shows for virtual image sensors V1 and V2 vector pair intersections where the scanner field of view boresight is positioned an eighth of a field of regard left of the field of regard centre. Similarly display 214 shows a similar situation for V1 and V3 vector pair intersections while display 215 shows the multiple vector intersections between V1 V2 and V3 with the scanner in the same position. Displays 216, 217, 218 show a similar scenario with the scanner field of view boresight positioned an eighth of a field of view right of the scanner field of regard centre. It should be remembered that the simulator output 237, generated as a function of virtual image sensor line sync output SS from the scanner, is introduced downstream of the scanner at the topography processors binary event input channels, thus the simulation represents (for this particular diagnostic example to allow dynamic exercising of all multiple address combinations) a scenario that is moving with the scanners rotation, as opposed to the normal system operation of stabilised topographical detail displays (unless of course scenario detail is moving with respect to the system). It is therefore not only possible to dynamically examine the system's performance envelope by the system's graphic macro diagnostic response in respect of line scan processing, but by permitting the scanner to free run the processor's dynamic end to end performance is also determinable using visual, augmented visual or automatic visual means.

Use of discrete, or combinations of the techniques described, supports definition of a comprehensive range of visual, augmented visual, or automatic visual graphic macro diagnostic tests, which allow system integrity GO/NOGO decisions to be reached non interruptively for such a topography processor system.

With reference exclusively to FIGS. 18–21 a description of an iterative subset pattern derived topography processor is included here, which despite its iterative operation introduces another variation of a range processor operating at an image sensor's data rate and capable during synchronous modes of operation of supporting graphic macro analysis. This example comprises two image sensors with known separation and orientation whose fields of view share a common scenario and where common image detail is contrived to exist in corresponding line scans of the two image sensors. For pairs of sets of luminance signal amplitude and luminance signal time differential elements generated in real time from both image sensors the partitioning of such unassociated elements so as to define subset patterns is made in sympathy with the binary event outputs of an image pattern thread processor identifying the occurrence, for each image sensor, of frequency excursions of the luminance signal through preset upper and lower limits. For such sets of pairs of subset patterns so identified comprising elements of amplitude or (exclusive) time differentials of the luminance signal between such binary events, combinations of time shifted pairs of pairs of subset patterns within corresponding line scans of the two image sensors may be iteratively synthesised by the software of an external processor, or using electromechanical means of relative motion between the image sensors fields of view, or by dynamic modification of the image sensors relative frame and line sync separation. The real time comparison of the members of potentially associated (same line scan, same start criterion and attribute) subset patterns between image sensors identifies those members of pairs of pairs of subset patterns where the simultaneous equality of amplitude members and equality of time differential members to a given precision implies unique vectors from such members with an intercept at an associated element of topographical detail. Apriori information of possible vector intercepts implicit in the geometry of the normal relative azimuth position of corresponding subset pattern elements between image sensors allows the system relative slant range to, and hence the system boresight relative height of such members associated elements of topographical detail to be computed in real time.

The software processing of subset patterns necessitates the passing of luminance signal information partitioned by the outputs from an image pattern thread processor identifying luminance frequency excursions through upper and lower preset frequency limits for both image sensor over an interprocessor link (not shown).

Figure 18:
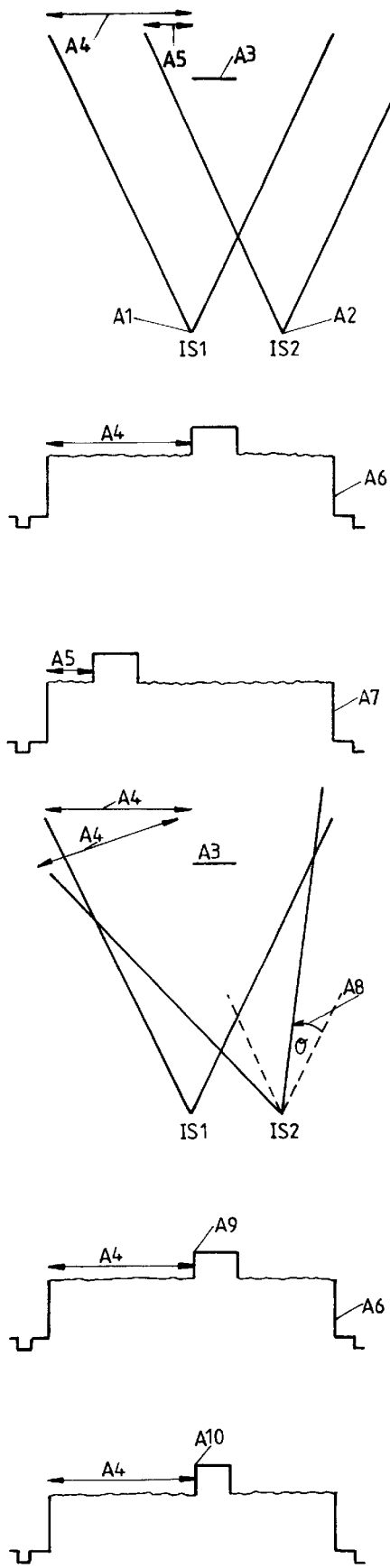
FIG. 18 shows a representation of electro-mechanical relative time shifting of subset patterns between two image sensors.

With reference in particular to FIG. 18 showing a representation of electro-mechanical relative time shifting of subset patterns. Two image sensors IS1 A1 and IS2 A2 of known separation and orientation are shown where the boresights of their respective fields of view are parallel and time coincidence exists between their frame and line sync characteristics regard a common scenario such that common image detail is contrived to exist in corresponding line scans of both image sensors. A subset pattern A3 is registered at the different luminance signal start relative times A4 and A5 in corresponding line scans of the image sensors IS1 A1 and IS2 A2 respectively. The luminance signals for the line scan in which the subset pattern A3 exists are shown A6 and A7 for the image sensors IS1 A1 and IS2 A2 respectively. An anticlockwise rotation of the right hand Image sensor relative to the lefthand image sensor in respect of the line scan plane by an angle theta A8 will bring the subset pattern A3 start time A10 relative to the luminance begin time of image sensor IS2 A2 into time correspondence with the subset pattern start time A9 relative to the luminance begin time of image sensor IS1 A1 allowing real time hardware comparison of pairs (different attributes) of pairs (same attributes) of subset patterns between image sensors. It should be noted that the subset pattern A10 of IS2 A2 is of shorter duration (because of the rotation) than the subset pattern A9 for image sensor IS1 A1. The rotation angle theta A8, and the separation of the image sensors, and the azimuth angular position of image sensor IS1's A1 subset pattern A3 (function of A4) allows the system relative slant range to be calculated from apriori knowledge, equally from information of the subset pattern's A3 elevation with respect to the image sensors field of view boresight (function of line in frame) the system boresight relative height of the subset pattern A3 associated element of topographical detail is also defined. Control of the electro mechanical slaving in this system is possible by the functionality described later for the Shifted sync SSY A20 circuitry where use of the output parameter RS would control the relative slaving of one image sensor's field of view in relation to the other. It should however be noted that the output L1' should (for this electro mechanical system) represent an unmodified image sensor IS1 A1 frame and line sync L1 signal (not shown).

Figure 19:
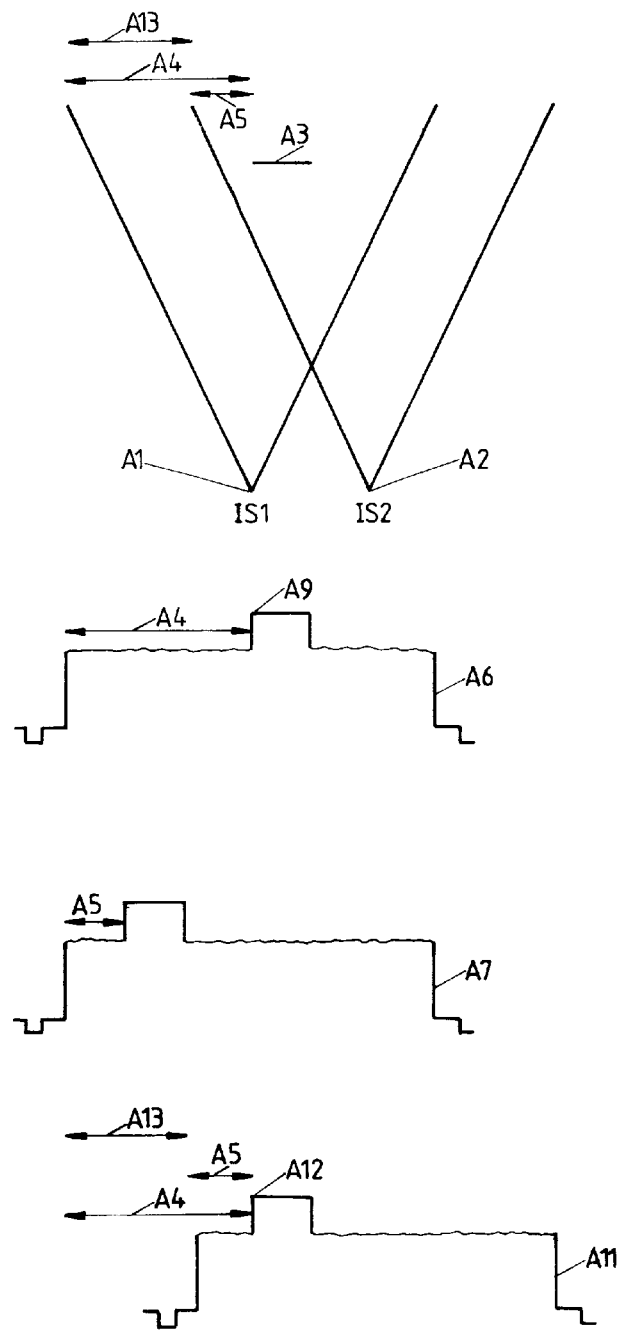
FIG. 19 shows a representation of electronic relative time shifting of subset patterns between two image sensors.

With reference to FIG. 19 showing the same image sensor and scenario as outlined above but for a system where electronic time shifting of subset patterns is employed. The luminance signals for the line scan in which the subset pattern A3 exists are shown A6 and A7 for the image sensors IS1 A1 and IS2 A2 respectively. An inter image sensor relative frame and line sync separation of the image sensors IS1 A1 and IS2 A2 representative of a relative time advance of image sensor's IS1 A1 sync in relation to image sensor IS2 A2 by A13 brings time correspondence between subset pattern A3 start times A9 for image sensor IS1 A1 and the corresponding subset pattern A3 start time A12 for image sensor IS2 A2 allowing real time hardware comparison of the subset patterns. It should be noted that the duration of subset pattern A3 remains constant. The apparent field of view rotation of image sensor IS2 A2 in relation to image sensor IS1 A1 associated with the relative frame and line sync separation A13 together with the IS1 A1 boresight relative azimuth position of the subset pattern A3 (function of subset pattern A3 start time A9) and image sensor separation allows system relative slant range to be calculated from apriori knowledge, equally from information of the subset pattern's elevation with respect to the image sensor's field of view boresight (function of line in frame) the system boresight relative height of the subset pattern A3 associated element of topographical detail is also defined.

Figure 20:
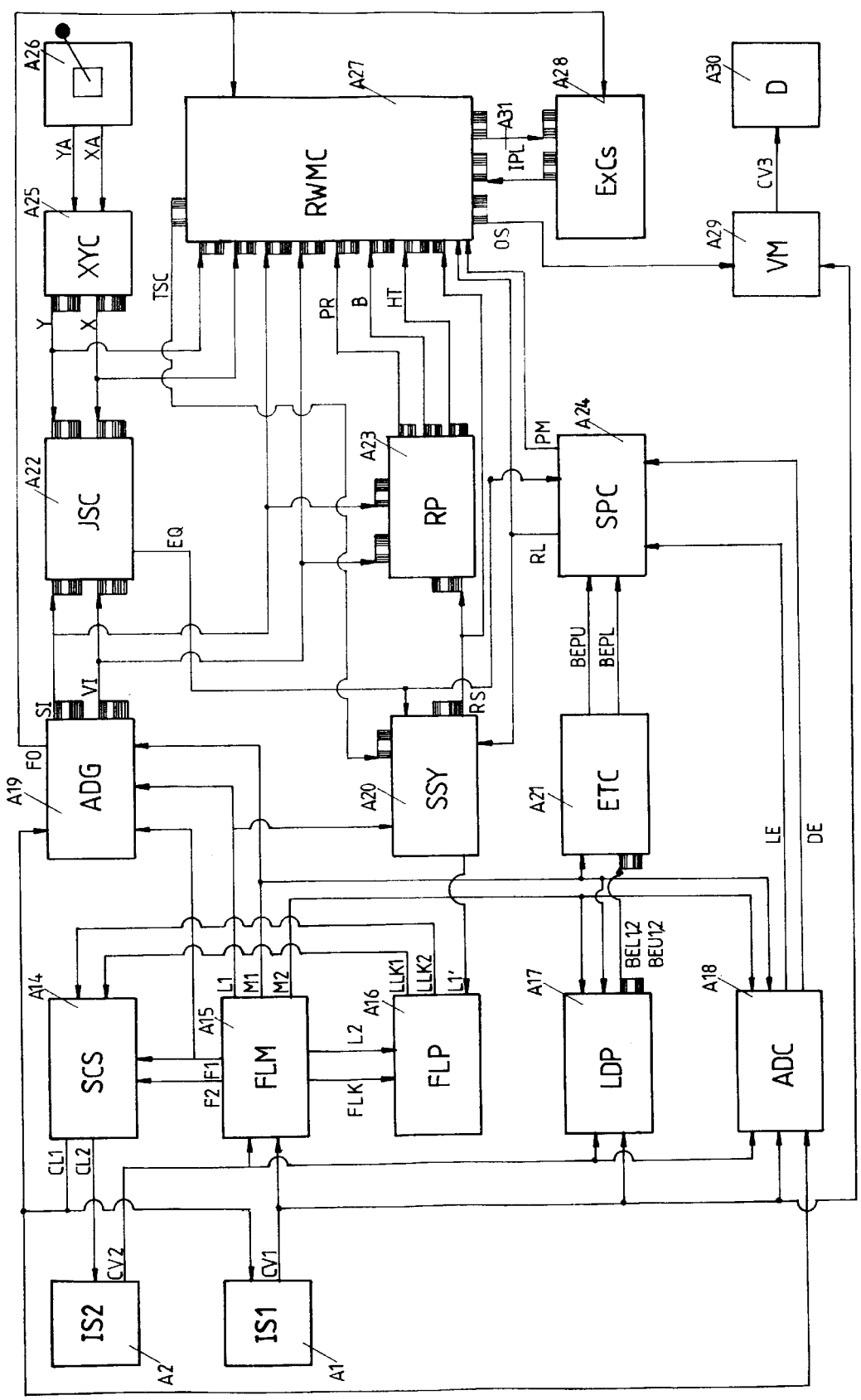
FIG. 20 shows a block diagram identifying major function areas for a subset pattern topography processing system and signals between them.

With reference to FIG. 20 two image sensors IS1 A1 and IS2 A2 CCD or equivalent are positioned with known separation and orientation such that their fields of view share a common scenario and allow different perspective views of the same scene. The physical alignment of the image sensors is such that common image detail is registered in corresponding line scans of each image sensor. The synchronisation of the image sensors in respect of their Frame and line sync generation is dynamically controlled from the Sensor clock synchronisation SCS A14 circuitry such that the relative synchronisation separation between image sensors lies within one line scans luminance period of each other. The default condition is time coincidence of the image sensors Frame and line sync generation L1 and L2 respectively. Composite video CV1 and CV2 from image sensors IS1 A1 and IS2 A2 respectively is fed to the Frame line mask FLM A15 circuitry, Luminance differential processor LDP A17 circuitry, Analogue to digital converter ADC A18 circuitry, and the Video mixer VM A29 circuitry.

The purpose of the Frame line mask FLM A15 circuitry is to strip from each of the composite video signals CV1, CV2 the Frame and line sync information L1, L2 for image sensors IS1 A1 and IS2 A2 respectively. From each of the stripped sync signals L1, L2 two further signals are generated for each image sensor, a Frame begin signal F1, F2 and a luminance mask signal M1, M2 respectively. The stripped Frame and line sync signal L1 is sent to the Shifted sync SSY A20 circuitry. The stripped Frame and line sync signal L2 is sent to the Fine line position FLP A16 circuitry. The Frame begin signals F1, F2 are passed to the Sensor clock synchronisation SCS A14 circuitry. The Frame begin F1, Frame and line sync L1, and Luminance mask M1 signals are sent to the Address generation ADG A19 circuitry. Mask information M1, and M2 are sent to the Luminance differential processor LDP A17 circuitry and Analogue to Digital converter ADC A18 circuitry.

The purpose of the Sensor clock synchronisation SCS A14 circuitry is to control clock drive CL1, CL2 to the image sensors IS1 A1 and IS2 A2 so as to establish, maintain, and in conjunction with the Fine line position FLP A16 circuitry and Shifted sync SSY A20 circuitry dynamically modify the relative synchronisation of the two image sensors. Initially the Sensor clock synchronisation SCS A14 circuitry establishes synchronisation of IS1 A1 and IS2 A2 such that a time coincidence exists between Frame and line sync generation for the two image sensors. This is achieved by monitoring the Frame begin signals F1, F2 for simultaneity and stopping the clock drive to either of the image sensors so as to achieve this, when the signal Frame lock FLK is set. The Frame lock signal FLK allows the Fine line position FLP A16 circuitry to finely adjust the relative synchronisation of the image sensors on the basis of individual line scans as determined by the L1' and L2 signals when fine adjustment of the IS1 A1, IS2 A2 clock drives. CL1 and CL2 respectively through the action of the line lock signal LLK1, LLK2 is possible. Initially the Shifted sync SSY A20 circuitry output L1' represents the unmodified Frame and line sync signal L1.

The purpose of the Shifted sync SSY A20 circuitry is to modify the apparent relative timing of the image sensor IS1 A1 Frame and line sync signal L1, by generating a time shifted sync signal L1' which is sent to the Fine line position FLP 16 circuitry, this has the effect of controlling the relative separation RS of the actual L1, L2 Frame and line sync generation by image sensors IS1 A1 and IS2 A2 respectively. The signal RS is sent to the Range processor RP A23 and the Read write memory control RWMC A27 circuitry. The Shifted sync SSY A20 circuitry operates in two main modes, either under the control of the External computer system ExCs A28 or in an autonomous mode. When under the control of ExCs A28 processor the magnitude of the time shift in L1' (relative time advance of L1 in respect of L2) characteristics relative to L1 is defined by the Time shift and control TSC parameters passed across the inter processor link IPL A31.

This mode allow s the ExCs A28 processor to control range discrimination over a specific and programmable bond of ranges. In the autonomous mode the magnitude of the L1 signal characteristics time advance with respect to L2 is controlled by a sweep generator which allows the relative Frame and line synchronisation of IS1 A1 and IS2 A2 to iteratively change step wise on an inter frame basis from time coincidence to a maximum of one line scans luminance period relative time advance of L1 in respect of L2. The iterative change of the relative synchronisation L1, L2 may be modified by the action of the Range lock signal RL.

The Address generation ADG A19 circuitry accepts clock drive CL1 from the Sensor clock synchronisation SCS A14 circuitry and the signals F1, L1, and M1. The clock CL1 is gated by the mask signal M1 and drives a series of cascaded binary counters parts of which are reset by the characteristics derived from the F1, and L1 signals, this allows address generation for each resolution period of the image sensor IS1 A1 and corresponds to the image sensor IS1 A1 current raster scan position defining line in frame SI (representative of elevation angle within the image sensor's field of view) and position in line VI (representative of azimuth angle within the image sensor's field of view). The Address generation circuitry ADG A19 also generates a signal F0 which counts frames of data and allows through this signal the double buffering of data passed across the Inter processor link IPL A31. The signals SI and VI are sent to the Toy stick comparator JSC A22 circuitry and Read write memory control RWMC A27 circuitry.

The Joy stick A26 generates X Y demands which are converted in the analogue to digital converter XYC A25 circuitry to digital values which are passed to the Joy stick comparator JSC A22 circuitry and Read write memory control RWMC A27 circuitries. The digitised X Y demands are compared in the joy stick comparator JSC A22 circuitry with the respective VI (position in line) and SI (line in frame) address identity components for image sensor IS1's A1 current raster scan position, equality of these operands sets the signal EQ which is sent to the Subset pattern comparator SPC A24 circuitry. The current X Y demands are passed via the Read write memory control RWMC A27 across the Inter processor link IPL A31 to the External computer system ExCs A28. Under control of the External computer system ExCs A28 image mapped overlay symbology OS may be generated and passed via the Inter processor link IPL A31 to the RWMC A27 circuitry which in sympathy with the SI and VI raster scan identities can pass the overlay symbology to the Video mixer A29 circuitry for superposition on image sensor IS1's A1 composite video signal to form the composite video CV3 for display on Display D A30. This overlay information supports the operator's joystick control feedback loop.

The Luminance differential processor LDP A17 circuitry accepts composite video CV1, CV2 from the image sensors IS1 A1, IS2 A2 respectively and Luminance mask signals M1, M2 from the Frame line mask FLM A15 circuitry. The purpose of the Luminance differential LDP A17 circuitry is to identify image pattern thread data, that is pattern outline and relief contour detail, according to the criteria of luminance signal frequency excursions through preset upper or lower frequency limits which generate the binary event signals BEU1, BEL1 and BEU2, BEL2 representing the binary events of frequency excursions through the upper and lower frequency set limits for the image sensors IS1 A1 and IS2 A2 respectively. These four signals are sent to the Event time coincidence ETC A21 circuitry.

The purpose of the Event time coincidence ETC A21 circuitry is to establish when similar binary events (that is for upper or (exclusive) lower frequency excursions events) occur simultaneously from both image sensors when one of the signals BEPU and BEPL is set, representative of inter image sensor binary event punctuation for upper and lower frequency excursions events respectively. These signals are reset at the start of every image sensor IS1's A1 luminance period as a function of the Mask signal M1, or by the subsequent occurrence of each other (that is a subsequent simultaneity of the signals BEU1,BEU2 or BEL1,BEL2 being set when additionally either BEPU or BEPL respectively would be set again), or the isolated occurrence of either of the signals BEU1, BEU2, BEL1, BEL2. The signals BEPU and BEPL are passed to the Subset pattern comparator SPC A24 circuitry.

The Analogue to digital converter ADC A18 circuitry accepts the composite video signals CV1 and CV2 from image sensors IS1 A1 and IS2 A2 respectively, the mask signals M1, M2 from the Frame line mask FLM A15 circuitry and the clock signal CL1 from the Sensor clock synchronisation SCS A14 circuitry. The Analogue to digital converter ADC A18 circuitry generates the digital amplitude and time differential of each of the luminance signals CV1 and CV2 and identifies (when both masks M1 and M2 are set) equality (to given precision) of pairs of elements of luminance amplitude and equality (to given precision) of pairs of elements of luminance time differential signals between the image sensors IS1 A1 and IS2 A2 generating the signals luminance amplitude equality LE and luminance time differential equality DE respectively. The signals LE and DE are passed to the Subset pattern comparator SPC A24 circuitry.

The purpose of the Subset pattern comparator SPC A24 is to establish using a multiple condition, correlation between pairs of pairs of subset pattern elements. The Subset pattern comparator SPC A24 circuitry accepts BEPU, BEPL from the Event time coincidence ETC A18 circuitry, the signals LE and DE from the Analogue to digital converter ADC A18 circuitry, and the signal EQ from the Joy stick comparator JSC A22 circuitry. When either of the signals BEPU or BEPL are set and both of the signals LE or DE are set the implication is that for the current image sensor relative sync separation RS and the real time comparison by the Analogue to digital converter ADC A18 circuitry of time shifted luminance signal attributes (amplitude and time differential) then for the pairs of pairs of subset pattern elements between image sensors now being considered a multiple match comprising the same subset pattern start criterion and equality between pairs of luminance amplitude elements and equality between pairs of luminance time differential elements has been found. This multiple condition results in the signal Pattern match PM being set.

This signal PM is passed to the Read write memory control RWMC A27 circuitry. When both pattern match PM is set and the scan equality EQ signal is set then an operator designated feature has been identified and ranged, in this mode the Range lock RL signal is set by the subset pattern comparator SPC A24 circuitry and passed to the Shifted sync SSY A20 circuitry which then stops iterating through the entire image sensor relative sync separation sequence (entire range sequence) and performs tracking of the designated feature by allowing only the minimal perturbations to the relative sync separation between the two image sensors necessary to effect this.

The Range processor RP A23 circuitry, comprises an identity transform processor, which accepts on a continuous basis the signals, current relative synchronisation separation RS from the Shifted sync SSY A20 circuitry, and the Address generation ADG A19 output of SI and VI line in frame and position in line identities, these allow the real time computation of the identities of system relative slant range and system boresight relative height based on the current mix of parameters submitted and which in the presence of the Pattern match signal PM would correspond with ranging to a real element of topographical detail. This data is passed on a continuous basis to the Read write memory control RWMC A27 circuitry which allows, in conjunction with the signal PM being set, entries to be made in the systems, three dimensional scenario data base.

Figure 21:
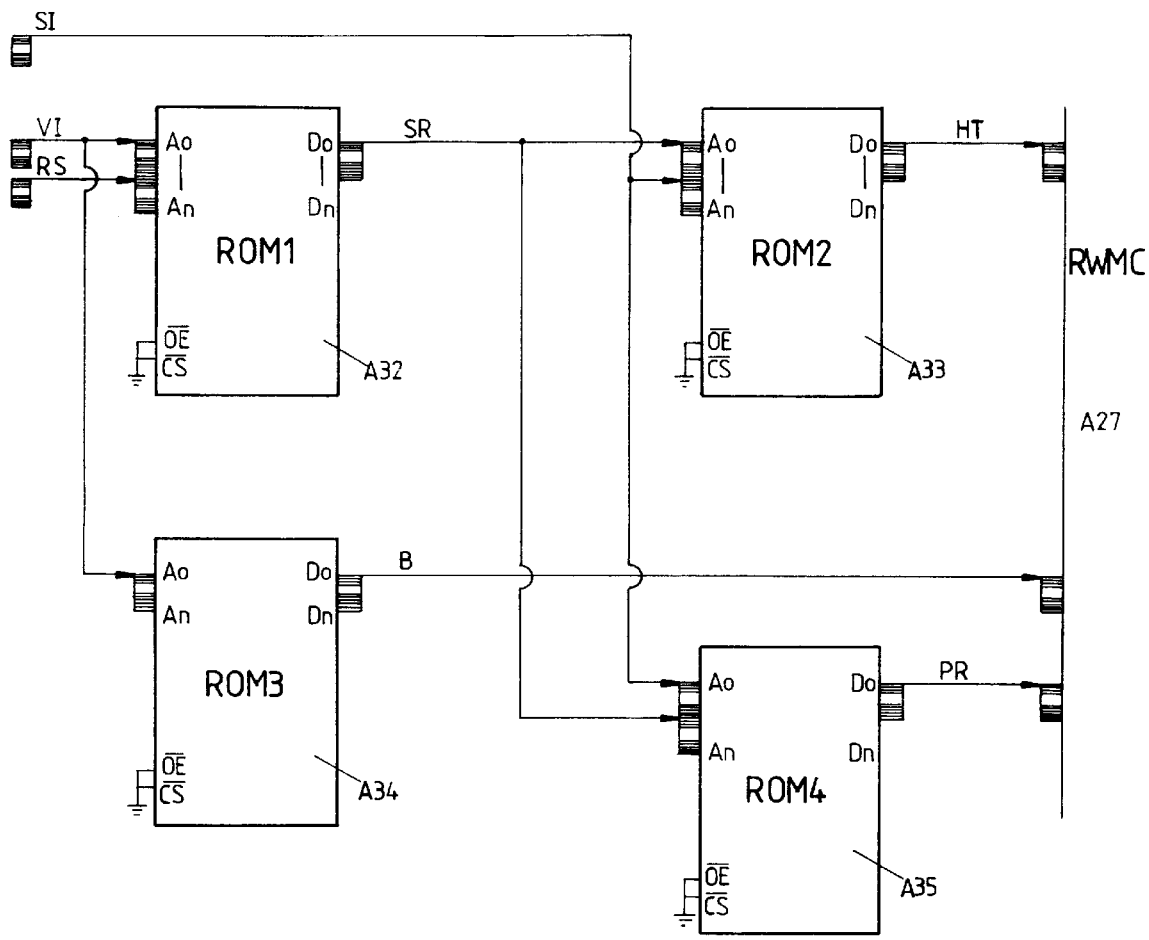
FIG. 21 shows an organisation of a subset pattern range processor.

With reference to FIG. 21 which shows an organisation of the Range processor RP A23 comprising Read only memories ROMs supporting identity transform processes. The purpose of the range processor is to calculate, within every resolution period of the image sensor, from apriori knowledge of possible vector intercepts between pairs of correlated subset pattern elements (one from each image sensor) the system relative plan range PR, bearing B, and height HT of the associated element of topographical detail. This information is presented on a continuous basis to the Read write memory control RWMC A27 which interprets this data as real or imaginary on the basis of the Pattern match signal PM being set. For the known image sensor separation and orientation, the partial address component VI and Shifted relative frame and line sync RS presented to ROMI A32 generates as output a system Slant range SR identity which is passed as a partial address component to ROM2 A33 and ROM4 A35. ROM2 A33 also accepts the partial address component SI and resolves the Slant range SR identity through the SI implicit current system boresight relative elevation angle to produce as output the system axis relative height HT to the element of topographical detail. The Slant range SR identity passed as a partial address component to ROM4 A35 now combines with the partial address component SI. The output of ROM4 A35 is the system axis Plan range PR to the element of topographical detail. ROM3 A34 accepts only the azimuth angle VI parameter as an address definition and generates as output a system bearing to the element of topographical detail. The maximum precision of the processor output is a function of the separation and resolution of the image sensors reflected in the input parameter precision and definition of the data sets defined for the ROMs. The ROMs may be stage wise added to in parallel fashion to gain increased precision of the output identities at no loss to the effective multiple address time of the processor. The data sets contained in the ROM'S A32–A35 are defined off line using high level modelling techniques.

The Read write memory control RWMC A27 circuitry accepts continuous plan range bearing and height information output from the Range processor RP A23 circuitry. The subset of this data representing valid elemental topographical detail ranging information is identified by the Pattern match PM signal being set when, by using the frame identity signal F0 from the Address generation circuitry ADG A19 circuitry entries of this valid range information are made into the double buffered memories contained within the Read write memory control RWMC A27 circuitry comprising the systems three dimensional scenario data base allowing access by the External computer system ExCs A28 via the Inter processor link IPL A31.

For an operator designated marking of-image sensor IS1's A1 displayed imagery via the Video mixer VM A29 on Display D A30 the occurrence of the Range lock signal RL (from the subset pattern comparator SPC A24 circuitry) allows dedicated return of this unique range, bearing and height information to the External computer system ExCs A28 through the double buffered memories via the Inter processor link A31.

In relation to graphic macro diagnostics, this system which is largely asynchronous does afford a number of possibilities for macro diagnostic analysis including the anticipated monitoring of image sensor video signals by the introduction of CV1 and CV2 to the display D A30. Mixing of the image pattern thread processor LDP A17 outputs BEL1, 2 and BELU1, 2 with appropriate frame and line sync signals L1 and L2 respectively allows the display of image sensor IS1 and IS2 upper and lower frequency excursion events. Mixing of IS1 luminance signal or binary event data with IS2 frame and line sync allows monitoring of the shifted sync SSY A20 functionality. Mixing of the pattern match PM signal with L2 allows a screen mapping of correlatable range information. Stability of the RL range lock signal over a frame period is monitorable by mixing of this signal with either L1 or L2 for display of a composite video signal on D A30. Whilst these are only a few of the obvious examples of the use of visual macro diagnostics techniques for this type of system, and whist such a system in respect of stereo vision may be in sympathy with our (human) expectation of mapping systems, it suffers from a relatively slow (iterative) approach to single point ranging. Further in relation to generic pattern derived ranging such ranging has only a limited probability of validity since the noise rejection of such a system in relatively poor.

Figure 22:
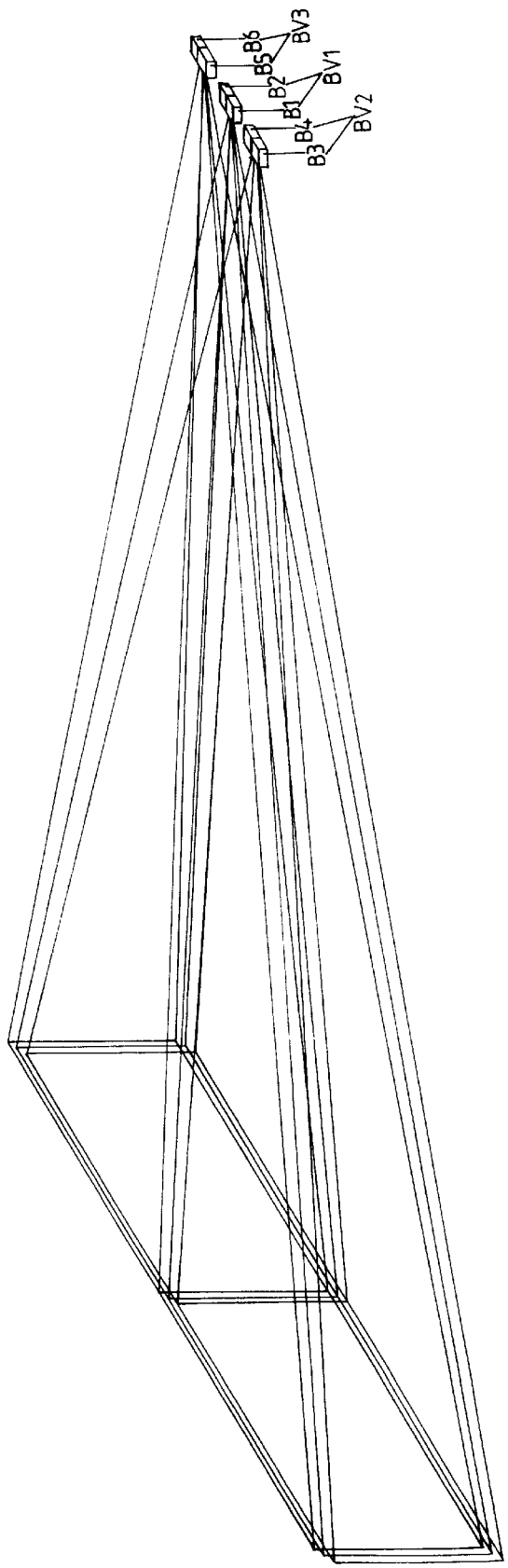
FIG. 22 shows a common scenario viewed by three virtual image sensors comprising ordered pairs of image sensors of a phased virtual image sensor array.

Referring exclusively to the FIGS. 22–25 a phased virtual image sensor array is described in greater detail here and utilises some generic functionality and signals already introduced in earlier text. With reference initially to FIG. 22 which shows a horizontally aligned phased virtual image sensor array BV1, BV2, and BV3 comprising three ordered pairs of image sensors CCD or equivalent B1 and B2, B3 and B4, B5 and B6 respectively. The orientation of the image sensors comprising an ordered pair supports a field of regard comprising the adjoining fields of view of each image sensor of the pair. Each virtual image sensors is positioned at known separation from each other in the phased array, in this example horizontally aligned such that their orientation ensures that the boresights of the fields of view of each of the virtual image sensors are parallel and that the field of view of each virtual image sensor shares a common scenario with the other virtual image sensors and where common image detail is contrived to register in corresponding line scans of the virtual image sensors.

Figure 23:
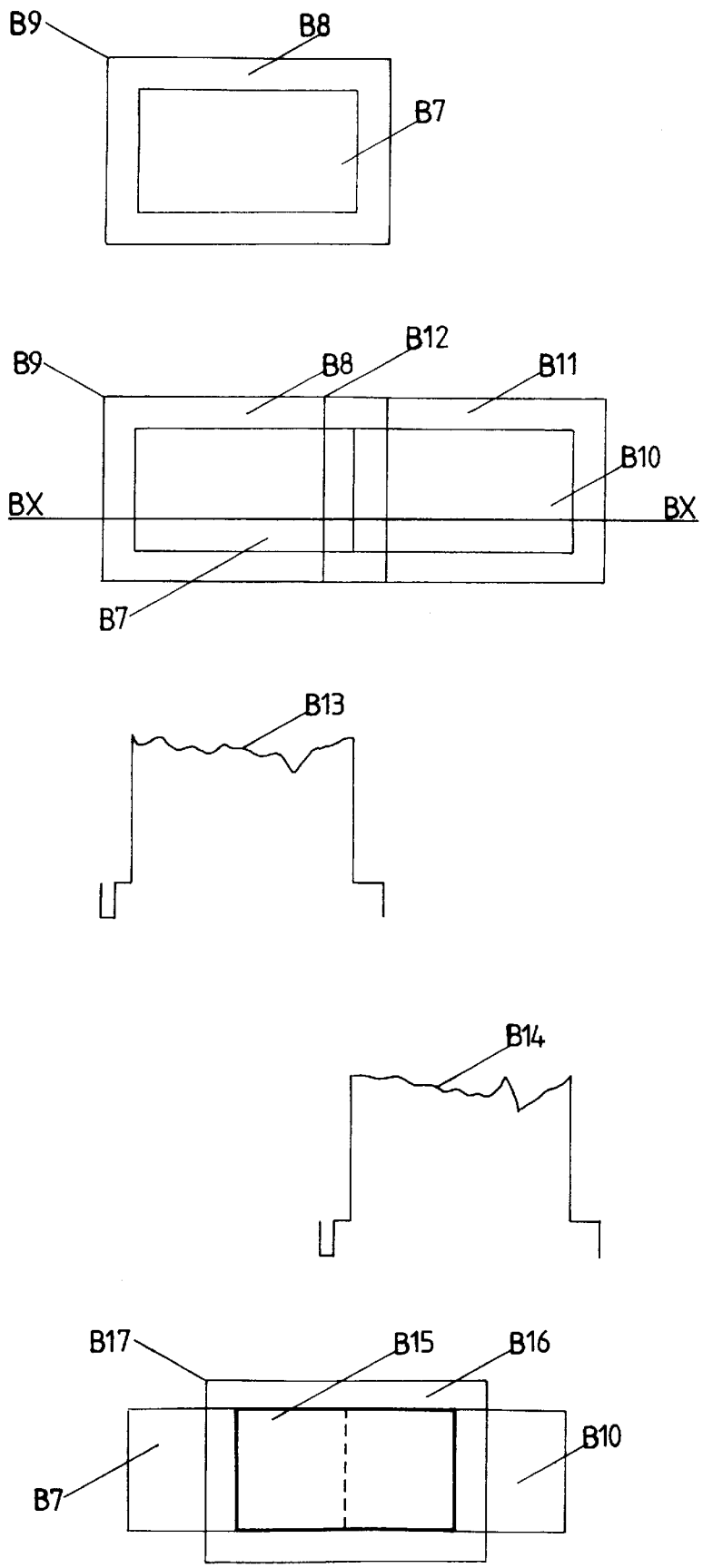
FIG. 23 shows a representation of the time distribution of image data from an ordered pair of image sensors comprising a virtual image sensor.

A representation of the time distribution of image information from a typical image sensor FIG. 23 shows visible luminance data B7, frame and line sync, porch and non visible luminance information B8 with a Frame begin time B9. For the ordered pairs of image sensors comprising each virtual image sensor the relative image sensor synchronisation is organised such that the lefthand image sensor of a pair has frame begin time B9 whilst the righthand image sensor of the pair has the relative frame begin time B12. Visible luminance information for the righthand image sensor of the pair exists in the rectangle B10, the border area B11 comprises the frame and line sync, porch and non visible luminance information of this image sensor. A time slice BXBX would comprise line scan information B13 and B14 from the two image sensors comprising an ordered pair such that luminance information between them is continuous in time. A subset of luminance information B15 comprising a field of view equivalent to the field of view of either image sensor in a pair may be extracted and combined with synthetic frame and line sync information B16 to form a frame of composite video signal of a virtual image sensor with Frame begin time B17. This field of view Bl5 is capable of being slaved within a field of regard as defined by the combined fields of view B7 and B10 of each image sensor in the pair, in this example allowing an azimuth scan.

Figure 24:
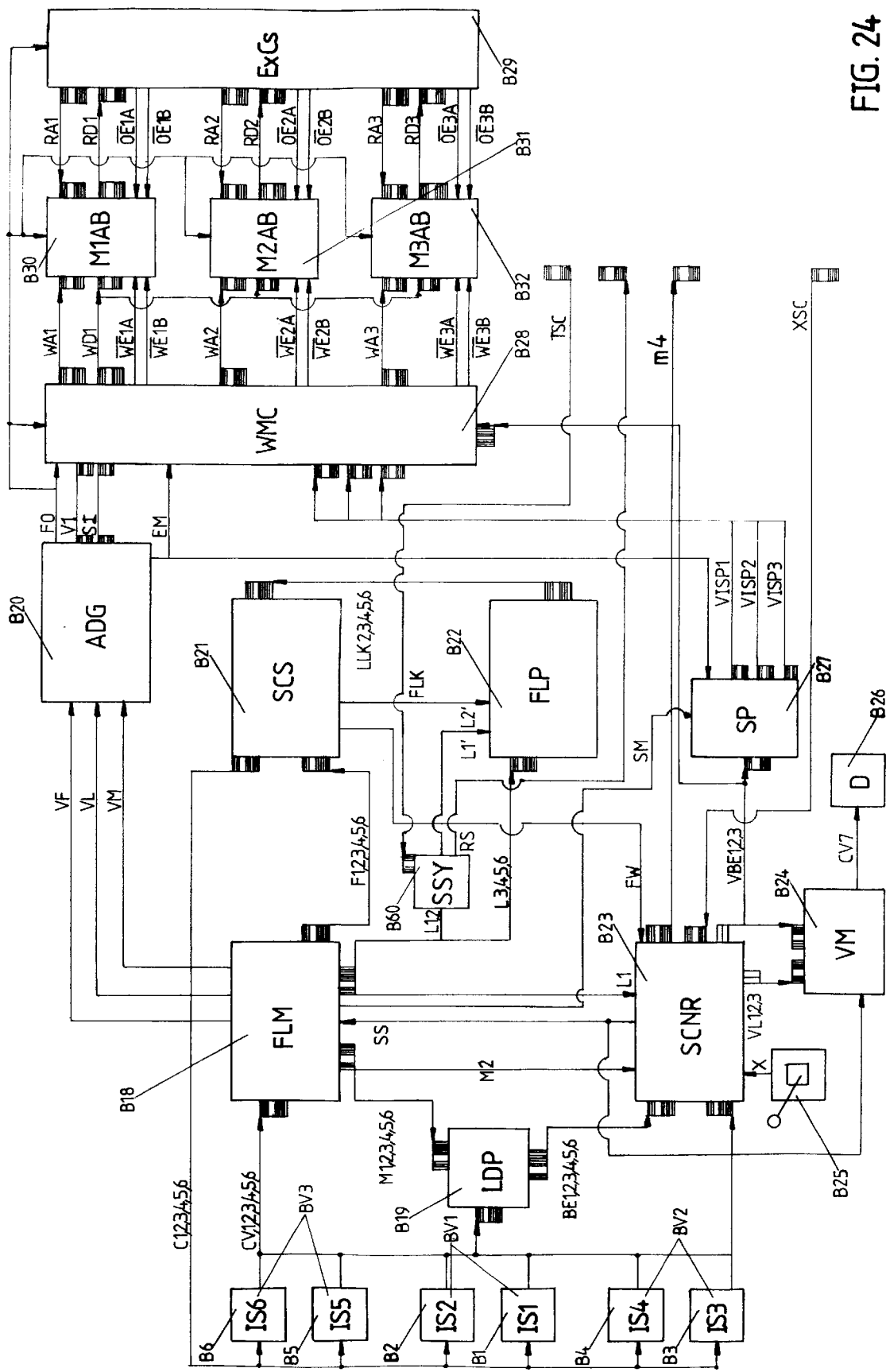
FIG. 24 shows a block diagram identifying major functional areas and important signals between them for a phased virtual image sensor array
Figure 25:
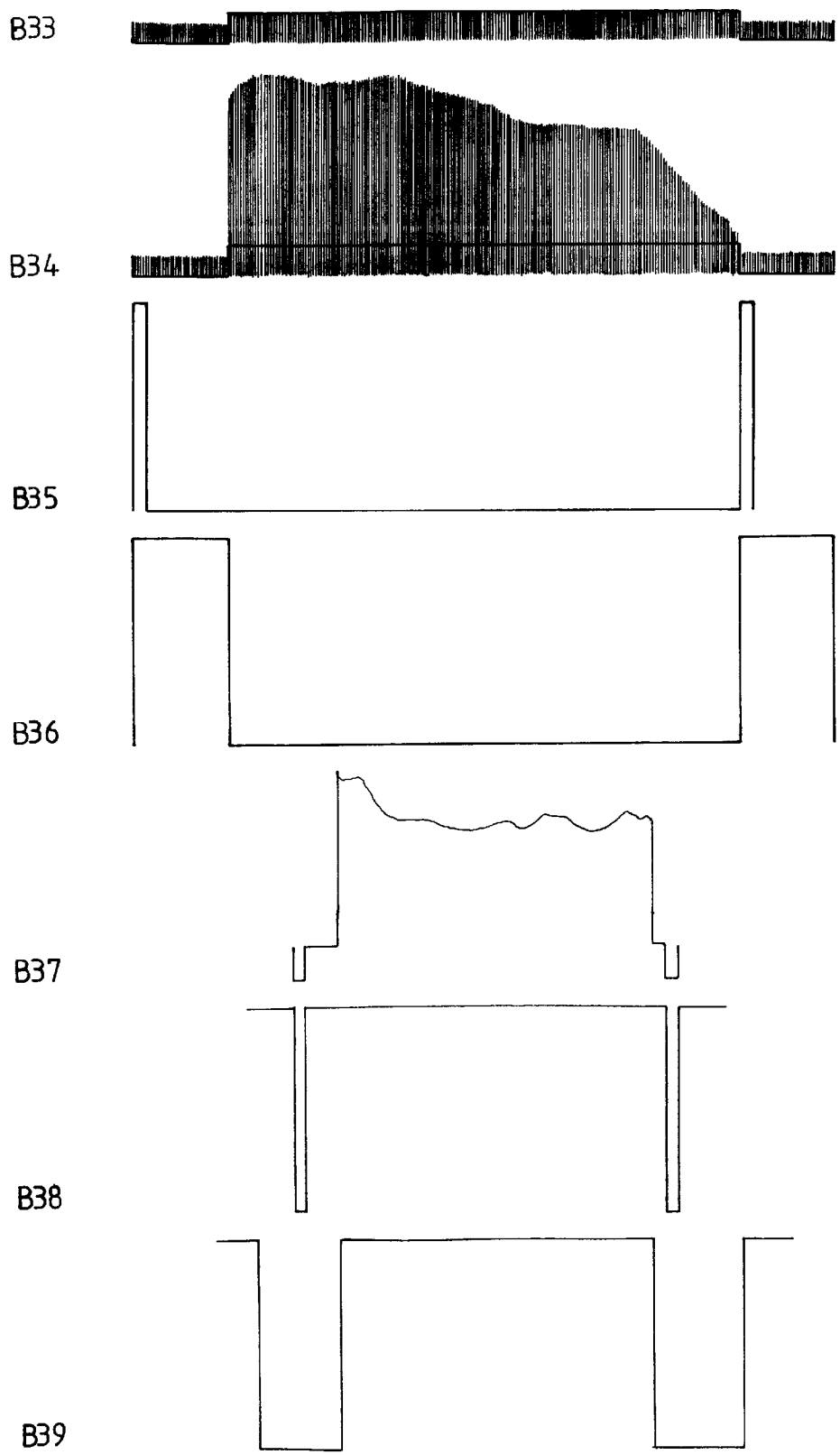
FIG. 25 shows important waveforms used in a phased virtual image sensor array.

With particular reference to the system block diagram FIG. 24 composite video CV1,2,3,4,5,6 from the image sensors B1,B2,B3,B4,B5,B6 respectively is passed to the Frame Line Mask FLM B18 circuitry which generates Frame begin signals F1,2,3,4,5,6 waveform B35, Frame and Line sync signals L1,2,3,4,5,6 waveform B38, and Luminance Mask signals M1,2,3,4,5,6 waveform B39 for each of the image sensors. Frame begin signals F1,2,3,4,5,6 are passed to the Sensor Clock Synchronisation SCS B21 circuitry and Frame and line sync L3,4,5,6 are passed to the Fine Line Position FLP B22 circuitry. Frame and line sync information L1, L2 from image sensors B1 and B2 are normally passed unmodified via the Shifted SYnc SSY B60 circuitry as L1' and L2' respectively to the Fine line position FLP B22 circuitry. Frame and line sync information L1 is also passed to the Scanner SCNR B23 circuitry.

The purpose of the Sensor clock synchronisation SCS B21 circuitry is to establish and maintain the necessary relative Frame and line synchronisation between the image sensors B1,B2,B3,B4,B5,B6 in the array.

The Sensor clock synchronisation SCS B21 circuitry achieves this in conjunction with the Fine line position FLP B22 circuitry by controlling the clock drive to each of the image sensors in the array thereby controlling each image sensors Frame and line sync generation which provides the control feedback loop to the SCS B21 circuitry. In this particular example image sensor IS1 B1 is used as a reference sensor, and the relative Frame begin time synchronisation of left and righthand image sensors of a pair is such as to correspond with that shown in FIG. 23 where the Frame begin time for the lefthand image sensor of a pair IS1, IS3, and IS5 is represented by B9, whilst the relative Frame begin time synchronisation for the righthand image sensor of a pair IS2, IS4, and IS6 is represented by B12. The SCS B21 circuitry also generates a Frame window FW signal waveform B36 which corresponds with the frame syncing period this signal is passed to the Scanner SCNR B23 circuitry.

The purpose of the SCaNneR SCNR B23 circuitry is to allow controlled automatic or manual scanning of each virtual image sensors field of regard by the virtual image sensors field of view. It comprises a clock whose pulse rate is variable and during frame sync periods as defined by the signal FW waveform B36 drives a cascaded count up counter whose maximum count corresponds with the number of sensor resolution periods in a luminance period. This counter automatically resets when the maximum count is reached. During any particular frame period this count up register holds a particular and fixed value which represents the Scanner's Frame and line sync RS time offset, (image sensor resolution periods), relative to the reference sensor's IS1 B1 Frame and line sync generation. The output from this counter is loaded for every line scan of a frame into cascaded count down registers by the action of the image sensor IS2 mask signal M2 waveform B39 going low. A clock also gated by the Mask M2 and operating at the maximum frequency of the image sensors bandwidth, counts down the value loaded into the cascaded count down registers. When the output of all these cascaded count down registers reach zero, elements of frame and line sync information are generated, which over the course of a frame period forms the synthetic Frame and line sync information SS to be combined with subsets of luminance signals LS1,2, LS3,4, LS5,6 extracted from the image sensors of the ordered image sensor pairs B8 and B2, B3 and B4, B5 and B6 respectively, thereby forming for each virtual image sensor a composite video signal. Because the relative Frame and line sync generation between each image sensor in an ordered pair is the same and because each lefthand image sensor synchronisation of an ordered pair corresponds with the synchronisation of image sensor IS1 the synthetic sync information SS so generated is appropriate for the combined luminance subsets for all virtual image sensors formed by each ordered image sensor pair in the phased virtual image sensor array.

Since in this example the image sensors are horizontally aligned virtual image sensor subsets of luminance signals may only be offset in a horizontal direction, there being no sensible possibility here to scan the combined field of views in a vertical plane. To generate the necessary luminance subset masks, image sensor IS2's 82 Mask M2 rising edge triggers a monostable generating a signal Q whose maximum duration is greater than 0.064 ms. The presence of signal Q forces the selection of luminance from image sensors IS2 B2, IS4 B4, and IS6 B6 for the virtual image sensors BV1, BV2, and BV3 respectively. The monostable is reset by the action of the countdown registers producing a zero result and the presence of signal Q's compliment Q is the mask signal used to select luminance subsets from image sensors IS1 B1, IS3 B3, and IS5 B5 for the virtual image sensors BV1, BV2, and BV3 respectively. Combined luminance subset signals are selected and combined through analogue switching gates controlled by the signals Q and its compliment Q and form the Luminance signals VL1, VL2, and VL3 of the virtual image sensors BV1, BV2, and BV3. Composite video CV7, comprising a particular virtual image sensors processed luminance subset signal combined with shifted Frame and line sync information SS through the action of the Video mixer VM B24 may be displayed on Display D B26.

In this particular example an image pattern thread processor comprising Luminance Differential Processor LDP B19 circuitry, Address generation ADG B20 circuitry, and Stack pointer SP B27 circuitry is employed. The LDP Bl9 circuitry essentially performs spectral analysis of the luminance signal from each image sensor. The binary event signals BE1, 2, 3, 4, 5,6 produced by the luminance differential processor from the composite video signals CV1,2,3, 4,5,6 of the image sensors B1,B2,B3,B4,B5,B6 respectively are also passed to the Scanner SCNR B23 circuitry. The binary nature of these signals allows direct logic gating with the subset luminance mask signals Q and its compliment to generate the virtual image sensor binary event signals VBE1, VBE2, and VBE3 of each of the virtual image sensors BV1, BV2, and BV3 respectively. These signals may be similarly combined with the synthetic Frame and line sync information SS in the Video mixer VM B24 to form the composite video signal CV7 for display on Display D B26.

Automatic electronic co-operative scanning rates of the virtual image sensors across their field of regard are manually variable by modification of the scanners SCNR B23 variable rate clock frequency. This example allows the output from the integrator count up counter to be overridden and control and slave position XSC taken from an external processor, simplified here by the use of the digitised output from the X potentiometer demand of a Joystick B25. This feature allows synchronous and co-ordinated horizontal scanning by each of the virtual image sensors fields of view under manual control, across the field of regard formed by the combined fields of view of an image sensor pair. The synthetic Frame and line sync SS generated by the Scanner SCNR B23 appropriate to any particular position of the slaved virtual image sensor field of view boresight is passed to the Frame line mask FLM B18 circuitry which generates the associated Frame begin signal VF waveform B35, Frame and line sync signal VL waveform B38, and Mask signal VM waveform B39 appropriate for each of the virtual image sensors in the array, these signals are passed to the ADdress Generation ADG B20 circuitry. The SCNR B23 also generates as output the signal m4, suitable for passing across an inter process link, which defines the actual scan position of each virtual image sensor's field of view boresight within its field of regard common in this example for all virtual image sensors.

The Address generation circuitry ADG B20 circuitry supports output to an External computer system ExCs B29 of image data from the virtual image sensor array in this example for the particular vector attributes identified by the LDP B19 circuitry. To achieve this the ADG B20 circuitry generates identities representative of the azimuth VI, position in line, and elevation SI, line in frame, within a virtual image sensors field of view of any possible frequency excursion events identified by the LDP B19 circuitry, both the signals VI and SI are passed to the Write memory control WMC B28 circuitry. In this particular example the memory used is physically partitioned according to frame, virtual image sensor, and binary event attribute, but only logically partitioned within a frame on the basis of the line scan SI identity. The Address generation ADG B20 circuitry also generates an End marker EM signal, this signal is passed to both the Write memory control WMC B28 circuitry and Stack pointer SP B27 circuitry and is used to terminate line stacks at the end of each virtual image sensors luminance period. The ADG B20 circuitry also generates the signal F0 which identifies odd and even frames and thereby allows the Write memory control WMC B28 circuitry and External computer system ExCs B29 double buffering of memories M1AB, M2AB, and M3AB used in the inter processor link.

Binary event data output from the Luminance differential processor LDP B19 for each virtual image sensor is passed to the Stack Pointer SP B27 circuitry which generates for each of the virtual image sensors a pointer VISP1, VISP2, VISP3 within each stack, contained in the memories M1AB, M2AB, and M3AB respectively to the particular address to be used, at the next binary event from a particular virtual image sensor, to store its associated vector identity VI.

The Write memory control WMC B28 combines the information from the Address generation ADG B20 circuitry and Stack pointer SP B27 circuitry to generate specific addresses WA1=SI+VISP1, WA2=SI+VISP2, and WA3=SI+VISP3 in partitioned memory into which identities WD1=WD2=WD3=VI for frequency excursions events from a particular virtual image sensor and line scan and attribute are written. The binary event signals from a particular virtual image sensor in conjunction with the signal F0 are used to generate the WE signals WE1A, WE1B, WE2A, WE2B, WE3A, and WE3B for the currently available memory associated with a specific image sensor. F0 allows the double buffering of memory where address and data lines are buffered for writing as well as reading by the use of sets of three state gates for the A and B memories involved, allowing an External computer system ExCs B29 continuous processing of frame organised data.

For the generic pattern derived topography processor the functionality described above is sufficient, however in the context of the subset pattern topography processor the functionality of the shifted sync SSY circuitry is important and follows. The purpose of the Shifted sync SSY B60 circuitry is to override the co-operative synchronous scan of the virtual image sensors and permit relative to the reference virtual image sensor an asynchronous scan (ie non parallel field of view boresights and non time coincidence between virtual image sensor frame and line sync signals) by the other virtual image sensors. This feature allows the fields of view of the other virtual image sensors to effectively scan the field of view of the reference virtual image sensor. This is achieved by modifying the apparent relative timing of the virtual image sensor V1's Frame and line sync signal by generating a time shifted sync signal L1' and L2' from the signals L1 and L2 respectively which are sent to the Fine line position FLP B22 circuitry, this has the effect of controlling the relative separation of the Frame and line sync generation by virtual image sensors BV2 and BV3. The Shifted sync SSY B60 circuitry operates in two main modes, either under the control of the External computer system ExCs B29 or in autonomous mode. When under the control of ExCs B29 the magnitude of the time shift in L1' and L2' characteristics relative to L1 and L2 respectively and thereby BV1 relative to BV2 and BV3 is defined by the Time shift and control TSC parameters. In the autonomous mode the magnitude of the BV1 frame and line sync characteristics delay with respect to BV2 and BV3 is controlled by a sweep generator which allows the relative Frame and line sync of virtual image sensors BV2 and BV3 in respect of the reference virtual image sensor V1 to iteratively change step wise for each new frame period from time coincidence to a maximum of one line scan luminance period.

With reference exclusively to FIGS. 26–31 a more detailed description of virtual image sensor functionality is included here which employs generic functionality and signals already introduced in earlier text. A virtual image sensor or sensors comprises a number of image sensors of equal magnification organised in an array, where the logical and physical position and orientation of each such image sensor in the array is such that the individual fields of view of such image sensors may be considered collectively to cover a continuous scenario comprising the individual images from each image sensor. It is possible, by suitably controlling the frame and line synchronisation signal generation of each such image sensor, that luminance information continuous in time may be considered to exist between corresponding line scans of adjacent image sensor image boundaries, such that one or more subsets of luminance information may be taken from one or more of the adjacent image sensor's composite video signals in real time and combined with appropriate synthetic frame and line sync information so as to generate the composite video output of a virtual image sensor or sensors. The field of view of such a virtual image sensor or sensors is equal to the field of view of any image sensor in the array. It is possible under manual or automatic control, by modifying in each case both the subsets of luminance signals extracted from individual image sensors in the array, and the generation of its associated synthetic frame and line sync information, to accurately slave each of the virtual image sensor or sensors field or fields of view to particular or different points in, or scanning with each of the virtual image sensor's field of view a field of regard comprising the individual fields of view of the image sensors in the array.

Figure 26:
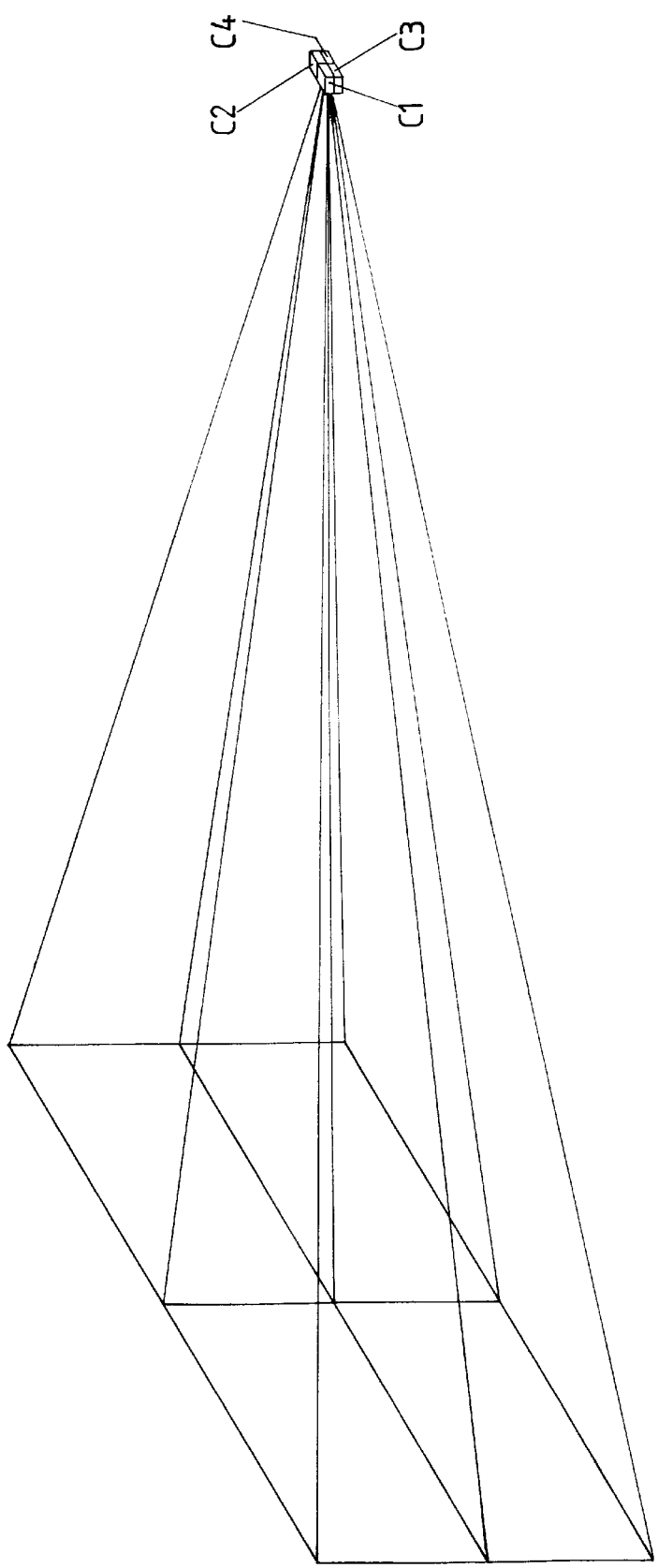
FIG. 26 shows an array of four image sensors comprising a virtual image sensor where their individual fields of view are aligned to cover a continuous scenario comprising the separate images of each image sensor.

With particular reference to FIG. 26 an image sensor's field of view may be considered of pyramid shape with rectangular cross-section extending from the image sensor such that in this example an array of four such similar image sensors C1,C2,C3,C4 are organised as an array and so aligned as to collectively view a continuous scenario comprising the component images of each the image sensors.

With reference to FIG. 27 the time distribution of information contained in the composite video signal of an image sensor is such that display visible luminance is contained in the central rectangle C5 and sync, porch and non visible luminance information is contained in the border area C6. Within a frame of data waveform C31 time begins, (Frame begin time waveform C33), at the extreme top left corner C7 and increases left to right in successive horizontal lines from top to bottom. A particular time slice CXCX within a frame of data is shown C8. For a UK system the time from the extreme top left C7 to extreme bottom right C35 is 20 ms and the duration of an individual line scans is 0.064 ms.

Figure 28:
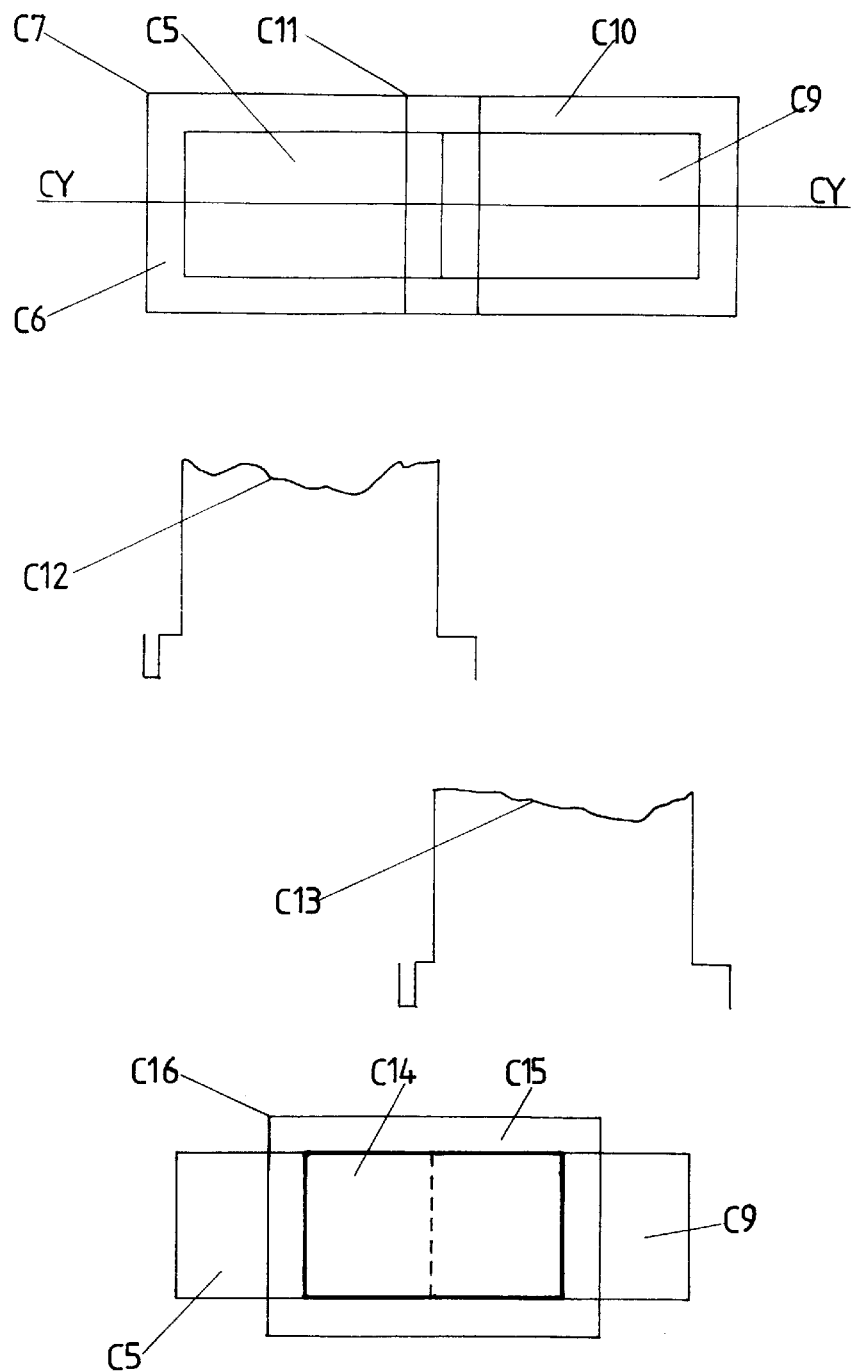
FIG. 28 shows a representation of the necessary time distribution of information within two frames of composite video from two horizontally aligned and synchronised image sensors capable of supporting virtual image sensor subsets in azimuth.

With reference to FIG. 28 a representation of the necessary time distribution of information between two image sensors horizontally aligned and capable of supporting a virtual image sensor where frames of data would comprise luminance subsets in azimuth C16 is shown necessitating the relative time offset of Frame begin time C11 of the righthand image sensor of the pair, to the Frame begin time C7 of the lefthand image sensor of the pair. It can be seen that the luminance regions C5 and C9 of the two image sensors may be considered line-wise to be continuous in time and a time slice at CYCY would comprise the line scans C12 & C13 of the left and right hand image sensors respectively.

Similarly for the four such image sensors C1 C2 C3 C4 positioned and aligned according to FIG. 26 then the necessary time distribution, with reference to FIG. 29, of information to support virtual image sensor frames of data comprising subsets of luminance information in both azimuth and elevation C23 requires that the relative Frame begin times for the image sensors C1,C2,C3,C4 is given by the Frame begin times C7,C11,C19 and C22 respectively. In this particular example the Frame begin time C11 of image sensor C2 is offset from the Frame begin time C7 of image sensor C1 by the same amount as the offset of the Frame begin time C22 for image sensor C4 in respect of the Frame begin time C19 for image sensor C3, further the offset between Frame begin times C7 and C19 for image sensors C1 and C3 respectively is the same as the offset between Frame begin times C11 and C22 that for image sensors C2 and C4 respectively.

Figure 30:
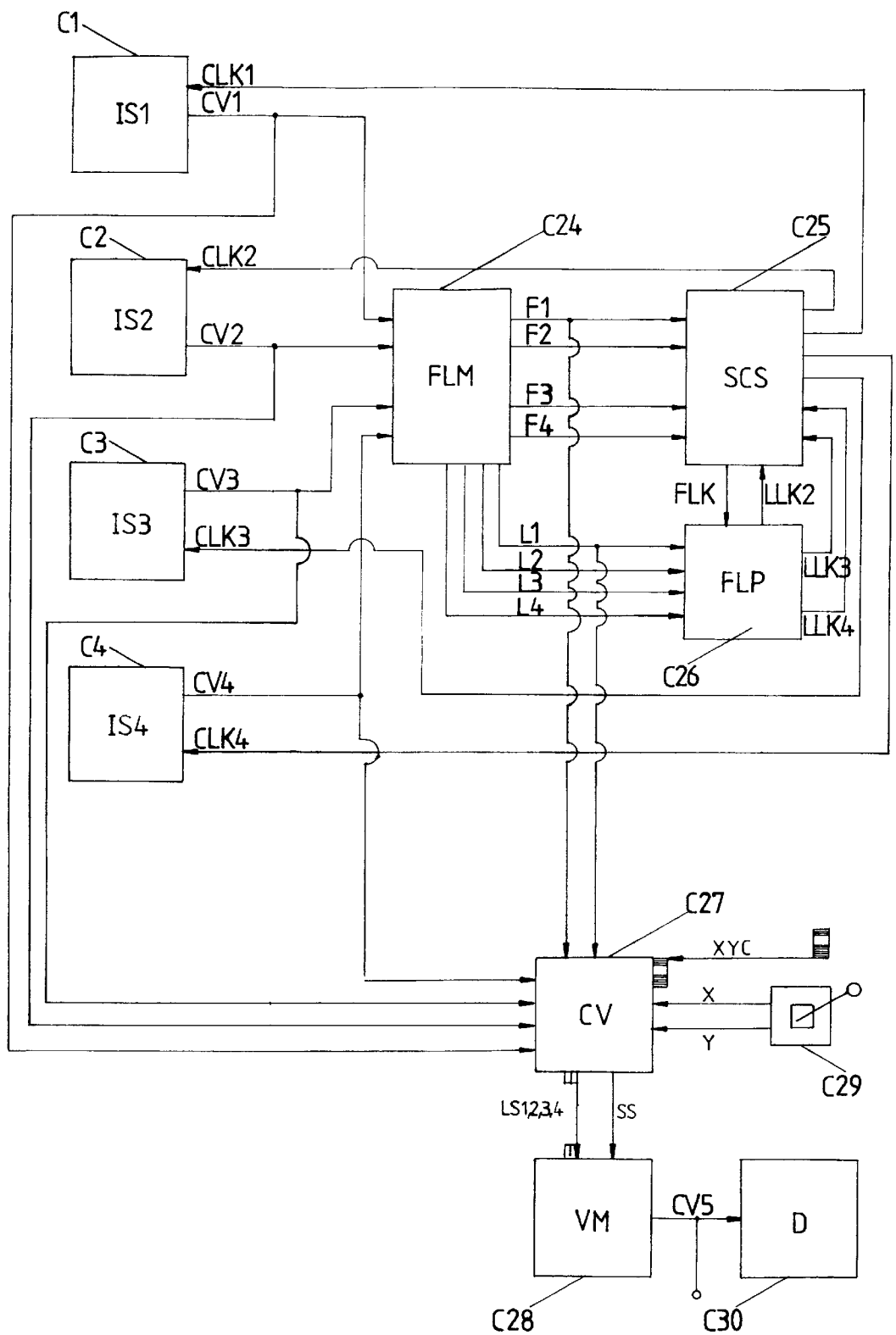
FIG. 30 shows a system block diagram identifying important functional areas and important signals between them capable of supporting a virtual image sensor.
Figure 31:
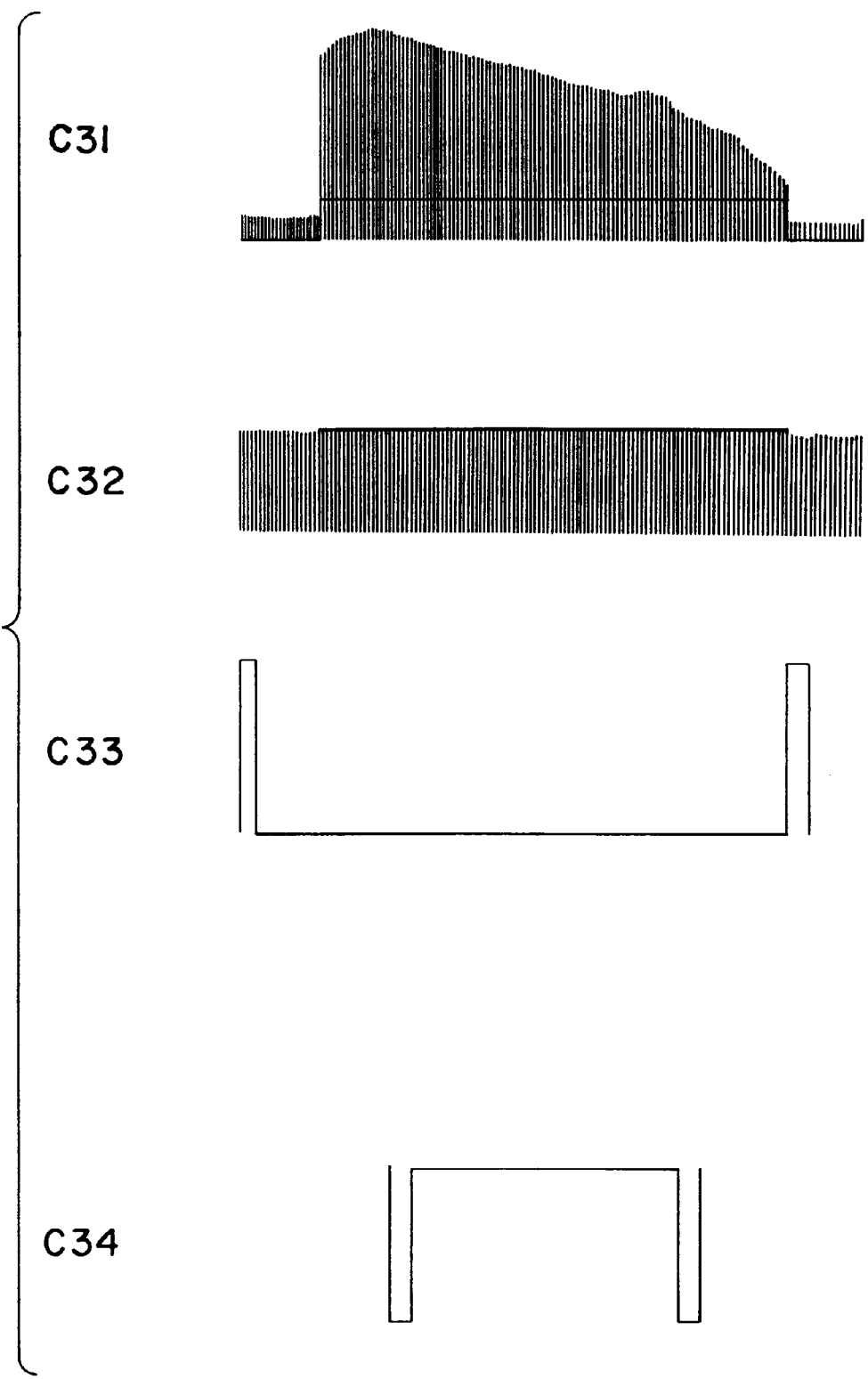
FIG. 31 shows important signal waveforms used in a virtual image sensor system.

With reference to the system block diagram FIG. 30 the four image sensors C1 C2 C3 C4 are normal CCD image sensors except that their system clock crystals have been removed and their clock input pins wired to accept an external clock drive CLK1, CLK2, CLK3, CLK4 respectively. The composite video signals CV1, CV2, CV3, CV4 from the image sensors is fed to the Frame Line Mask FLM C24 circuitry and Combined Video CV C27 circuitry.

The purpose of Frame line mask FLM C24 circuitry is to extract from each image sensor's composite video signal the Frame and line sync information L1, L2, L3, L4, waveform C34, and pass these signals to the Fine Line Position FLP C26 circuitry. Further FLM C24 uses these stripped sync signals to generate a further signal per image sensor, the Frame begin signals F1, F2, F3, and F4 waveform C33 which are passed to the Sensor Clock Synchronisation SCS C25 circuitry.

The Sensor clock synchronisation SCS C25 circuitry controls the clock generation for each image sensor in such a way as to ensure the necessary time relative frame and line sync generation of each image sensor. In this example this is achieved by stopping individual image sensor clocks to bring the synchronisation of all the image sensors to meet a particular criterion. Consider that image sensor's C1 synchronisation is being used as a reference and that the relative synchronisation of image sensor C2 is required, by way of example, to be 0.05 ms later while image sensor C3 in respect of image sensor C1 is required to be 18 ms later and image sensor C4 with respect to image sensor C1 is required to be 18.05 ms later. If the Frame begin signal F2 for image sensor C2 is delayed by 19.95 ms and that for image sensor C3 F3 is delayed by 2 ms and similarly that for image sensor C4 F4 is delayed by 1.95 ms then if the image sensors meet the required synchronisation the F1, and delayed Frame begin signals F2, F3, and F4 will occur simultaneously and the signal Frame LocK FLK will be set true and remain set for a number of frame periods. Under these conditions each image sensor will be driven continuously by a common system clock. If however, for example, image sensor C1 generates its Frame begin F1 pulse before the other image sensors delayed Frame begin pulses Fin) its clock drive is stopped, similarly the next image sensor to generate a delayed Frame begin F(n) signal has its clock stopped until all image sensors have generated their respective delayed frame begin signals. The instance the last (in this case) delayed Frame begin pulse arrives all image sensor clock drives are restarted. Synchronisation is essentially instantaneous and once synchronised FLK is used to maintain a continuous clock drive to the reference image sensor however all other image sensor clock drives may be operated on when FLK is set by the circuitry of Fine line position FLP C26 circuitry.

The Fine line position FLP C26 circuitry operates on a similar principle of image sensor clock drive control using the Frame and line sync information L1, L2, L3, and L4 waveform C34 rather than Frame begin signals and exercises greater sensitivity such that only single clock periods per line scan period are used to adjust the synchronisation of a particular image sensor in maintaining an accurate relative synchronisation between all image sensors in the system. The feedback loop from the Fine line position FLP C26 circuitry to the Sensor clock synchronisation SCS C25 circuitry to achieve this functionality is through the Line LocK signals LLK2, LLK3, LLK4 where these signals are used in the presence of FLK to gate the clock drive CLK2, CLK3, and CLK4 to image sensors C2, C3, and C4 respectively. When the Frame lock FLK signal expires the Fine line position FLP C26 functionality is inhibited and the image sensors relative frame synchronisation is checked within a frame period 20 ms (UK) to ensure a continuous relative synchronisation between the image sensors, or to restore it and in either case set FLK again whereby fine adjustment of the image sensor synchronisation by FLP C26 can occur.

For the image sensors now synchronised it is possible to extract one or more subsets of luminance signals from the individual image sensors composite video signals such that they represent the luminance signals of one or more virtual image sensors, each having an equivalent field of view of any component image sensor in the array. The functionality capable of supporting one such virtual image sensor, in this example, is contained within the Combined video CV C27 circuitry where the one or more subsets of luminance signal LS1, LS2, LS3, LS4 are taken from the image sensors C1, C2, C3, and C4 forming the array and combined with an appropriate synthetically generated Frame and line sync signal ES allowing the resulting composite video signal CV5 to be displayed on the Display D C30. In this particular example the subsets of luminance signal LS1, LS2, LS3, LS4 are achieved by the generation of suitable masks to control analogue switching of the image sensor composite video signals CV1, CV2, CV3, and CV4. The X Y outputs of a Joystick C29, or the equivalently synthesised demands and control XYC from an external processing system, control the magnitude of time constants associated with the generation of the vertical and horizontal luminance masks thereby effectively controlling the positioning of the virtual image sensors field of view boresight within its field of regard. It is worth noting that generally a rate demand would normally be more appropriate to slaving a virtual image sensor across a wide field of regard however in this simple example positional demands are used. The rising edge of the Frame begin signal F1 is used to trigger a monostable pulse Q1, with maximum duration of one frame period and instantaneous length controlled by the Joystick C29 potentiometer Y demand, representing vertical mask information.

The trailing edge off Q1 drives a further monostable the duration of whose output Q4 corresponds with the frame syncing period. The falling edge of stripped sync information L1 waveform C34 from the reference image sensor C1 triggers a pulse Q2 whose maximum duration is that of a line scan period, this output, controlled by the Joystick C29 X demand, represents horizontal mask information. The Q2 trailing edge triggers a further monostable whose output Q3 and compliment Q3 are used to generate elements of shifted sync information. Because these sync elements are generated in relation to the reference image sensor's Frame and line sync L1 signal the elevation control does not influence azimuth positioning of the virtual image sensor's field of view boresight. The output Q3 is gated with Q4 to produce shifted line sync information whist Q3 is gated with Q4 to give shifted frame sync information, the two signals being combined to form a synthetic sync signal SS which is passed to the Video Mixer VM C28. Subsets of luminance information are extracted from one or more of the image sensors composite video signals using analogue gates where their switching is controlled by the vertical Q1 and horizontal Q2 mask signals according to the following: image sensor C1 Q1&Q2, image sensor C2 Q1&Q2, image sensor C3 Q1&Q2, image sensor C4 Q1&Q2. The four luminance subsets outputs LS1 2, 3, 4 from image sensors C1, C2, C3, and C4 respectively gated by the analogue gates are passed to a luminance level balancing network in the Video mixer VM C28 before being combined with the synthetic frame and line sync information SS the resulting composite video CV5 being passed to the display D C30 or used as a front end image sensor input to a further processing system, for example an image pattern thread processor.

The essential functionality contained in the Combined video CV C27, Joystick C29 or equivalent, and Video mixer VM C28, can be replicated to support any number of additional autonomous virtual image sensors.

Figure 32:
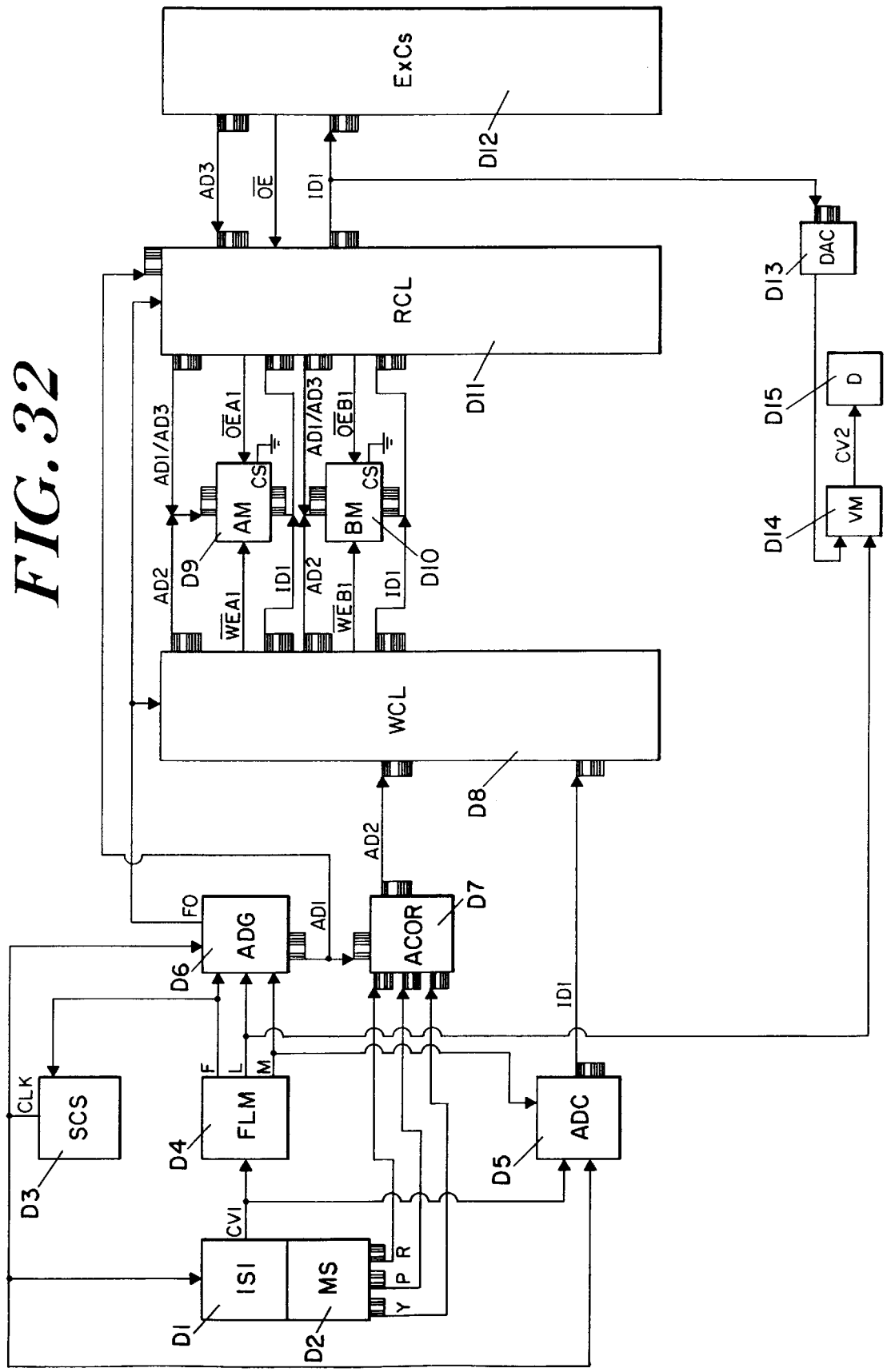
FIG. 32 shows a system block diagram for a three axis image sensor stabilisation system, where sensor motion is detected using traditional sensors, identifying major functional areas and important signals between them.
Figure 33:
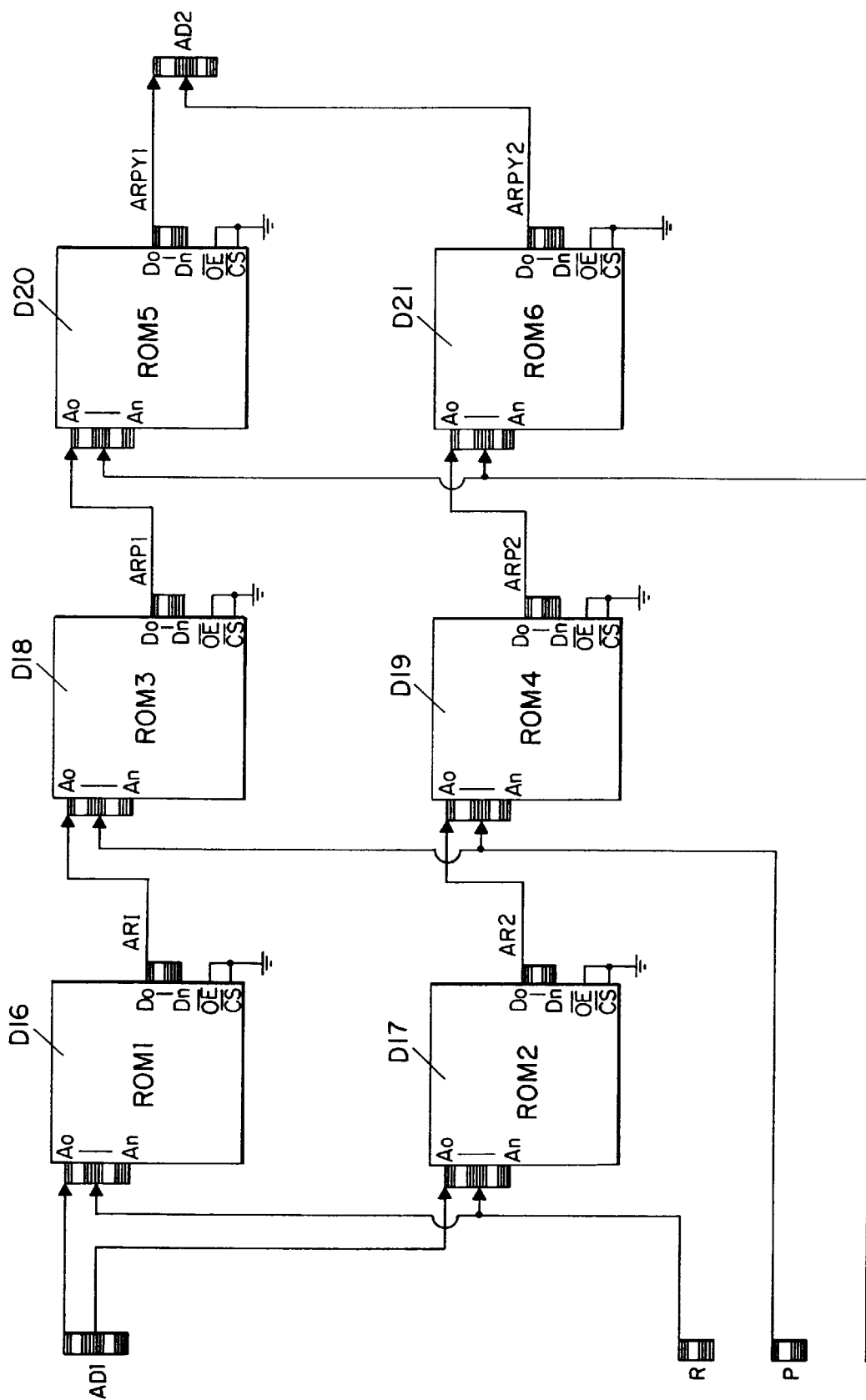
FIG. 33 shows a system block diagram for a three axis image sensor stabilisation system's address correction functionality, comprising a configuration of cascaded ROM's used in this particular example to correct normal address identities associated with image data.
Figure 34:
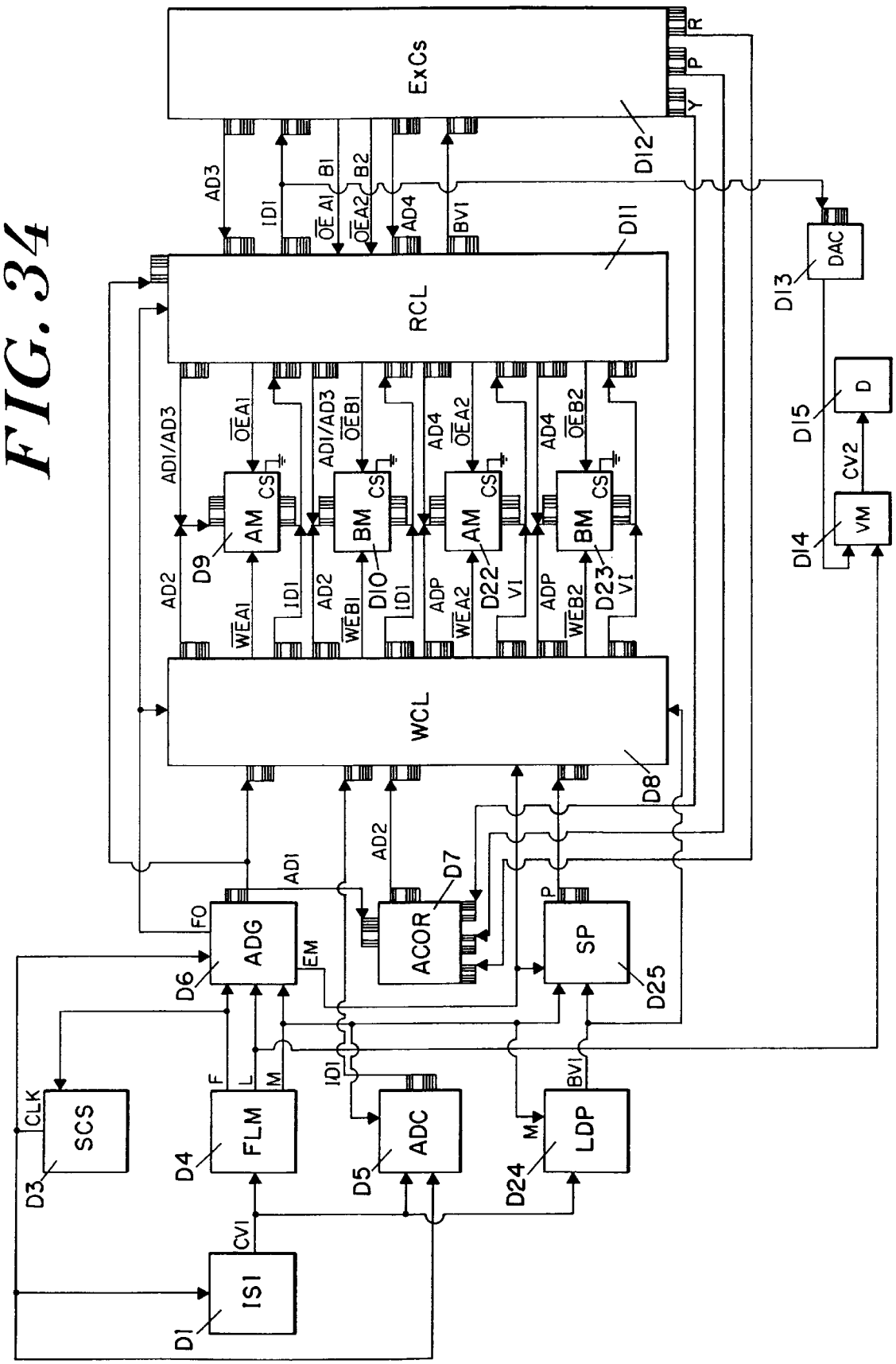
FIG. 34 shows a system block diagram for an image sensor stabilisation system, where sensor motion is detected through software pattern thread tracking algorithms, identifying major functional areas and signals between them.

With exclusive reference to FIGS. 32–34, the operation of a three axis image stabilization sub system is described here which utilises some of the generic functionality and signals introduced in earlier text. An image sensor IS1 D1 accepts clock drive CLK from the Sensor Clock Synchronisation SCS circuitry D3 and regards a scenario where the associated composite video CV1 is passed to two areas of functionality Frame Line Mask FLM circuitry D4 and Analogue to Digital Converter ADC circuitry D5.

The purpose of frame line mask FLM circuitry D4 is to strip the frame and line sync signal L from the composite video and from this stripped sync signal generate two further signals, a frame begin signal F, and an image data mask signal M, these three signals L,F,M are passed to the address generation ADG circuitry D6. The mask signal M is passed to the Analogue to Digital Converter ADC circuitry D5. The frame begin signal F is passed to the sensor clock synchronisation SCS circuitry D3.

The sensor clock synchronisation SCS circuitry D3 drives in this example only one image sensor and therefore provides a continuous clock signal CLK to the image sensor IS1 1 and also feeds the signal to the ADdress Generation ADG circuitry D6 and Analogue to Digital Converter ADC circuitry D5.

The address generation ADG circuitry D6 accepts the clock signal CLK operating at the maximum bandwidth frequency of the image sensor which it gates with the mask signal M the output of which drives a series of cascaded counters, parts of which are reset by characteristics of the frame begin F and frame and line sync L signals, and whose output is the normal sequential address AD1 for each pixel or resolution period of the image sensor. This address AD1 defines position in line, and line in frame of the image sensors actual scan pattern. The counters also allow frames of data to be counted, and this signal is named F0. The pixel address for position in line and line in frame are passed to the address correction ACOR circuitry D7 and to the Read Control Logic RCL circuitry D11. F0 is passed to both the Write Control Logic WCL circuitry D8 and read control logic RCL circuitry D11 to allow the double buffered memories AM1 D9 and BM1 D10 to support continuous processing of image data.

The analogue to digital converter ADC circuitry D5 operates on the composite video signal CV1 gated through an analogue switch controlled by the mask signal M and converts the signal within each clock period to digital values ID1 which are passed to the write control logic WCL circuitry D8.

With particular reference to FIG. 33 the Address CORrection ACOR circuitry D7 comprises a number of Read only Memories ROM's configured in parallel D16 & D17, D18 & D19, D20, and D21 where further the outputs from specific pairs of ROM'S are cascaded through the sequence. To allow for address component precision from the address generation ADG D6 or axis rotation terms from the motion sensor MS D2 or to gain additional output precision as here, these cascaded ROM's may be further organised and added to stage wise in parallel. The ROM's which are continuously selected accept address definition AO-An and generate data DO-Dn. ROM1 D16 and ROM2 D17 accept normal raster scan address definition from the ADG circuitry D6 as partial address definitions, the remainder of the address definition comprises the roll axis correction term R.

This term may be taken from the image sensor's motion sensor MS D2, traditional accelerometer or equivalent derived velocity, or from software based pattern thread tracking algorithms in the External Computer system ExCs D12 where such terms utilise advance feed-forward techniques to remove the latency of such calculations. The data sets contained within these ROM's, specified off line using high level modelling techniques, define the address transforms whose outputs DO-Dn, for specific combinations of ADG address components and axis correction terms, represent the stable platform address components for a particular axis rotation in this case roll. The outputs from ROM1 D16 and ROM2 D17, AR1 and AR2 respectively, form partial address definitions to ROM3 D18 and ROM4 D19 respectively where the complete address definition AO-An to these two ROM's is provided by the pitch correction term P, this term is generated in similar fashion by MS D2 or ExCs D12 to the roll correction term. Similarly the data sets contained in these ROM's are specified off line using high level modelling techniques and provide the address transforms, to correct for particular input combinations of the roll axis modified ADG address term in respect of pitch. The outputs from ROM3 D18 and ROM4 D19, ARP1 and ARP2 respectively, provide the partial address definitions for ROM5 D20 and ROM6 D21 respectively where the yaw correction term Y complete the address definition AO-An. The data sets for these ROM's similarly defined by high level modelling techniques support the address transforms necessary for specific combinations of address components to effect the yaw axis rotation of the previously roll and pitch corrected ADG address term. The outputs from ROM5 D20 and ROM6 D21, ARPY1 and ARPY2 respectively, in this example together form the three axis corrected address definition AD2 for the current image sensor scan position and this complete address definition AD2 is passed to the write control logic WCL D8.

Referring again to FIG. 32 the write control logic WCL circuitry D8 accepts as inputs the corrected address definition AD2 for the image sensors current scan position, corrected for sensor motion in roll pitch and yaw, from the ACOR D7 and the digital value ID1, representing the current composite video signal from the ADC D5. Further the write control logic WCL D8 accepts F0 to determine which set of memories AM1 D9 or BM1 D10 to use. Address and data definition to each of the double buffered memories is effected through two sets of three state gates one set dedicated to the write control logic WCL D8 and one set dedicated to the read control logic RCL D11. For the address definition AD2 from ACOR D7 and data ID1 from the ADC D5 a write pulse WEA1 or WEB1 is generated, the timing of which is determined by the time necessary to achieve stability of output from the ACOR D7 and ADC D5 in any image sensor resolution period.

The read control logic RCL circuitry D11 accepts as inputs F0, to allow access to the double buffered memories permitting reading of data written during the previous frame period, and the unmodified ADG D6 address AD1. These inputs allow sequential reading of the memory written during the previous frame. Data so read in sympathy with address AD1 may be passed to a a further processing sub system or digital to analogue converter DAC D13 and recombined in the video mixer VM D14 with current stripped frame and line sync signal L to form the composite video signal CV2 which allows display of the stabilised image on display D D15. For a processing system with independent address generation AD3 the memories support asynchronous access and processing of the stabilized data.

Referring to FIG. 34 the functionality can be seen to be similar to that of FIG. 32 except that the image sensor's motion sensor MS D2 is replaced by software functionality, in the external computer system ExCs D12, which allows tracking of image pattern thread elements by access to memories AM2 D22 and BM2 D23 providing thread data on a continuous basis by the use of double buffering. The data for these memories is generated by an "image pattern thread processor" comprising a luminance differential processor LDF D24 or equivalent, stack pointer SP D25 circuitry and the functionality of FLM D4 and ADG D6 circuitries where in this example the luminance differential processor LDP D24 extracts image outline and relief contour detail BV1 of the observed scenario which is written into the memories AM2 D22 and BM2 D23 by the write control logic WCL circuitry D8. This information may be written either as image mapped event data using address definition AD1 and data BV1 or as in this example as vector identity lists using address definition ADG comprising AD1 line identity component and sequential stack pointer SP component P, and data specified by the AD1 address component defining position in line VI. Asynchronous reading of the AM2 D22 and BM2 D23 memories by the external computer system ExCs D12 using address definition AD4 through the functionality of the read control logic RCL D11 permits specific motions of pattern thread elements to be monitored and thereby define the roll R, pitch P, and yaw Y terms for the ACOR D7.

The functionality described allows for the three axis stabilization of imaged data using data rate address correction applied to an image sensors composite video signal. There is an implicit data latency of one frame period in respect of the normal address recovery of information so buffered.

Ideally the concept of three axis data rate address correction should be applied inversely and upstream within the image sensor technology so that date stored in normal address sequence as a function of accepted optics and CCD raster technologies may be recovered using address correction on the data read out. It is recognised here that movement away from serial to random read out of CCD information is necessary to achieve this.

In respect of virtual image sensor technologies where multiple image sensors support a virtual imaged field of view then the integration of stabilisation techniques into CCD technologies (as opposed to its down stream realization) requires a cooperative arrangement of address correction between the associated multiple CCD elements comprising such a virtual image sensor.

Figure 35:
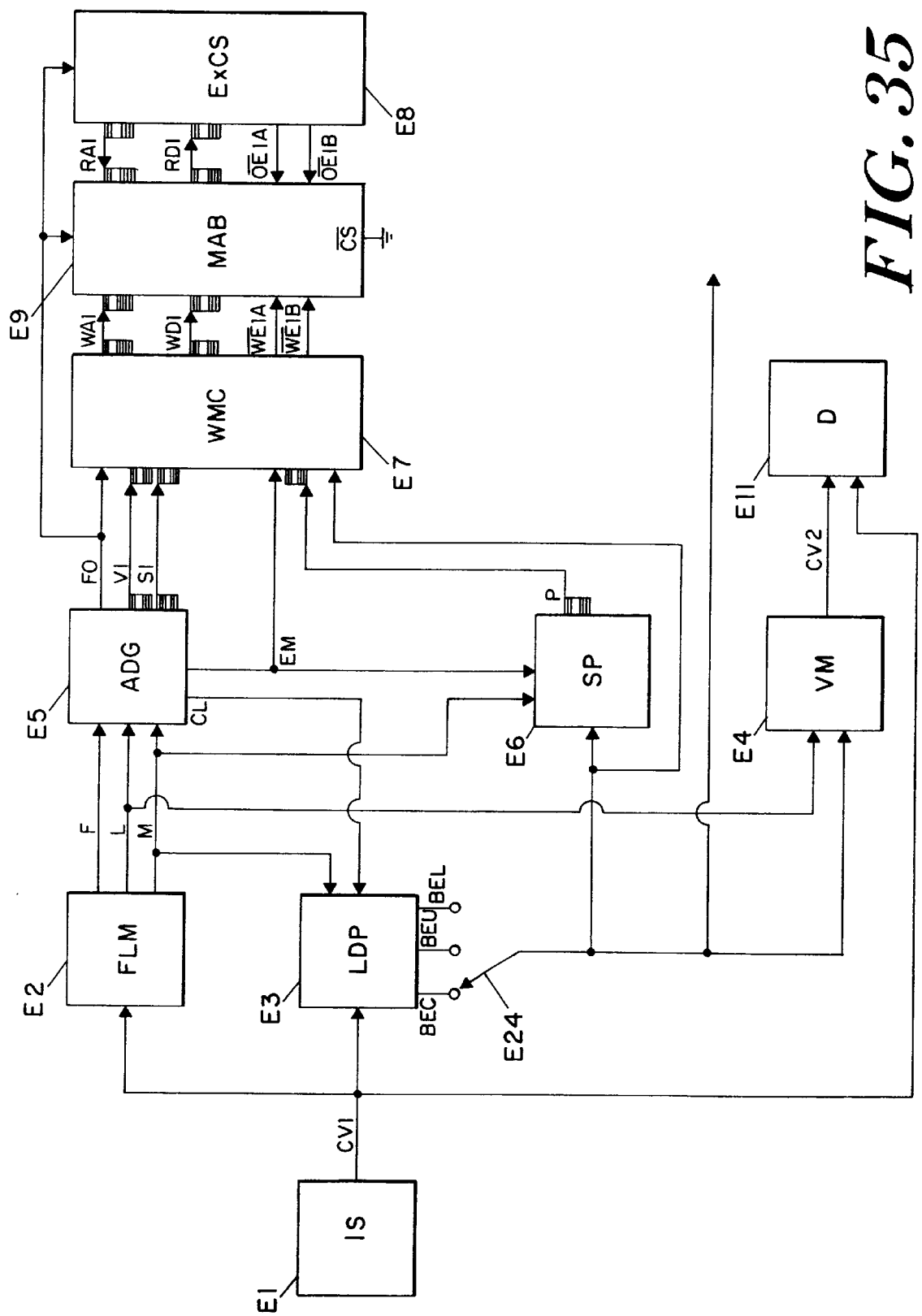
FIG. 35 shows a system block diagram of an image pattern thread processor identifying functional areas comprising the image pattern thread processor and important signal information passed between these functions.
Figure 36:
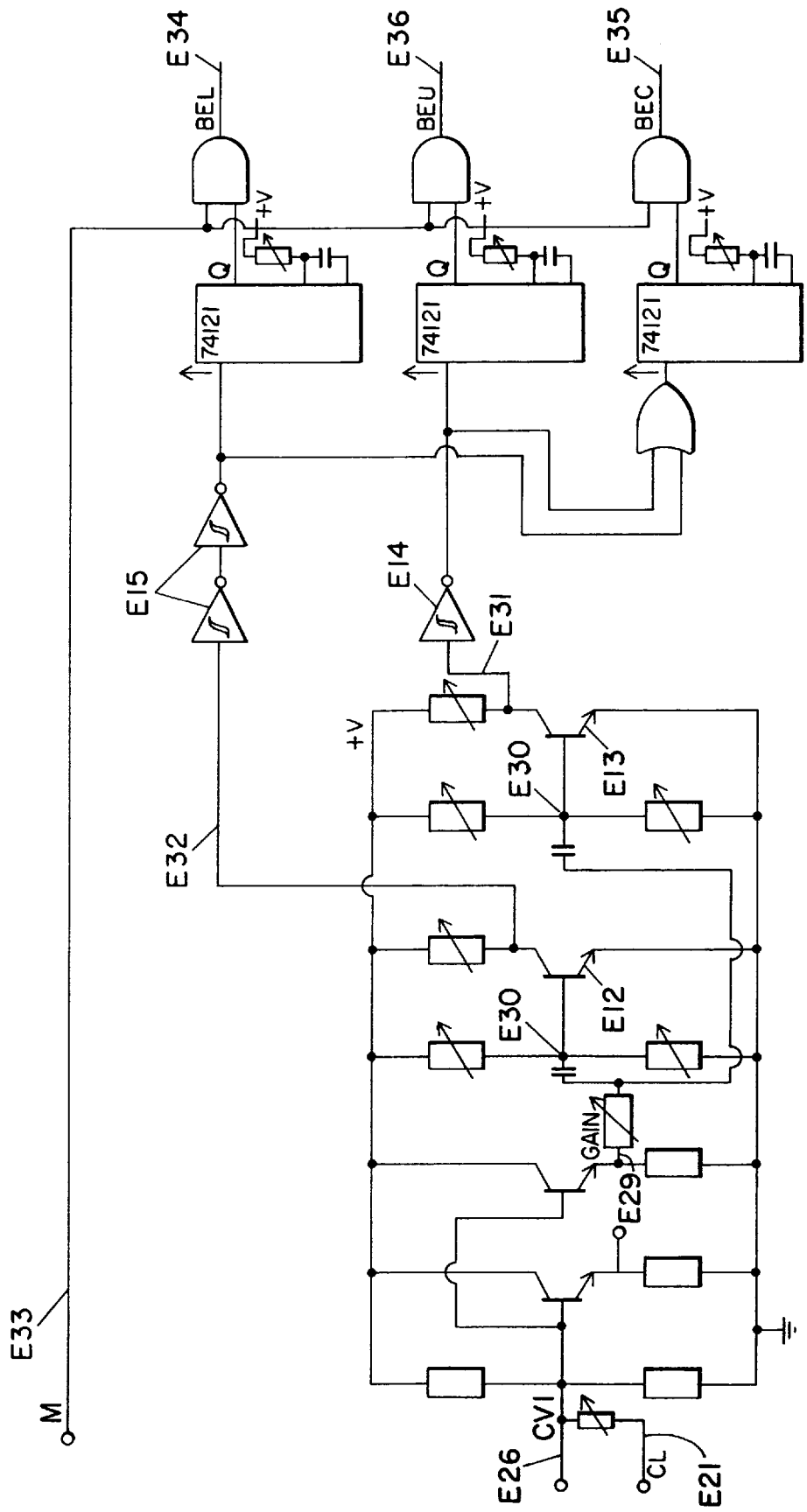
FIG. 36 shows circuitry of luminance differential processor employed in identifying image pattern thread elements.

Referring exclusively to FIGS. 35–38 a more detailed description of an image pattern thread processor is now included whose generic functionality an d signals were largely introduced in earlier text. With particular reference to FIG. 35 Composite Video CV1 waveform E26 from a CCD or equivalent image sensor IS E1 observing a real world scenario E25 is fed to the Frame Line Mask FLM E2 circuitry and to the Luminance Differential Processor LDP E3 circuitry and Display D E11.

The purpose of the Frame line mask circuitry FLM E2 is to strip from the Composite video signal CV1 E26 the Frame and line sync information L E28 and pass this signal to the Video Mixer VM E4, and ADdress Generation ADG E5 circuitry. The Frame line mask FLM E2 circuitry also uses this stripped sync information L E28 to generate two further signals a Frame begin signal F E27, and a Luminance Mask signal M E33, both of these signals are sent to the Address generation ADG E5 circuitry, the Mask signal M E33 is also sent to Luminance differential processor LDP E3, and Stack Pointer SP E6 circuitry.

Referring in particular to FIG. 35 the Luminance differential processor LDP E3 circuitry operates on the Composite video signal CV1 waveform E26 performing spectral analysis on this signal to identify frequency excursions of the waveform through upper or lower settable limits. This is achieved simply in this example by feeding the variable gain signal from an emitter follower waveform E29, shown at the time slice EZEZ, to two time differentiating CR circuits whose outputs E30 each drive a PNP transistor E12 and E13, one E12 biased on, and the other E13 biased off. Positive going differentials (frequency excursions through an upper limit) do not affect the transistor E12 biased on, but momentarily switch on the transistor E13 biased off and the output waveform E31 from this transistor feeds a schmitt trigger inverter E14. Similarly for negative going differentials (frequency excursions falling below a lower limit) do not affect the transistor E13 biased off, but momentarily switches off the transistor E12 biased on the output waveform E32 feeds a double schmitt trigger inverter E15. The outputs from the inverters E14 and E15 are combined and shaped by a monostable before gating with the Mask signal M E33 to produce the Binary Event BEC signal waveform E35 which is passed to the switch E24. Similarly the shaped component upper and lower frequency excursion binary event signals BEU and BEL waveforms E36 and E34 respectively are passed to switch E24. Switch E24 allows one of the signals BEC. BEU or BEL to be selected and passed to the Stack pointer SP E6 circuitry, Video mixer VM E4 circuitry and Write Memory Control WMC E7 circuitry.

The frequency characteristics of an image sensor's luminance signal are inherently polarised according to the relative alignment of the image sensors line scan and viewed features. Mixing of the composite video signal CV1 with a signal E21 from a clock operating at the maximum bandwidth frequency of the image sensor allows some reduction in this polarisation for a single sensor system.

Referring again in particular to FIG. 36 the Address generation ADG E5 circuitry utilises a clock operating at the maximum bandwidth frequency of the image sensor and gated by the Mask signal M E33 the output from which drives cascaded counters within each luminance period. Elements of the cascaded counters are reset from characteristics of the Frame begin signal F waveform E27, and Frame and line sync signal L waveform E28, and the counters thereby generate a compound identity, equivalent to every luminance resolution period in the image sensors raster scan, that is for each pixel position in each line VI and every line scan within a frame SI both these signals are passed to the Write Memory Control WMC E7 circuitry. Frames of data are also counted by the Address generation ADG E5 circuitry and this signal F0 is also passed to the Write memory control WMC E7 circuitry, the External Computer system ExCs E8 and the double buffered memories MAB E9 to allow synchronised use of these memories by WMC E7 and ExCs E8. The Address generation ADG E5 circuitry also generates an End Marker signal EM E37 which indicates the end of any particular luminance period and this signal is passed to the Stack pointer SP E6 circuitry and the Write memory control WMC E7 circuitry.

Figure 37:
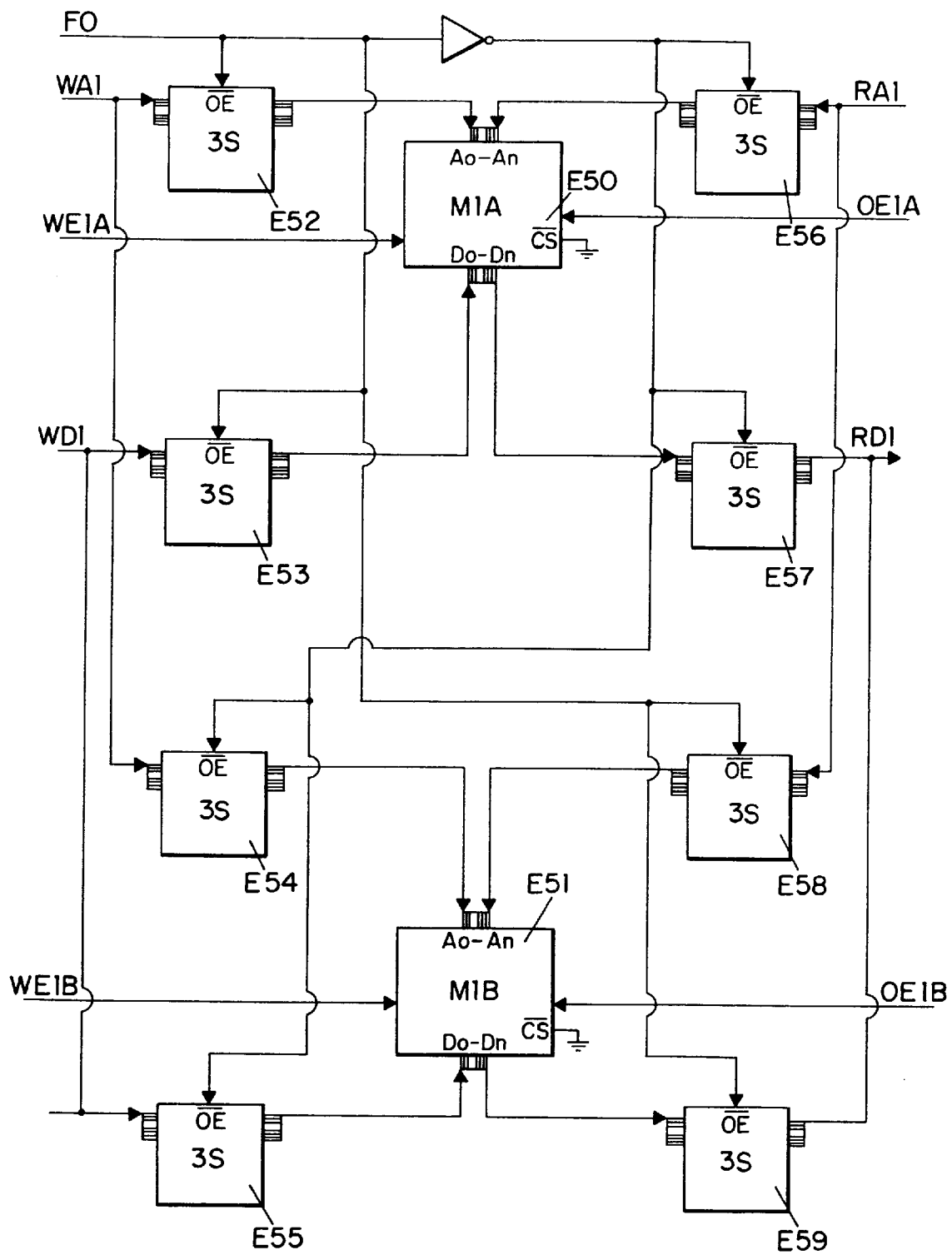
FIG. 37 shows detail of the double buffered memories comprising the inter processor data link of an image pattern thread processor sub system.
Figure 38:
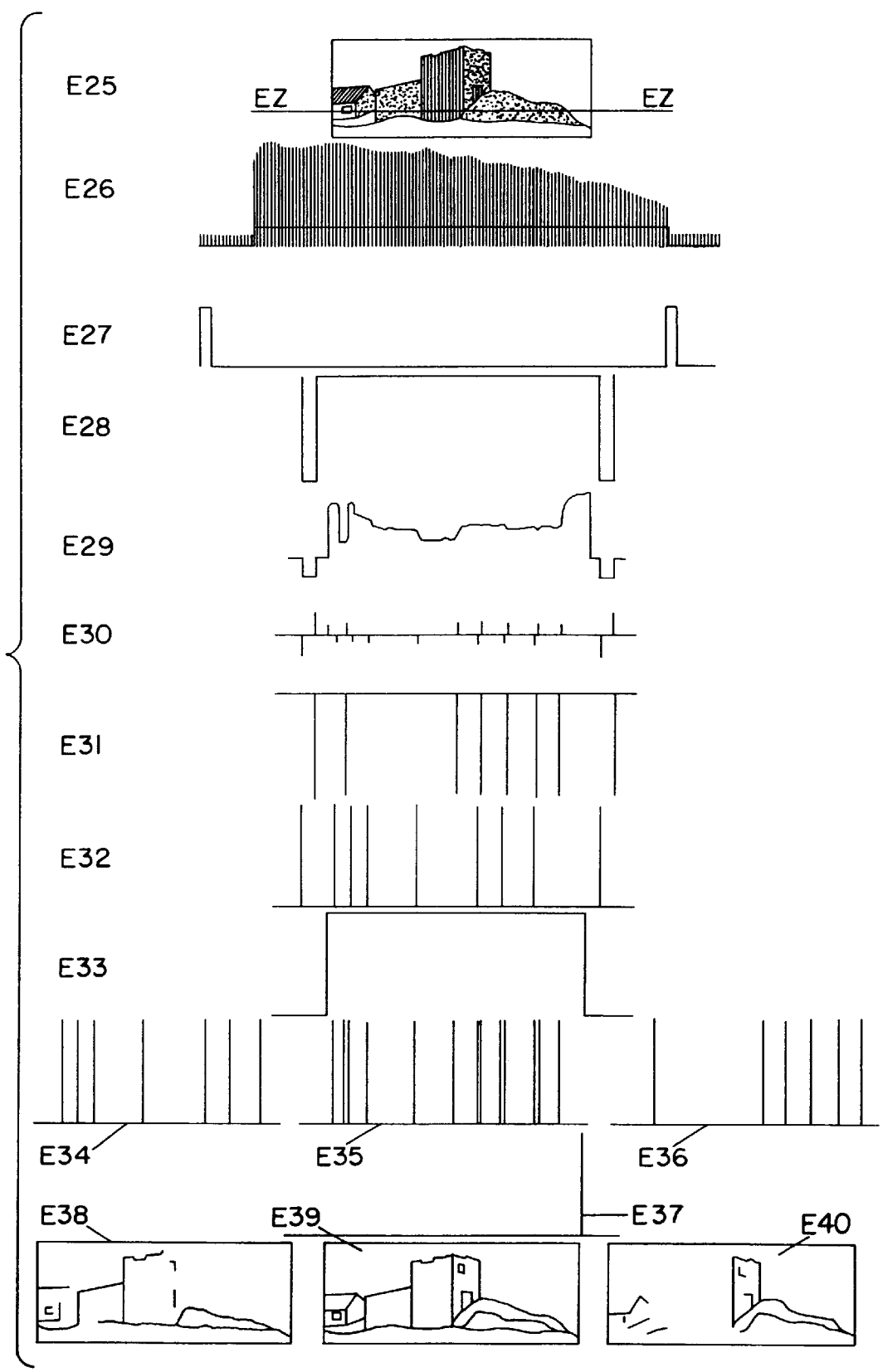
FIG. 38 shows images and waveforms associated with the image pattern thread processor system.

Referring in particular to to FIG. 37 which shows the organisation of the MAB E9 memories comprising the pair of physically and logically partitioned memories M1A E50 and M1B E51. The memories M1A E50 and M1B E51 are sized according to the number of line scans in a frame, and resolution periods in a line scan. The memories are capable of registering data written within the resolution period of the image sensor. The memory address and data lines are accessed via sets of three state gates one set E52, E53, E54, E55 dedicated to the Write memory control WMC E7 and the other set E56, E57, E58, E59 to the read memory control of the External computer system ExCs E8. These memories are continuously selected and during each frame data is written by WMC E7 and read by the External comouter system ExCs E8 these processes being performed one frame out of phase for each of the memories M1A E50 and M1B E51. The Write memory control WMC E7 generates a write address WA1 and data WD1 which are presented to the sets of three state gates E52, E54, and E53, E55 respectively. During frames when OF=1 the outputs from the gates E54 and E55 are enabled and drive memory M1B E51, write enable pulses WEIB are generated by WMC E7. For the read addresses RA1 presented by the read memory control of the External computer system ExCs E8 to the sets of three state gates E56 and E58 only the gates E56 are enabled for frames when F0=1 and during these frame periods data RD1 in response to the OEIA signals generated by the External computer system ExCs E8 is returned through the enabled three state gates E57. On the subsequent cycle write addresses WA1 and data WD1 are presented to M1A via the sets of enabled three state gates E52 and E53 respectively while data RD1 is read from M1B using the enabled three state gates E59 corresponding to the read addresses RA1 presented via the enabled three state gates E58.

Referring again in particular to FIG. 35 the Stack pointer SP E6 circuitry accepts the End marker signal EM waveform E37 and the switch E24 selected binary event signal BEC waveform E35, or BEU waveform E36, or BEL waveform E34 and counts events within a line scan to allow sequential address generation P within logically partitioned stacks defined within the memories M1A E50 and M1B E51, where each new address is the address into which the next entry in any particular stack will be made. The stack pointer P is reset at the beginning of each new line scan by the action of the Mask signal M E33 going low.

For data compression of image pattern thread data the Write memory control WMC E7 has at any particular time the identity of the available memory M1A E50 or M1B E51 decided in this case by the Frame OF signal, the current logically partitioned stack base within memory SI (line number within the frame), it also has the vector identity VI (representing the position in a line scan of any possible luminance frequency excursion binary event). Further during any particular line scan the address P from the Stack pointer SP E6 circuitry indicates the sequential word in a particular stack to be written. When a frequency excursion event occurs the associated binary event in the signal BEC waveform E35 or BEL waveform E34, or BEU waveform E36 depending on switch E24 position is used by the Write memory control WMC E7 circuitry to generate the WE for the memory in question for this particular frame period, when the data WD1 written into the word, indicated by the address combination WA1, formed from the stack identity SI and the stack address P, will be the vector identity VI (WA1=SI+P WD1=VI). At the end of each line's luminance period the end marker signal EM E37 will be interpreted as though it were a binary event and will cause a word WD1 to be written to the current stack whose identity is unique and indicative on reading that the logical end of a particular stack of data has been reached. During alternate frames stacks written by the Write memory control WMC E7 circuitry in the previous frame may be read asynchronously by the External computer system ExCs E8.

For the writing of image mapped binary event data, the Write memory control WMC E7 circuitry again identifies the appropriate memory to write to, for the current frame, on the basis of F0 but now generates an appropriate write enable command WE1A or WE1B for every address WA1=SI+VI with data WD1=(BEC or BEU or BEL) as a function of the switch E24 setting. Continuous asynchronous access to data written during the previous frame can be made by the External computer system ExCs E8.

The Video Mixer VM E4 combines Binary event data BEC, BEU, or BEL (function of switch E24) with Frame and line sync signal L E28 to form a composite video signal CV2 which is passed to the Display D E11 allowing operator observation of the image pattern thread processor output E38 for lower frequency excursion events, E39 for combined upper and lower frequency excursion events, and E40 for upper frequency excursion events. The Display D E11 also allows viewing of composite video CV1 representing the normal video image E25 waveform E26.

What is claimed is:

1. A topography processor system arranged to execute internal transfer functions, the system comprising,
    an array of at least two image systems, and
    at least one processor, wherein the processor includes
        processing system diagnostic means for stimulating the system with predefined data,
        wherein the processor is arranged to process imaged detail on said predefined data and generate for output at least one of a graphic visual, augmented visual, and automatic visual display, and
        wherein the processing system diagnostic means is arranged to diagnose system faults and internal transfer function faults by employing at least one of the graphic visual, augmented visual, and automatic visual displays.

2. A topography processor system as claimed in claim 1 wherein a frame rate topography processor is provided which allows stabilised frame rate macroscopic system performance.

3. A topography processor system as claimed in claim 1 wherein said diagnosis is performed non interruptively to allow an operationally configured system and its performance envelope to be preserved.

4. A topography processor system as claimed in claim 3 wherein the non interruptive aspect of the diagnosis does not require extensive second layer BITE.

5. A topography processor system as claimed in claim 3 wherein the diagnostic monitoring is possible using system sufficient data, control and address highways.

6. A topography processor system as claimed in claim 3 wherein the diagnostic monitoring does not require additional system external equipments.

7. A topography processor system as claimed in claim 1 wherein the diagnosis provided by said diagnostic means encompasses all the system processes executing to completion.

8. A topography processor system as claimed in claim 1 wherein the diagnosis allows first line system GO/NOGO decisions to be reached, based on the performance of system transfer functions.

9. A topography processor system as claimed in claim 1 further including augmented visual diagnostic means to allow first line monitoring of system end to end performance against apriori reference data.

10. A topography processor system as claimed in claim 1 further including automatic visual means to allow first line monitoring of system end to end performance against apriori reference data.

11. A topography processor system as claimed in claim 1 further including non interruptive system stimulation and monitoring means for system performance analysis.

12. A topography processor system as claimed in claim 1 further including correlatable differential image sensor input means to allow stimulation of the topography processor system.

13. A topography processor system as claimed in claim 1 further including closed loop stimulation and monitoring means to allow system performance assessment.

14. A topography processor system as claimed in claim 1 further comprising resolution means for employing an association of generic patterns between a plurality of image sensors to resolve the system relative spacial position of topographical detail in the observed scenario.

15. A topography processor system as claimed in claim 1 further comprising identification and partitioned storage means which allow binary event signals comprising generic image pattern information, output from an image pattern thread processor or equivalent and representative of vectors of particular and different attributes, to be generated from each of the image sensors composite video signals and for each binary event comprising such signals to assign an identity and pass such information as partitioned sets of data to other processes.

16. A topography processor system as claimed in claim 1 further comprising combination synthesis means which allows combinations of vector identities from sets of sets of such identities to be synthesised and passed to other processes.

17. A topography processor system as claimed in claim 1 further comprising identity transform means which support parallel and cascaded operations on sets of synthesised identity combinations where apriori transform knowledge is employed to solve vector equations or other processes to be computed within an effective multiple address time.

18. A topography processor system as claimed in claim 1 further comprising dedicated ordered partitioned buffer means to register results from parallel identity transform processes and allows, through the ordered reading of sets of such buffers, the output of a three dimensional scenario data base, comprising unique multiple vector intercepts.

19. A topography processor system as claimed in claim 1 further comprising processor architecture means to allow dynamic reconfiguration of processor resources necessary to support frame rate operation.

20. A topography processor system as claimed in claim 1 further comprising means for co-ordinated scanning of a common scenario by the image sensors whilst maintaining their different perspectives to allow improved range discrimination.

21. A topography processor system as claimed in claim 1 further comprising means for iterative synthesis of combinations of, and comparison of, subset patterns between sets of such subset patterns derived from a plurality of image sensors composite video signals, where correlation of such subset patterns members between image sensors is detected, thereby to allow the system relative spacial position of their associated elements of topographical detail to be fixed from apriori knowledge.

22. A topography processor system as claimed in claim 1 further comprising real time identification and partitioning means to extract subset patterns from a plurality of composite video signals.

23. A topography processor system as claimed in claim 22 wherein information of identified and partitioned subset patterns may be passed to a further process.

24. A topography processor system as claimed in claim 1 further comprising electro-mechanical means to allow iterative synthesis of subset pattern combinations having time coincidence between a plurality of image sensors.

25. A topography processor system as claimed in claim 1 further comprising relative image sensor frame and line synchronisation means to allow iterative synthesis of subset pattern combinations having time coincidence between a plurality of image sensors.

26. A topography processor system as claimed in claim 1 further comprising control loop means to refine iterative synthesis of combinations of subset patterns having time coincidence between a plurality of image sensors.

27. A topography processor system as claimed in claim 1 further comprising real time multiple comparison means to identify unique multiple matches between sets of sets of subset patterns.

28. A topography processor system as claimed in claim 1 further comprising real time computation means to determine the system relative spacial position of elements of topographical detail defined by a multiple match of subset pattern members between image sensors.

29. A topography processor system as claimed in claim 1 further comprising means for passing three dimensional scenario data base to other processes.

30. A topography processor system as claimed in claim 1 wherein co-operatively slaveable phased virtual image sensor array means are provided to allow a plurality of equivalent virtual image sensors, to be logically and physically positioned and orientated, such that the boresights of their respective fields of view are parallel and such that they generate images of a common scenario from their different perspectives, and that common image detail is registered in corresponding line scans for each such virtual image sensor, and that the frame and line sync generation for each such sensor is controlled such that a time coincidence exists between the characteristics of theses signals, and each such virtual image sensor's field of view may be slaved or scan in a controlled fashion so as to preserve their differing perspective views of a common scenario within their shared field of regard, and such that imaged information may be passed to a further process.

31. A topography processor system as claimed in claim 1 further comprising control means for autonomous automatic or manual definition of a virtual image sensor's field of view boresight slave position within the field of regard of a phased virtual image sensor array.

32. A topography processor system as claimed in claim 1 further comprising control means for an external processor defined slave position of a virtual image sensor's field of view boresight within the field of regard of a phased virtual image sensor array.

33. A topography processor system as claimed in claim 1 further comprising control means for an autonomous iterative inter frame time relative shift of a frame and line sync between a plurality of image sensors in a phased image sensor array.

34. A topography processor system as claimed in claim 1 further comprising control means to allow for an external processor defined time relative shift of a frame and line sync separation between a plurality of image sensors in a phased image sensor array.

35. A topography processor system as claimed in claim 1 further comprising communication means for allowing imaged information derived from imagers comprising a phased image sensor array, to be passed to an external processor system.

36. A topography processor system as claimed in claim 1 further comprising virtual image sensor means to allow a plurality of similar image sensors to be organised in an array, where the logical and physical position and orientation of each such image sensor in the array is such that their individual fields of view collectively cover a continuous scenario comprising the individual images from each image sensor, and where it is possible to generate in real time a virtual image sensor image from components of images from one or more adjoining image sensors in the array such that the field of view of the virtual image sensor is equivalent to the field of view of any image sensor in the array and where the field of regard of the virtual image sensor comprises the individual fields of view of the image sensors in the array.

37. A topography processor system as claimed in claim 1 further comprising relative synchronisation means for establishing and maintaining a relative frame and line sync separation between image sensors comprising a virtual image sensor necessary to allow real time extraction of component image sensor luminance subsets in support of a virtual image.

38. A topography processor system as claimed in claim 37 further comprising control means to define the virtual image sensor's field of regard relative virtual image sensor's boresight position.

39. A topography processor system as claimed in claim 37 further comprising logical means to identify luminance signal subsets and frame and line sync characteristics for each virtual image sensor's field of view included in the system.

40. A topography processor system as claimed in claim 1 further comprising composite video synthesis means for combining subsets of luminance signals with an appropriately generated synthetic frame and line sync signal to generate a composite video signal of each virtual image sensor included in the system.

41. A topography processor system as claimed in claim 1 further comprising functional replication means for a given array of image sensors comprising a virtual image sensor included in the system to support the generation of multiple, simultaneous and different virtual image sensor composite video signals.

42. A topography processor system as claimed in claim 1 further comprising manual, automatic or external processor definition means to electronically slave one or more virtual image sensors field or fields of view independently and simultaneously across a field of regard comprising the fields of view of the image sensors comprising the array.

43. A topography processor system as claimed in claim 1 further comprising electronic means for the rapid and accurate positioning of a field of view boresight of a virtual image sensor within its field of regard.

44. A topography processor system as claimed in claim 1 further comprising communication means to allow information in a virtual image sensor's field of view to be communicated to another processing system.

45. A topography processor system as claimed in claim 1 further comprising three axis image stabilization means employing address correction applied to the buffering of information derived from an image sensor composite video signal, to allow stabilized data to be recovered using normal addressing.

46. A topography processor system as claimed in claim 1 further comprising three axis image stabilization means employing address correction applied to allow the recovery of stabilised image sensor luminance data from buffered information derived from an image sensors composite video signal, stored using normal addressing.

47. A topography processor system as claimed in claim 1 further comprising three axis image stabilization means employing address correction terms based on information from traditional rate sensors.

48. A topography processor system as claimed in claim 1 further comprising three axis image stabilization means employing address correction terms based on information from software pattern tracking algorithms.

49. A topography processor system as claimed in claim 1 further comprising three axis image stabilization means employing address correction applied to allow the recovery of stabilised image sensor luminance data from buffered information derived from an image sensors sensed luminance, stored using CCD or equivalent technologies.

50. A topography processor system as claimed in claim 1 further comprising three axis image stabilization for a plurality of associated (in the context of virtual image sensor or phased image sensor arrays) CCD sensing means employing address correction applied to allow the recovery of stabilised image sensor luminance data from buffered information derived from an image sensors sensed luminance, stored using CCD or equivalent technologies.

51. A topography processor system as claimed in claim 1 further comprising image pattern thread processing means which allow for the real time extraction of important image pattern thread information from the composite video signal of an image sensor, CCD or equivalent, comprising a luminance signal spectral analyser or equivalent capable of identifying image pattern outline and relief contour detail derived from luminance signal frequency excursions transiting through preset upper or lower frequency limits where such events generate in real time a binary event signal and an associated identity for each such event and where such information may be passed to a further processing or display system.

52. A topography processor system as claimed in claim 1 further comprising real time identification means to log the position within the image sensor's raster scan, that is within the field of view of the image sensor, of each binary event representing elements of image pattern threads.

53. A topography processor system as claimed in claim 1 further comprising real time identification means to count the sequential binary events of particular attributes within each line scan of the image sensor.

54. A topography processor system as claimed in claim 1 further comprising communication means to pass to further processing systems partitioned sequential terminated lists of binary event identities representative of imaged pattern thread elements.

55. A topography processor system as claimed in claim 1 further comprising communication means to pass to further processing systems binary event data as an image mapped array.

56. A topography processor system as claimed in claim 1 further comprising output double buffering of image pattern thread data means to pass such data to a further processing system allowing continuous data output at an image sensor frame rate with maximum data latencies of 20 ms (UK).

57. A topography processor system as claimed in claim 1 further comprising data reduction means to expedite the further analysis of image pattern thread data.

58. A topography processor system as claimed in claim 1 further comprising interference means which through mixing of a clock signal operating at the maximum bandwidth frequency of the image sensor with luminance information allows a reduction in polarisation effects of relative imaged feature and image sensor line scan orientation.

59. A topography processor system as claimed in claim 1 further comprising means for the display of composite video synthesised by the combination of the binary event signal with current stripped frame and line sync information from a composite video signal of the image sensors.

60. A topography processor system as claimed in claim 1 further comprising a variety of processors to simultaneously identify image pattern thread elements with differing attributes for simultaneous output to a further processing or display system.

* * * * *